US011843092B2

(12) United States Patent
Kamine et al.

(10) Patent No.: US 11,843,092 B2
(45) Date of Patent: Dec. 12, 2023

(54) NONAQUEOUS ELECTROLYTE SOLUTION AND NONAQUEOUS ELECTROLYTE SECONDARY BATTERY

(71) Applicant: Asahi Kasei Kabushiki Kaisha, Tokyo (JP)

(72) Inventors: Hirokazu Kamine, Tokyo (JP); Naoki Matsuoka, Tokyo (JP); Makoto Ito, Tokyo (JP); Xun Zhang, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 0 days.

(21) Appl. No.: 17/635,770

(22) PCT Filed: Sep. 11, 2020

(86) PCT No.: PCT/JP2020/034583
§ 371 (c)(1),
(2) Date: Feb. 16, 2022

(87) PCT Pub. No.: WO2021/049648
PCT Pub. Date: Mar. 18, 2021

(65) Prior Publication Data
US 2022/0271338 A1 Aug. 25, 2022

(30) Foreign Application Priority Data

Sep. 13, 2019 (JP) .................................. 2019-167451
Jul. 21, 2020 (JP) .................................. 2020-124513

(51) Int. Cl.
H01M 10/0568 (2010.01)
H01M 10/0569 (2010.01)
H01M 10/0567 (2010.01)

(52) U.S. Cl.
CPC ... *H01M 10/0567* (2013.01); *H01M 10/0568* (2013.01); *H01M 10/0569* (2013.01); *H01M 2300/0025* (2013.01)

(58) Field of Classification Search
CPC ......... H01M 10/0567; H01M 10/0568; H01M 10/0569; H01M 2300/0025
See application file for complete search history.

(56) References Cited

U.S. PATENT DOCUMENTS 5,504,235 A 4/1996 Hirose et al.
2004/0013946 A1 1/2004 Abe et al.
(Continued)

FOREIGN PATENT DOCUMENTS

CN 103250272 A 8/2013
CN 106328993 A 1/2017
(Continued)

OTHER PUBLICATIONS

International Preliminary Report on Patentability and Written Opinion issued in corresponding International Patent Application No. PCT/JP2020/034583 dated Mar. 24, 2022.
(Continued)

Primary Examiner — Osei K Amponsah
(74) Attorney, Agent, or Firm — Morgan, Lewis & Bockius LLP

(57) ABSTRACT

The present disclosure provides a nonaqueous electrolyte solution which contains: a nonaqueous solvent containing acetonitrile and vinylene carbonate; and a compound represented by general formula (1) $R_1$-A-$R_2$ (wherein A represents a divalent group that has a structure represented by one of formulae (1-2) to (1-5); and each of $R_1$ and $R_2$ independently represents an aryl group, an alkyl group which may be substituted by a halogen atom, while having from 1 to 4 carbon atoms, an alkyl group, a vinylidene group which may (Continued)

be substituted by a halogen atom, or an aryl group which may be substituted by a halogen atom; or alternatively, $R_1$ and $R_2$ may combine with each other and form, together with A, a ring structure that may have an unsaturated bond).

17 Claims, 6 Drawing Sheets

(56) References Cited

U.S. PATENT DOCUMENTS

| | | | |
|---|---|---|---|
| 2006/0269843 A1* | 11/2006 | Usami | H01M 10/0567 429/324 |
| 2012/0308881 A1 | 12/2012 | Tokuda et al. | |
| 2013/0224535 A1* | 8/2013 | Matsuoka | H01M 10/0568 429/188 |
| 2013/0252056 A1 | 9/2013 | Ueki et al. | |
| 2014/0030588 A1 | 1/2014 | Hong et al. | |
| 2014/0255796 A1 | 9/2014 | Matsuoka et al. | |
| 2017/0033402 A1 | 2/2017 | Kubota et al. | |
| 2017/0117578 A1 | 4/2017 | Seo et al. | |
| 2018/0062207 A1 | 3/2018 | Matsuoka et al. | |
| 2018/0062213 A1 | 3/2018 | Matsuoka et al. | |
| 2019/0165417 A1 | 5/2019 | Morita et al. | |
| 2019/0393556 A1 | 12/2019 | Matsuoka et al. | |
| 2020/0262709 A1 | 8/2020 | Suzuki et al. | |
| 2020/0335755 A1 | 10/2020 | Zhang et al. | |

FOREIGN PATENT DOCUMENTS

| | | |
|---|---|---|
| JP | 2002-025611 A | 1/2002 |
| JP | 2002-270230 A | 9/2002 |
| JP | 3529854 B2 | 5/2004 |
| JP | 3529858 B2 | 5/2004 |
| JP | 2013-175410 A | 9/2013 |
| JP | 2013-232326 A | 11/2013 |
| JP | 2015-156372 A | 8/2015 |
| JP | 2016-029668 A | 3/2016 |
| JP | 2016-085836 A | 5/2016 |
| JP | 2018-055934 A | 4/2018 |
| JP | 2018-060689 A | 4/2018 |
| JP | 2019-196306 A | 11/2019 |
| JP | 2020-061312 A | 4/2020 |
| KR | 10-2004-0010189 A | 1/2004 |
| KR | 10-2017-0047656 A | 5/2017 |
| KR | 10-2019-0062299 A | 6/2019 |
| WO | 2012/057311 A1 | 5/2012 |
| WO | 2013/062056 A1 | 5/2013 |
| WO | 2015/166620 A1 | 11/2015 |
| WO | 2016/159108 A1 | 10/2016 |
| WO | 2016/159117 A1 | 10/2016 |
| WO | 2018/169028 A1 | 9/2018 |
| WO | 2020/075866 A1 | 4/2020 |

OTHER PUBLICATIONS

Pyykko et al., "Molecular Single-Bond Covalent Radii for Elements 1-118," Chemistry A European Journal, 15: 186-197 (2009).
Walsh, "Bond Dissociation Energy Values in Silicon-Containing Compounds and Some of Their Implications," Accounts of Chemical Research, 14: 246-252 (1981).
The Chemistry of Organic Silicon Compounds, Zvi Rappoport, ed. vol. 2, Chap.4 (1998).
Decision to grant a patent issued in Japanese Patent Application No. 2021-515064 dated Jun. 15, 2021.
Decision to grant a patent issued in Japanese Patent Application No. 2021-117128 dated Sep. 14, 2021.
International Search Report issued in corresponding International Patent Application No. PCT/JP2020/034583 dated Dec. 1, 2020.
Supplementary European Search Report issued in related European Patent Application No. 20862989.9 dated Sep. 27, 2022.

* cited by examiner

Ca (m/z=40)
max 9

NONAQUEOUS ELECTROLYTE
NONAQUEOUS ELECTROLYTE SOLUTION AND NONAQUEOUS ELECTROLYTE SECONDARY BATTERY

FIELD

The present invention relates to a nonaqueous electrolyte solution and a nonaqueous secondary battery.

BACKGROUND

A nonaqueous secondary battery such as a lithium ion battery has widely been used as a power source for portable electronic devices because of its light weight, high energy and long life. In recent years, applications of the nonaqueous secondary battery have been widened to an industrial field typified by power tools such as electric tools, and in-vehicle use in electric cars and electric bicycles, and attention has also been focused on the field of a power storage field such as a residential power storage system.

A nonaqueous electrolyte solution is used as an electrolyte solution of a lithium ion battery. For example, a combination of a high-dielectric solvent such as cyclic carbonate and a low-viscosity solvent such as lower chain carbonic acid ester is commonly used. In order to form a solid electrolyte interface (SEI) on a surface of a negative electrode to thereby inhibit the reductive decomposition of the nonaqueous solvent, it is desirable to add an electrode protection additive exemplified by an organic compound such as vinylene carbonate. It is known that $LiPF_6$ commonly contained in a nonaqueous electrolyte solution reacts with a trace amount of moisture in the nonaqueous electrolyte solution to generate HF, thus efficiently forming LiF which is a structural element of a negative electrode SEI.

By the way, with the expansion of large-scale energy storage industry, especially in electric vehicles, there is a strong demand for higher energy density and quick charging function in nonaqueous secondary batteries. In recent years, development has been actively carried out to achieve high energy density by thickening the electrode using a lithium-containing metal oxide having high nickel content as a positive electrode active material. However, the big problem of quick charging remains.

PTL 1 discloses, for example, a nonaqueous secondary battery which operates on a thick film electrode with a highly ion-conductive electrolyte solution. PTL 1 also reports a method for enhancing SEI by combining a plurality of electrode protection additives. Similarly, PTL 2 also reports that a specific organolithium salt enhances SEI and inhibits the decomposition of a highly ion-conductive electrolyte solution. PTL 3 mentions that a nonaqueous electrolyte solution is allowed to contain cyclic acid anhydrides such as acetonitrile, an inorganic lithium salt and succinic anhydride to delay the generation of a gas from a nonaqueous secondary battery and to strengthen a negative electrode SEI, thus obtaining satisfactory battery characteristics. PTL 4 mentions that a nonaqueous secondary battery having excellent storage characteristics and cycle characteristics is obtained by a nonaqueous electrolyte solution containing ethylene sulfite and vinylene carbonate. PTL 5 mentions that the combination of an ethylene sulfate derivative and a vinylene carbonate derivative inhibits decomposition or composition change of a nonaqueous electrolyte solution, leading to an improvement in discharge capacity at low temperature and the storage capacity at high temperature. PTL 6 mentions a technique of adding trialkoxyvinylsilane to a nonaqueous electrolyte solution for the purposes of providing a nonaqueous secondary battery excellent in reduction of internal resistance and inhibition of battery swelling.

By the way, since high energy density and quick charging of the nonaqueous secondary battery increase the risk of battery ignition, further safety measures are required.

PTL 7 reports, for example, a silane crosslinked separator in which a silane-modified polyolefin is contained inside the separator, and when the separator comes into contact with a nonaqueous electrolyte solution, the silane crosslinking reaction of the silane-modified polyolefin proceeds to construct a silane crosslinked portion is the separator, thus achieving both low-temperature shutdown function and high-temperature fracture resistance. The silane crosslinking reaction proceeds using hydrogen fluoride (HF) generated by hydrolysis of $LiPF_6$ contained in the nonaqueous electrolyte solution as a catalyst. PTL 8 reports a silane crosslinked separator in which a silane crosslinked separator containing a trace amount of metal is used to trap an excess amount of HF which catalyzes a cleavage reaction at a silane crosslinked portion, thus improving long-term cycle characteristics of an electricity storage device.

CITATION LIST

Patent Literature

[PTL 1] WO 2013/062056 A
[PTL 2] WO 2012/057311 A
[PTL 3] WO 2018/169028 A
[PTL 4] JP 2002-25611 A
[PTL 5] JP 2016-85836 A
[PTL 6] JP 2013-175410 A
[PTL 7] WO 2020/075866 A
[PTL 8] JP 2020-61312 A

Non-Patent Literature

[NPL 1] Chem. Eur. J., 15, 186(2009)
[NPL 2] Acc. Chem. Res., 14, 246(1981)
[NPL 3] The Chemistry of Organic Silicon Compounds Vol. 2, Wiley (1998), Chap. 4

SUMMARY

Technical Problem

When a conventional nonaqueous secondary battery is quickly charged at a speed higher than the general charging speed used for electronic devices (called "quick charging"), the supply of lithium ions on the negative electrode side is not sufficient in time because of slow diffusion of lithium ions in the nonaqueous electrolyte, and the battery reaches the upper limit battery voltage, thus failing to sufficiently charge to a predetermined battery capacity.

By using the nonaqueous electrolyte solution having high ionic conductivity as mentioned in PTLs 1 to 3, lithium ion diffusion between electrodes is eliminated. However, since the coating film on the negative electrode side has low lithium ion conductivity, there was observed a phenomenon in which lithium metal is deposited on the surface of the negative electrode active material (called "electrodeposition"), thus failing to obtain satisfactory quick charging performance.

PTL 4 does not disclose acetonitrile, and even if ethylene sulfite and vinylene carbonate are added to a nonaqueous electrolyte solution using a general carbonate solvent as mentioned in the PTL, sufficient capacity cannot be obtained during quick charging. Similarly, PTL 5 does not disclose acetonitrile. Although the detailed mechanism has not been elucidated, it was found that the high-temperature durability deteriorates when ethylene sulfate and vinylene carbonate are added to a nonaqueous electrolyte solution containing acetonitrile.

In PTL 6, the use of trialkoxyvinylsilane in a mixed nonaqueous solvent of ethylene carbonate and ethyl methyl carbonate is considered, but the use of other solvents or additives is not considered.

However, the nonaqueous electrolyte solution, which is a structural element of the nonaqueous secondary battery, still has room for improvement from the viewpoint of solving the capacity reduction during quick charging.

The acetonitrile-containing nonaqueous electrolyte solution containing $LiPF_6$ as a main lithium salt has poor high-temperature durability. This is because $PF_5$ produced by the reaction of $LiPF_6$ with a trace amount of moisture in the nonaqueous electrolyte solution promotes the proton abstraction reaction at the α-position of acetonitrile in a Lewis acid catalytic manner and promotes the generation of excessive HF. An excessive amount of HF adversely affects battery performance, namely, it corrodes materials such as electrodes and current collectors to cause the decomposition of the solvent.

When the silane crosslinked separator mentioned in PTL 7 is used in combination with an acetonitrile-containing nonaqueous electrolyte solution, it is considered that the long-term cycle characteristics deteriorate because an excess amount of HF catalyzes the silane crosslinked site cleavage reaction. Further, in PTL 8, attempts are made to trap HF with a trace amount of metal, and when a trace amount of metal is used in combination with an acetonitrile-containing nonaqueous electrolyte solution, it is insufficient as a long-term HF trap function.

Further, a nonaqueous secondary battery including a separator having excellent mechanical strength is often excellent in safety, but often has high resistance. At the time of high-rate output, the moving speed of lithium ions in the separator is the rate-determining factor for output performance, so that the higher the resistance of the separator, the lower the output performance.

The present invention has been made in view of the above problems, and first, an object of the present invention is to provide an acetonitrile-containing nonaqueous electrolyte solution which can inhibit or prevent a reduction in capacity of a nonaqueous secondary battery during quick charging, and does not generate a voltage plateau, and a nonaqueous secondary battery including the same.

Second, an object of the present invention is to provide an acetonitrile-containing nonaqueous electrolyte solution in which $LiFSO_3$ is used as an HF generator and a buffer and the content thereof is adjusted to an appropriate range to inhibit excessive HF generation at high temperature. It is another object to provide an aqueous secondary battery in which, by using a separator including an island structure of aggregated calcium therein as a separator for a nonaqueous secondary battery, HF generated in the battery is trapped by the reaction with calcium, thus inhibiting excessive HF generation. It is further object to provide a nonaqueous secondary battery in which, by combining a separator having excellent mechanical strength and an acetonitrile-containing nonaqueous electrolyte solution having high ionic conductivity, the moving speed of lithium ions in the separator at high-rate output is improved, thus achieving both safety and output performance.

Third, an object of the present invention is to provide a nonaqueous secondary battery in which metal elution in a high-temperature environment is inhibited by using lithium iron phosphate having an olivine-type structure as a positive electrode active material, and an increase in resistance of the negative electrode is inhibited and high-temperature cycle performance is improved by controlling each content of acetonitrile, ethylene carbonate, vinylene carbonate and oxygen-containing sulfur compound within a predetermined range.

Solution to Problem

The present inventors have intensively studied to solve the above problems. As a result, they have found that the above problems can be solved by using a nonaqueous electrolyte solution or a nonaqueous secondary battery having the following configuration. Namely, an example of the mode of the present invention is as follows.

[1]

A nonaqueous electrolyte solution comprising:

a nonaqueous solvent containing acetonitrile and vinylene carbonate, and a compound represented by the following general formula (1):

$$R_1\text{-}A\text{-}R_2 \qquad (1)$$

wherein A represents a divalent group having a structure represented by any one of the following formulas (1-2) to (1-5):

[Chemical Formula 1]

(1-2)

(1-3)

(1-4)

(1-5)

and $R_1$ and $R_2$ each independently represent an alkyl group having 1 to 4 carbon atoms optionally substituted with an aryl group or a halogen atom; or a vinylidene group optionally substituted with a halogen atom; or an aryl group optionally substituted with an alkyl group or a halogen atom; or $R_1$ and $R_2$ are bonded to each other together with A to form a cyclic structure optionally having an unsaturated bond, wherein the total content of the vinylene carbonate and the compound represented by the general formula (1) is 0.1% by volume or more and less than 10% by volume based on the total amount of the nonaqueous solvent, and wherein the content of the vinylene carbonate is less than the content of the compound represented by the general formula (1).

[2]
The nonaqueous electrolyte solution according to item 1, wherein the content of the vinylene carbonate is 0.1 to 3.5% by volume based on the total amount of the nonaqueous solvent, and
a volume ratio of the compound represented by the general formula (1) to the vinylene carbonate is 1.5×vinylene carbonate content≤the content of the compound represented by general formula (1)≤2.4×vinylene carbonate content.

[3]
The nonaqueous electrolyte solution according to item 1 or 2, wherein the compound represented by the general formula (1) contains ethylene sulfite.

[4]
The nonaqueous electrolyte solution according to any one of items 1 to 3, further comprising a lithium salt containing $LiFSO_3$ in an amount of 200 ppm by weight or less based on the total amount of the nonaqueous electrolyte solution.

[5]
The nonaqueous electrolyte solution according to item 4, wherein the lithium salt contains a lithium-containing imide salt.

[6]
The nonaqueous electrolyte solution according to item 5, wherein the lithium salt contains the lithium-containing imide salt and $LiPF_6$ at a molar concentration satisfying: $LiPF_6$<lithium-containing imide salt.

[7]
The nonaqueous electrolyte solution according to item 5 or 6, comprising lithium bis(fluorosulfonyl)imide as the lithium-containing imide salt.

[8]
The nonaqueous electrolyte solution according to any one of items 4 to 7, wherein the content of the lithium salt is 0.1 to 40 parts by weight based on 100 parts by weight of the nonaqueous electrolyte solution.

[9]
The nonaqueous electrolyte solution according to any one of items 1 to 8, wherein the content of the acetonitrile is 5% by volume or more and 97% by volume or less based on the total amount of the nonaqueous solvent.

[10]
The nonaqueous electrolyte solution according to any one of items 1 to 9, wherein the nonaqueous solvent further contains a compound represented by the following general formula (3):

[Chemical Formula 2]

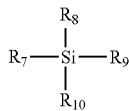

(3)

wherein $R_7$ to $R_{10}$ each independently represent an alkyl group having 1 to 4 carbon atoms, an alkoxy group having 1 to 4 carbon atoms, or a phenyl group, and are optionally substituted or may include an unsaturated bond in the carbon bond.

[11]
The nonaqueous electrolyte solution according to any one of items 1 to 10, wherein a recovery charging capacity retention rate is 90% or more in a nonaqueous secondary battery including the nonaqueous electrolyte solution.

[12]
A nonaqueous electrolyte solution comprising:
a nonaqueous solvent containing 5% by volume or more and 97% by volume or less of acetonitrile, and
a lithium salt containing $LiFSO_3$ in an amount of 200 ppm by weight or less based on the total amount of the nonaqueous electrolyte solution.

[13]
The nonaqueous electrolyte solution according to item 12, wherein the lithium salt contains a lithium-containing imide salt.

[14]
The nonaqueous electrolyte solution according to item 12 or 13, wherein the lithium salt contains the lithium-containing imide salt and $LiPF_6$ at a molar concentration satisfying: $LiPF_6$<lithium-containing imide salt.

[15]
A nonaqueous secondary battery comprising the nonaqueous electrolyte solution according to any one of items 1 to 14.

[16]
The nonaqueous secondary battery according to item 15, wherein a recovery charging capacity retention rate is 90% or more.

[17]
The nonaqueous secondary battery according to item 15 or 16, further comprising a separator, wherein one or more island structures containing calcium are detected when TOF-SIMS measurement is carried out over an area of 100 μm square of the separator, and the size of the island structure has a region of 9 μm² or more and 245 μm² or less.

[18]
The nonaqueous secondary battery according to item 17, wherein when two or more island structures containing calcium are present in the separator, both a minimum value and a maximum value of a distance between weighted centers of gravity positions of the respective island structures are 6 μm or more and 135 μm or less.

[19]
The nonaqueous secondary battery according to item 17 or 18, wherein the separator includes a substrate as a first layer, and a second layer stacked on at least one side of the substrate, wherein
a thickness ratio of the substrate to the second layer is 0.5 or more and 10 or less, and
the second layer contains at least one selected from the group consisting of ceramic, aramid resin and polyvinylidene fluoride (PVDF).

[20]
The nonaqueous secondary battery according to any one of item 17 to 19, wherein the separator contains a silane-modified polyolefin.

[21]
The nonaqueous secondary battery according to item 20, wherein a silane crosslinking reaction of the silane-modified polyolefin is initiated when the separator contacts with the electrolyte solution.

[22]
The nonaqueous secondary battery according to item 15 or 16, further comprising a separator, wherein the separator includes a substrate as a first layer, and a second layer stacked on at least one side of the substrate, and the second layer contains an aramid resin.

[23]

The nonaqueous secondary battery according to item 15 or 16, further comprising a separator, wherein the separator imparts an inorganic pigment to a substrate containing a non-woven fabric.

[24]

The nonaqueous secondary battery according to item 15 or 16, further comprising a separator, wherein the separator imparts an inorganic pigment to a substrate containing a non-woven fabric, and has a layer structure formed by overlapping a layer mainly composed of the inorganic pigment, a layer composed of a mixture of the inorganic pigment and a substrate fiber, and a layer composed mainly of the substrate fiber, in this order.

[25]

The nonaqueous secondary battery according to any one of items 15 to 24, wherein the nonaqueous electrolyte solution further comprises ethylene carbonate, and a compound having an olivine-type structure represented by formula $Li_wFePO_4$, wherein w is 0.05 to 1.1, is contained as a positive electrode active material of a positive electrode included in the nonaqueous secondary battery.

Advantageous Effects of Invention

First, according to the present invention, in a nonaqueous secondary battery including a nonaqueous electrolyte solution, an electrical resistance component propagating from the positive electrode side to the negative electrode side is blocked, and as a result, a negative electrode film having satisfactory lithium ion conductivity is retained, so that it is possible to inhibit or prevent capacity reduction during quick charging, and no voltage plateau is generated.

Second, according to the present invention, the amount of HF generated can be controlled by adjusting the content of $LiFSO_3$. Thereby, deterioration of the battery at high temperature is inhibited, and LiF which is a structural element of the negative electrode SEI is effectively formed at room temperature, and when the silane-modified polyolefin is used as the separator, crosslinking of silane can be promoted.

Further, according to the present invention, HF can be trapped by heterogeneously distributing calcium in an island structure of aggregated calcium inside the separator. Calcium is gradually consumed from the surface of the island structure, so that the effect can be maintained for a long period of time. Thereby, when the silane-modified polyolefin is used as the separator, the silane crosslinked structure can be maintained for a long period of time while inhibiting the deterioration of the battery for a long period of time.

Further, according to the present invention, it is possible to improve the moving speed of lithium ions in the separator, which is the rate-determining factor at the time of high-rate output, using acetonitrile in a nonaqueous electrolyte solution. Thereby, it is possible to provide a nonaqueous secondary battery having improved output performance without impairing the safety.

Third, according to the present invention, it is possible to provide a nonaqueous secondary battery in which metal elution in a high-temperature environment is inhibited by using lithium iron phosphate having an olivine-type structure as a positive electrode active material, and an increase in resistance of the negative electrode is inhibited and high-temperature cycle performance is improved by controlling each content of acetonitrile, ethylene carbonate, vinylene carbonate and oxygen-containing sulfur compound within a predetermined range.

DESCRIPTION OF EMBODIMENTS

Figure 1:
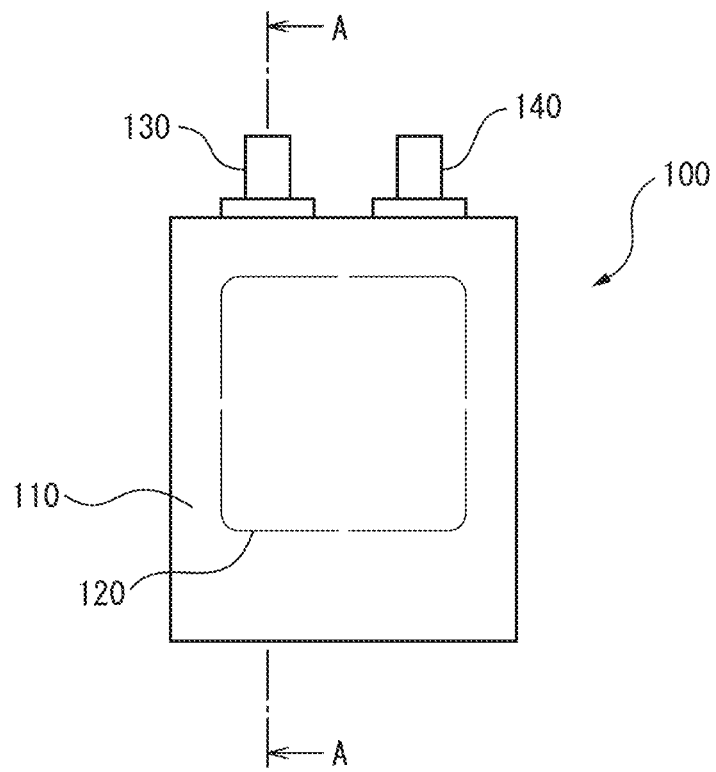
FIG. 1 is a plan view schematically illustrating an example of a nonaqueous secondary battery according to one embodiment.

Embodiments for carrying out the present invention (hereinafter simply referred to as "present embodiment") will be described in detail below. The present invention is not limited to the following embodiments, and various modifications can be made without departing from the scope of the present invention. The numerical range mentioned using "-" in the present description includes the numerical values mentioned before and after the numerical range. The "nonaqueous electrolyte solution" in the present embodiment refers to an electrolyte solution in which the content of water is 1% by weight or less based on the total amount of the nonaqueous electrolyte solution. The nonaqueous electrolyte solution in the present embodiment preferably contains as little moisture as possible, but may contain a very small amount of moisture as long as it does not interfere with the solution of the problems of the present invention. The moisture content is 300 ppm by weight or less, and preferably 200 ppm by weight or less, as the amount per total amount of the nonaqueous electrolyte solution. As long as the nonaqueous electrolyte solution has the configuration for achieving the solution of the problems of the present invention, it is possible to apply, as other structural elements, constituent materials in a known nonaqueous electrolyte solution used for a lithium ion battery by appropriately selecting them.

<<Nonaqueous Electrolyte Solution of First Embodiment>>

The nonaqueous electrolyte solution according to the present embodiment (hereinafter also simply referred to as "electrolyte solution") includes a nonaqueous solvent, an inorganic lithium salt, and an oxygen-containing sulfur compound represented by the following general formula (1):

wherein A represents a divalent group having a structure represented by any one of the following formulas (1-2) to (1-5):

[Chemical Formula 3]

(1-3)

(1-4)

(1-5)

wherein $R_1$ and $R_2$ each independently represent an alkyl group having 1 to 4 carbon atoms optionally substituted with an aryl group or a halogen atom; or a vinylidene group optionally substituted with a halogen atom; or an aryl group optionally substituted with an alkyl group or a halogen atom; or $R_1$ and $R_2$ are bonded to each other together with A to form a cyclic structure optionally having an unsaturated bond. As necessary, the nonaqueous electrolyte solution may further include compounds other than the oxygen-containing sulfur compound represented by general formula (1).

The nonaqueous electrolyte solution of the present embodiment preferably has a freezing point of lower than −40° C. The freezing point of lower than −40° C. can be controlled by the type, mixing ratio, mixing conditions, etc. of each structural element of the nonaqueous electrolyte solution, and may contribute to an improvement in discharge characteristics and the retention of discharge capacity in a low-temperature environment of the nonaqueous secondary battery (for example, discharging test at −40° C.). The structural elements of the nonaqueous electrolyte solution will be described below.

<Oxygen-Containing Sulfur Compound Represented by General Formula (1)>

In the present embodiment, it was found that, when the oxygen-containing sulfur compound represented by the above general formula (1) is contained in an appropriate amount in the nonaqueous electrolyte solution, there is a tendency to inhibit or prevent a reduction in capacity during quick charging of the nonaqueous secondary battery including a nonaqueous electrolyte solution.

The oxygen-containing sulfur compound represented by the general formula (1) has, as the group A, a divalent group having a structure represented by any one of the above formulas (1-2) to (1-5), for example, a sulfinyl group, a sulfate ester group, a sulfite ester group, a sulfonyl group, and a sulfate ion. Of these, from the viewpoint of the SEI durability and lithium ion conductivity, a divalent group having a structure represented by the formulas (1-3) and/or (1-4) is preferable, and a divalent group having a structure represented by the formula (1-3) is more preferable.

The alkyl group having 1 to 4 carbon atoms optionally substituted with an aryl group or a halogen atom represented by $R_1$ and $R_2$ is preferably an alkyl group having 1 to 4 carbon atoms optionally substituted with a phenyl group or a halogen atom. Specific examples of the alkyl group include a methyl group, an ethyl group, a propyl group, an isopropyl group and a butyl group. Examples of the aryl group as the substituent include a phenyl group, a naphthyl group and an anthranyl group, and a phenyl group is preferable. As the halogen atom serving as a substituent of the alkyl group, a fluorine atom, a chlorine atom and a bromine atom are preferable. A plurality of these substituents may be substituted with an alkyl group, or both an aryl group and a halogen atom may be substituted.

The aryl group optionally substituted with an alkyl group or a halogen atom represented by $R_1$ and $R_2$ is preferably a phenyl group, a naphthyl group and an anthranyl group which are optionally substituted with an alkyl group or a halogen atom, more preferably a phenyl group optionally substituted with an alkyl group or a halogen atom, and still more preferably a phenyl group optionally substituted with a halogen atom. Examples of the aryl group include a phenyl group, a naphthyl group and an anthranyl group, and a phenyl group is preferable. The alkyl group serving as a substituent of the aryl group is preferably an alkyl group having 1 to 4 carbon atoms, and examples thereof include a methyl group, an ethyl group, a propyl group, an isopropyl group and a butyl group. As the halogen atom serving as the substituent of the aryl group, a fluorine atom, a chlorine atom and a bromine atom are preferable. A plurality of these substituents may be substituted with an aryl group, or both an alkyl group and a halogen atom may be substituted.

Regarding $R_1$ and $R_2$, a fluorine atom, a chlorine atom and a bromine atom are preferable as the halogen atom serving as a substituent of the vinylidene group. A plurality of these substituents may be substituted with a vinylidene group, or both a vinylidene group and a halogen atom may be substituted.

The cyclic structure formed by bonding $R_1$ and $R_2$ together with A is preferably a 4- or higher-membered ring, and a 5-membered ring structure is particularly preferable. It may also have a double bond. As $R_1$ and $R_2$ bonded to each other, a divalent hydrocarbon group is preferable, and the number of carbon atoms thereof is preferably 1 to 6. Specific examples thereof include —CH$_2$—, —CH$_2$CH$_2$—, —CH$_2$CH$_2$CH$_2$—, —CH$_2$CH$_2$CH$_2$CH$_2$—, —CH$_2$CH$_2$CH$_2$CH$_2$—, —CH=CH—, —CH=CHCH$_2$—, —CH=CHCH$_2$CH$_2$—, and —CH$_2$CH=CHCH$_2$—. Further, one or more hydrogen atoms possessed by these groups may be substituted with any of an alkyl group (for example, a methyl group and an ethyl group), a halogen atom (for example, a fluorine atom, a chlorine atom and a bromine atom), and an aryl group (for example, a phenyl group). $R_1$ and $R_2$ may be the same or different from each other.

Specific examples of the oxygen-containing sulfur compound represented by the general formula (1) may be at least one selected from the group consisting of dimethyl sulfite, diethyl sulfite, dimethyl sulfoxide, sulfolane, 3-sulfolene, ethylene sulfite, propylene sulfite, 1,3-propenesultone and 1,3-propanesultone, diphenyl sulfone, phenyl vinyl sulfone, divinyl sulfone, methyl vinyl sulfone, ethyl vinyl sulfone and 1,3,2-dioxathiane 2-oxide. Of these, from the viewpoint of inhibiting or preventing a reduction in capacity during quick charging of the nonaqueous secondary battery, dimethyl sulfite, diethyl sulfite, dimethyl sulfoxide, ethylene sulfite, propylene sulfite and 1,3,2-dioxathiane 2-oxide are preferable, ethylene sulfite and/or 1,3,2-dioxathiane 2-oxide is more preferable, and ethylene sulfite is particularly preferable.

Since the negative electrode protective film derived from vinylene carbonate (VC) has high resistance, if the amount is excessive, it tends to lead to quick charging, deterioration of performance in a low-temperature environment, and swelling of the battery due to gas generation during decomposition. Ethylene sulfite has a lower minimum unoccupied molecular orbital (LUMO) level as compared with other oxygen-containing sulfur compounds, and can be reduced and decomposed at a lower potential than VC to promote the formation of a negative electrode protective film, thus making it possible to solve the problem of the negative electrode protective film derived from VC by reducing the amount of VC added. Further, the negative electrode protective film in which ethylene sulfite and VC interact with each other has low resistance in a wide temperature range and high durability against acetonitrile, so that a further synergistic effect can be expected. The present inventors have experimentally clarified that the reductive decomposition of acetonitrile cannot be inhibited only by the negative electrode protective film derived from ethylene sulfite. From this experimental fact, it is reasonable to think that ethylene sulfite and VC do not separately form a negative electrode protective film, but the previously activated ethylene sulfite reacts with VC to form a composite strong negative electrode protective film. It is considered that all the oxygen-containing sulfur compounds represented by the general formula (1) express the interaction with VC by the same mechanism.

The oxygen-containing sulfur compound represented by the general formula (1) is used alone or in combination of two or more thereof. When two or more oxygen-containing sulfur compounds are combined, the structure of the divalent group A in each compound may be the same as or different from each other.

The nonaqueous solvent according to the present embodiment contains acetonitrile and vinylene carbonate (VC), and optionally further contains, as additional components, for example, hetero and/or halogenated cyclic compounds, chain compounds, and silicon-containing compounds.

In the nonaqueous electrolyte solution according to the present embodiment, the vinylene carbonate (VC) and the oxygen-containing sulfur compound represented by the general formula (1) satisfy the following relationships (a) and (b).

(a) The total content of VC and the oxygen-containing sulfur compound represented by the general formula (1) is 0.1% by volume or more and less than 10% by volume based on the total amount of the nonaqueous solvent.

(b) The volume ratio satisfies: VC content<content of oxygen-containing sulfur compound represented by the general formula (1).

It is the condition that can be conceived to some extent by those skilled in the art that it is possible to inhibit the generation of decomposition gas due to an excess amount of VC and the oxygen-containing sulfur compound represented by the general formula (1) and the increase in internal resistance due to decomposition deposits by satisfying the above relationship (a). Meanwhile, it is not known at all that, by satisfying the above relationship (b), the true effect when the oxygen-containing sulfur compound represented by the general formula (1) is combined with VC is exhibited, and the negative electrode protective film derived from VC becomes dominant, it is possible to achieve quick charging and even performance in a low-temperature environment at a level that cannot be achieved. If the volume ratio of VC exceeds the volume ratio of the oxygen-containing sulfur compound represented by the general formula (1), the properties of the negative electrode protective film derived from VC become dominant, and even when a nonaqueous solvent contributing to high ionic conductivity, such as acetonitrile, is used, it becomes difficult to enjoy its benefits. The effect of (b) cannot be conceived from the conventional common sense that equates the roles of the oxygen-containing sulfur compound represented by the general formula (1) with VC, and it is impossible to recognize the above (b) as a discontinuous threshold value unless the environment is extremely harsh with electrodeposition like repetition of quick charging.

By satisfying the above relationships (a) and (b), the nonaqueous electrolyte solution according to the present embodiment is capable of keeping balance among the VC content that does not cause an increase in negative electrode resistance, deterioration of the battery performance during quick charging at low temperature (particularly −40° C.) and gas generation, the content of oxygen-containing sulfur compound represented by the general formula (1) that does not cause a reduction in battery capacity, and VC and the content of the oxygen-containing sulfur compound represented by the general formula (1) that stabilize the battery by SEI formation. From this point of view, it is preferable that VC and the oxygen-containing sulfur compound represented by the general formula (1) further satisfy at least one of the following relationships (c) and (d).

(c) The volume ratio satisfies: 1.5×VC content≤the content of the oxygen-containing sulfur compound represented by the general formula (1)≤2.4×VC content.

(d) The VC content is 0.1 to 3.5% by volume, 0.2 to 3% by volume, or 0.3 to 2.5% by volume based on the total amount of the nonaqueous solvent.

By satisfying the above relationship (c), the problem peculiar to acetonitrile can be solved. In order to inhibit the reductive decomposition of acetonitrile, it is also necessary to prevent the presence of the negative electrode protective film derived from the oxygen-containing sulfur compound represented by the general formula (1) alone. For example, when considering the number of moles of ethylene sulfite and VC, the number of moles of ethylene sulfite, which is a volume ratio of 1.5×VC content, is 1.25 times that of VC. That is, the number of moles is always larger than that of VC. The number of moles of ethylene sulfite, which is a volume ratio of 2.4×VC content, is twice that of VC. That is, it corresponds to the case where ethylene sulfite reacts with both terminals of VC. When the volume ratio of the VC and the oxygen-containing sulfur compound represented by the general formula (1) falls within a range of (c), the possibility of inhibiting a single film of VC, which causes the deterioration reaction of acetonitrile, and the oxygen-containing sulfur compound represented by the general formula (1) increases.

By satisfying the relationship (d), the minimum required amount of the negative electrode protective coating is guaranteed. From the fact that the reductive decomposition of acetonitrile could not be inhibited only by the negative electrode protective film derived from ethylene sulfite, it is considered that the main component of the negative electrode protective film is persistently VC. The negative electrode protective film is strengthened by the interaction of the oxygen-containing sulfur compound represented by the general formula (1) with VC, and the negative electrode can be reliably protected before the start of the reductive decomposition of acetonitrile when the VC content is within the above range (d).

Regarding the nonaqueous secondary battery including the nonaqueous electrolyte according to the first embodiment, from the viewpoint of inhibiting or preventing a reduction in capacity during quick charging and generating no voltage plateau, the nonaqueous electrolyte solution preferably contains, in addition to the oxygen-containing sulfur compound represented by the formula (1), a lithium salt containing $LiFSO_3$ in an amount of 200 ppm by weight or less based on the total amount of the nonaqueous electrolyte solution. As mentioned below, the voltage plateau suggests electrodeposition. Since an appropriate amount of $LiFSO_3$ inhibits the generation of HF, an excess amount of LiF, which is a reaction product of HF, is also inhibited. As a result, an increase in internal resistance can be inhibited.

<<Nonaqueous Electrolyte Solution of Second Embodiment>>

The nonaqueous electrolyte solution according to the present embodiment contains:

a nonaqueous solvent containing acetonitrile, and a lithium salt containing $LiFSO_3$ in an amount of 200 ppm by weight or less based on the total amount of the nonaqueous electrolyte solution.

In the nonaqueous electrolyte solution of the present embodiment, it is preferable that the lithium salt contains a lithium-containing imide salt from the viewpoint of inhibiting a decrease in ionic conductivity at low temperature (for example, −10° C.).

The nonaqueous electrolyte solution of the present embodiment contains lithium hexafluorophosphate (abbreviation: $LiPF_6$) and a lithium-containing imide salt, and the content thereof preferably satisfies: $LiPF_6$<lithium-containing imide salt from the viewpoint of inhibiting the association of the lithium salt and acetonitrile at low temperature (for example, −10° C.) and the low-temperature cycle characteristics of the battery.

In the nonaqueous electrolyte solution of the present embodiment, from the viewpoint of inhibiting reduction of ionic conductivity at low temperature (for example, −10° C.), the lithium-containing imide salt preferably contains lithium bis(fluorosulfonyl)imide (abbreviation: LiFSI).

The nonaqueous electrolyte solution of the present embodiment may further contain additives other than the above.

<<Nonaqueous Electrolyte Solution of Third Embodiment>>

The nonaqueous electrolyte solution according to the present embodiment includes a nonaqueous solvent containing acetonitrile, ethylene carbonate and vinylene carbonate, and oxygen-containing sulfur compound represented by the general formula (1).

The nonaqueous electrolyte solution of the present embodiment may further contain additives other than the above.

The nonaqueous solvent according to the present embodiment preferably contains an oxygen-containing sulfur represented by the general formula (1), ethylene carbonate and vinylene carbonate from the viewpoint of inhibiting an increase in internal resistance and the amount of gas amount when the charging/discharging cycle is repeated in a high-temperature environment.

The constituent features of the first embodiment, the second embodiment and the third embodiment can be combined or compatible with each other. The configuration common to the first embodiment, the second embodiment and the third embodiment, or a preferable configuration will be described below.

<Nonaqueous Solvent>

The "nonaqueous solvent" in the present embodiment means an element in which the lithium salt and various additives are removed from the nonaqueous electrolyte solution. Acetonitrile is contained as the nonaqueous solvent of the present embodiment. Since the nonaqueous solvent contains acetonitrile, the ionic conductivity of the nonaqueous electrolyte solution is improved, thus making it possible to enhance the diffusivity of lithium ions in the battery. Therefore, when the nonaqueous electrolyte solution contains acetonitrile, in a positive electrode in which the positive electrode active material layer is thickened to increase the filling amount of the positive electrode active material, it becomes possible for lithium ions to satisfactorily reach the region in the vicinity of the current collector where lithium ions hardly reach during high-load discharging. Therefore, it becomes possible to draw out a sufficient capacity even during high-load discharging, thus making it possible to obtain a nonaqueous secondary battery having excellent load characteristics.

When the nonaqueous solvent contains acetonitrile, it is possible to enhance quick charging characteristics of the nonaqueous secondary battery. In constant current (CC)-constant voltage (CV) charging of a nonaqueous secondary battery, the capacity per unit time during the CC charging period is larger than the charging capacity per unit time during the CV charging period. When acetonitrile is used as the nonaqueous solvent of the nonaqueous electrolyte solution, the area capable of CC charging can be increased (CC charging time can be extended) and the charging current can also be increased. Therefore, it is possible to significantly reduce the time required to fully charge the battery from the start of charging the nonaqueous secondary battery.

Since acetonitrile is excellent in thermal conductivity as compared with a general carbonate solvent, it has the effect of uniformly diffusing the heat rise during the nail penetration test throughout the battery and alleviating the heat shrinkage of the separator. Therefore, by containing acetonitrile in the nonaqueous solvent, a nonaqueous secondary battery having excellent safety can be obtained.

Acetonitrile easily undergoes electrochemical reductive decomposition. Therefore, when acetonitrile is used, it is preferable to use acetonitrile as a nonaqueous solvent in combination with other solvents (for example, aprotic solvents other than acetonitrile) and/or to add an electrode protection additive for forming a protective film on the electrode.

The content of acetonitrile is preferably 5% by volume or more and 97% by volume or less as the amount per total amount of the nonaqueous solvent. The content of acetonitrile is more preferably 8% by volume or more or 10% by volume or more, and still more preferably 15% by volume or more, as the amount per total amount of the nonaqueous solvent. This value is yet more preferably 85% by volume or less, and further preferably 66% by volume or less. When the content of acetonitrile is 5% by volume or more per total amount of the nonaqueous solvent, the ionic conductivity tends to increase, thus making it possible to exhibit high-output characteristics, and also the dissolution of the lithium salt can be promoted. Since the below-mentioned additives inhibit an increase in internal resistance of the battery, when the content of acetonitrile in the nonaqueous solvent is within the above range, there is a tendency that high-temperature cycle characteristics and other battery characteristics can be further improved while maintaining excellent performance.

Examples of the solvent contained in the nonaqueous solvent of the present embodiment include alcohols such as methanol and ethanol; and aprotic solvents. Of these, an aprotic solvent is preferable as the nonaqueous solvent. The nonaqueous solvent may contain a solvent other than the aprotic solvent as long as it does not hinder the solution of the problem of the present invention.

Examples of the aprotic solvent other than acetonitrile include cyclic carbonate, fluoroethylene carbonate, lactone, organic compound containing a sulfur atom, chain fluorinated carbonate, cyclic ether, mononitrile other than acetonitrile, alkoxy group-substituted nitrile, dinitrile, cyclic nitrile, short-chain fatty acid ester, chain ether, fluorinated ether, ketone, and a compound in which H atoms of the aprotic solvent are partially or entirely substituted with a halogen atom.

Examples of the cyclic carbonate include ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, vinylene carbonate, 4,5-dimethylvinylene carbonate and vinyl ethylene carbonate;

examples of the fluoroethylene carbonate include 4-fluoro-1,3-dioxolan-2-one, 4,4-difluoro-1,3-dioxolan-2-one, cis-4,5-difluoro-1,3-dioxolan-2-one, trans-4,5-difluoro-1,3-dioxolan-2-one, 4,4,5-trifluoro-1,3-dioxolan-2-one, 4,4,5,5-tetrafluoro-1,3-dioxolan-2-one and 4,4,5-trifluoro-5-methyl-1,3-dioxolan-2-one;

examples of the lactone include γ-butyrolactone, α-methyl-γ-butyrolactone, γ-valerolactone, γ-caprolactone, δ-valerolactone, δ-caprolactone and ε-caprolactone;

examples of the organic compound containing a sulfur atom include ethylene sulfite, propylene sulfite, butylene sulfite, pentene sulfite, sulfolane, 3-sulfolene, 3-methyl sulfolane, 1,3-propane sultone, 1,4-butane sultone, 1-propene 1,3-sultone, dimethyl sulfoxide, tetramethylene sulfoxide and ethylene glycol sulfite;

examples of the chain carbonate include ethyl methyl carbonate, dimethyl carbonate, diethyl carbonate, methyl propyl carbonate, methyl isopropyl carbonate, dipropyl carbonate, methyl butyl carbonate, dibutyl carbonate, ethyl propyl carbonate;

examples of the cyclic ether include tetrahydrofuran, 2-methyltetrahydrofuran, 1,4-dioxane and 1,3-dioxane;

examples of the mononitrile other than acetonitrile include propionitrile, butyronitrile, valeronitrile, benzonitrile and acrylonitrile;

examples of the alkoxy group-substituted nitrile include methoxyacetonitrile and 3-methoxypropionitrile;

examples of the dinitrile include malononitrile, succinonitrile, methylsuccinonitrile, glutaronitrile, 2-methylglutaronitrile, adiponitrile, 1,4-dicyanoheptane, 1,5-dicyanopentane, 1,6-dicyanohexane, 1,7-dicyanoheptane, 2,6-dicyanoheptane, 1,8-dicyanooctane, 2,7-dicyanooctane, 1,9-dicyanononane, 2,8-dicyanononane, 1,10-dicyanodecane, 1,6-dicyanodecane and 2,4-dimethylglutaronitrile, ethylene glycol bis(propionitrile)ether;

examples of the cyclic nitrile include benzonitrile;

examples of the short-chain fatty acid ester include methyl acetate, methyl propionate, methyl isobutyrate, methyl butyrate, methyl isovalerate, methyl valerate, methyl pivalate, methyl hydroangelate, methyl caproate, ethyl acetate, ethyl propionate, ethyl isobutyrate, ethyl butyrate, ethyl isovalerate, ethyl valerate, ethyl pivalate, ethyl hydroangelate, ethyl caproate, propyl acetate, propyl propionate, propyl isobutyrate, propyl butyrate, propyl isovalerate, propyl valerate, propyl pivalate, propyl hydroangelate, propyl caproate, isopropyl acetate, isopropyl propionate, isopropyl isobutyrate, isopropyl butyrate, isopropyl isovalerate, isopropyl valerate, isopropyl pivalate, isopropyl hydroangelate, isopropyl caproate, butyl acetate, butyl propionate, butyl isobutyrate, butyl butyrate, butyl isovalerate, butyl valerate, butyl pivalate, butyl hydroangelate, butyl caproate, isobutyl acetate, isobutyl propionate, isobutyl isobutyrate, isobutyl butyrate, isobutyl isovalerate, isobutyl valerate, isobutyl pivalate, isobutyl hydroangelate, isobutyl caproate, tert-butyl acetate, tert-butyl propionate, tert-butyl isobutyrate, tert-butyl butyrate, tert-butyl isovalerate, tert-butyl valerate, tert-butyl pivalate, tert-butyl hydroangelate and tert-butyl caproate;

examples of the chain ether include dimethoxyethane, diethyl ether, 1,3-dioxolane, diglyme, triglyme and tetraglyme;

examples of the fluorinated ether include compounds represented by the general formula $Rf_{aa}$—$OR_{bb}$, wherein $Rf_{aa}$ is an alkyl group containing a fluorine atom, and $R_{bb}$ is an organic group optionally containing a fluorine atom;

examples of the ketone include acetone, methyl ethyl ketone and methyl isobutyl ketone; and examples of the compound in which H atoms of the aprotic solvent are partially or entirely substituted with a halogen atom include a compound in which a halogen atom is fluorine.

Here, examples of the fluorinated product of the chain carbonate include methyl trifluoroethyl carbonate, trifluorodimethyl carbonate, trifluorodiethyl carbonate, trifluoroethyl methyl carbonate, methyl 2,2-difluoroethyl carbonate, methyl 2,2,2-trifluoroethyl carbonate and methyl 2,2,3,3-tetrafluoropropyl carbonate. The fluorinated chain carbonate can be represented by the following general formula:

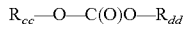

$R_{cc}$—O—C(O)O—$R_{dd}$ wherein $R_{cc}$ and $R_{dd}$ are at least one selected from the group consisting of $CH_3$, $CH_2CH_3$, $CH_2CH_2CH_3$, $CH(CH_3)_2$, and the formula $CH_2Rf_{ee}$, in which $Rf_{ee}$ is alkyl group having 1 to 3 carbon atoms in which a hydrogen atom is substituted with at least one fluorine atom, and $R_{cc}$ and/or $R_{dd}$ contain at least one fluorine atom.

Examples of the fluorinated product of the short-chain fatty acid ester include fluorinated short-chain fatty acid esters typified by 2,2-difluoroethyl acetate, 2,2,2-trifluoroethyl acetate and 2,2,3,3-tetrafluoropropyl acetate. The fluorinated short-chain fatty acid ester can be represented by the following general formula:

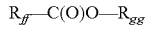

$R_{ff}$—C(O)O—$R_{gg}$ wherein $R_{ff}$ is at least one selected from the group consisting of $CH_3$, $CH_2CH_3$, $CH_2CH_2CH_3$, $CH(CH_3)_2$, $CF_3CF_2H$, $CFH_2$, $CF_2H$, $CF_2Rf_{hh}$, $CFHRf_{hh}$ and $CH_2Rf_{ii}$, $R_{gg}$ is at least one selected from the group consisting of $CH_3$, $CH_2CH_3$, $CH_2CH_2CH_3$, $CH(CH_3)_2$ and $CH_2Rf_{ii}$, $Rf_{hh}$ is an alkyl group having 1 to 3 carbon atoms in which a hydrogen atom may be substituted with at least one fluorine atom, $Rf_{ii}$ is an alkyl group having 1 to 3 carbon atoms in which a hydrogen atom is substituted with at least one fluorine atom, and $R_{ff}$ and/or $R_{gg}$ contain at least one fluorine atom, and when $R_{ff}$ is $CF_2H$, $R_{gg}$ is not $CH_3$.

The aprotic solvent other than acetonitrile in the present embodiment can be used alone, or two or more thereof may be used in combination.

It is preferable to use, as the nonaqueous solvent in the present embodiment, one or more of cyclic carbonate and chain carbonate in combination with acetonitrile from the viewpoint of improving the stability of the nonaqueous electrolyte solution. From this point of view, it is more preferable to use, as the nonaqueous solvent in the present embodiment, cyclic carbonate in combination with acetonitrile, and still more preferable to use both cyclic carbonate and chain carbonate in combination with acetonitrile.

When the cyclic carbonate is used together with acetonitrile, it is particularly preferable that the cyclic carbonate includes ethylene carbonate, vinylene carbonate and/or fluoroethylene carbonate.

It is preferable that the nonaqueous solvent further contains, as an additional component, for example, a silicon-containing compound from the viewpoints of the ionic conductivity of the nonaqueous electrolyte solution, coagulation resistance at low temperature, and inhibition of gas generation.

The silicon-containing compound contained in the nonaqueous solvent is preferably a compound represented by the following general formula (3):

[Chemical Formula 4]

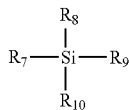

(3)

wherein $R_7$ to $R_{10}$ each independently represent an alkyl group having 1 to 4 carbon atoms, an alkoxy group having 1 to 4 carbon atoms, or a phenyl group, and may have a substituent, and may include an unsaturated bond in the carbon bond. The content of the compound represented by the general formula (3) is preferably 0.01 to 1 part by weight based on 100 parts by weight of the nonaqueous electrolyte solution.

Regarding the groups $R_7$ to $R_{10}$ in the general formula (3), as an alkyl group having 1 to 4 carbon atoms, a methyl group, an ethyl group, an n- or iso-propyl group, and n-, sec-, iso- or tert-butyl group may be selected, and a methoxy group, an ethoxy group, etc. may be selected as the alkoxy group having 1 to 4 carbon atoms. Further, the groups $R_7$ to $R_{10}$ may be groups derived by adding a substituent to an alkyl group or an alkoxy group having 1 to 4 carbon atoms or incorporating an unsaturated bond into the carbon bond.

Specific examples of the compound represented by the general formula (3) are at least one selected from the group consisting of allyltrimethylsilane, allyltriethylsilane, triethoxymethylsilane, triethoxyvinylsilane, and compounds in which at least one of $R_7$ to $R_{10}$ is a phenyl group.

<Lithium Salt>

The lithium salt in this embodiment contains $LiFSO_3$. It is presumed that $HFSO_3$ produced by cation exchange of $LiFSO_3$ with proton generates HF by the following equilibrium reaction (1):

[Chemical Formula 5]

(1)

so that $LiFSO_3$ in the present invention reacts with a trace amount of moisture in a nonaqueous electrolyte solution to generate HF.

When the nonaqueous electrolyte solution containing acetonitrile contains $LiPF_6$ as a lithium salt, it is presumed that $LiFSO_3$ traps excess HF by the following equilibrium reaction (2):

[Chemical Formula 6]

(2)

Since it is difficult for the equilibrium reaction (1) to proceed to the right under the conditions of the presence of excessive HF, it is less likely to cause a reaction in which $HFSO_3$ generated by the equilibrium reaction (2) generate HF again.

HF generated by the equilibrium reaction effectively forms LiF, which is a structural element of the negative electrode SEI, and also serves as a catalyst for advancing the silane crosslinking reaction when a silane-modified polyolefin is used as the separator.

The content of $LiFSO_3$ in the present invention is more than 0 ppm by weight, preferably 0.1 ppm by weight or more, more preferably 1 ppm by weight or more, and still more preferably 10 ppm by weight or more, based on the total amount of the nonaqueous electrolyte solution. The content of $LiFSO_3$ is preferably 200 ppm by weight or less, more preferably 150 ppm by weight or less, and still more preferably 100 ppm by weight or less, based on the total amount of the nonaqueous electrolyte solution. By adjusting the content of $LiFSO_3$ within the above range, the amount of HF generated can be adjusted to an appropriate range, thus making it possible to efficiently form LiF, which is a structural element of the negative electrode SEI and to advance the silane crosslinking reaction of the silane-modified polyolefin while inhibiting the generation of excessive HF at high temperature. Further, if the content of $LiFSO_3$ is too large, it is presumed that the internal resistance increases because it is reduced and decomposed at the negative electrode and deposited on the surface of the negative electrode, or an excessive amount of LiF is generated by increasing the amount of HF and deposited on the surface of the negative electrode. Therefore, it is preferable to adjust the content of $LiFSO_3$ within the above range from the viewpoint of inhibiting deterioration of battery performance such as output performance.

A commercially available product may be purchased and used as $LiFSO_3$, or it may be synthesized and used based on known literature. For example, $LiFSO_3$ can be synthesized by the method mentioned in JP 2019-196306 A.

When LiFSI is used as the lithium salt, a given amount of $LiFSO_3$ is often contained as starting material impurities. As a method for adjusting the content of $LiFSO_3$ in the present invention, for example, LiFSI is dissolved in a nonaqueous solvent and a molecular sieve is added to the mixed solution, and then the solution is left for a given period of time to reduce $LiFSO_3$. Thereafter, the content of $LiFSO_3$ in the mixed solution is confirmed and it is acceptable if the content is within the concentration range of the present invention. If the content is too large, the contact time with the molecular sieve is extended, and if it is too small, the contact time with the molecular sieve is shortened. A commercially available product may be used as the molecular sieve, or a synthetic product may be used. After adding the molecular sieve, the mixed solution may be heated or stirred as appropriate.

The lithium salt in the present embodiment contains preferably a lithium-containing imide salt, and more preferably a lithium-containing imide salt represented by the formula $LiN(SO_2C_mF_{2m+1})_2$, wherein m is an integer of 0 to 8.

The lithium salt in the present embodiment may further contain one or more selected from a fluorine-containing inorganic lithium salt, an organic lithium salt and other lithium salts, together with the lithium-containing imide salt.

The content of the lithium salt is preferably 0.1 to 40 parts by weight, and more preferably 0.2 to 38 parts by weight, 0.5 to 36 parts by weight, or 1 to 35 parts by weight, based on 100 parts by weight of the nonaqueous electrolyte solution from the viewpoint of maintaining the ionic conductivity of the nonaqueous electrolyte solution and the charging/discharging efficiency of the nonaqueous secondary battery.

(Lithium-Containing Imide Salt)

The lithium-containing imide salt preferably contains at least one of $LiN(SO_2F)_2$ and $LiN(SO_2CF_3)_2$. This is because a reduction in ionic conductivity in a low-temperature range such as −10° C. or −30° C. can be effectively inhibited, and excellent low-temperature characteristics can be obtained.

The saturation concentration of the lithium-containing imide salt with respect to acetonitrile is higher than that of $LiPF_6$. Since the association and precipitation of the lithium salt and the acetonitrile can be inhibited at low temperature, the lithium salt preferably contains the lithium-containing imide salt at a molar concentration satisfying: $LiPF_6$<lithium-containing imide salt. From the viewpoint of securing the amount of ions supplied to the nonaqueous electrolyte solution according to the present embodiment, the content of the lithium-containing imide salt is preferably 0.5 mol or more and 3.0 mol or less per 1 L of the nonaqueous solvent.

By adjusting the content of the lithium-containing imide salt, it is possible to more effectively inhibit an increase in resistance during high-temperature heating.

(Fluorine-Containing Inorganic Lithium Salt)

The lithium salt in the present embodiment may contain a fluorine-containing inorganic lithium salt. Here, "fluorine-containing inorganic lithium salt" refers to a lithium salt which does not contain a carbon atom in anions, but contains a fluorine atom in anions and is soluble in acetonitrile. The fluorine-containing inorganic lithium salt forms a passivation film on a surface of a positive electrode current collector, thus making it possible to inhibit corrosion of the positive electrode current collector.

Examples of the fluorine-containing inorganic lithium salt include $LiPF_6$, $LiBF_4$, $LiAsF_6$, $Li_2SiF_6$, $LiSbF_6$, and a lithium salt represented by $Li_2B_{12}F_bH_{12-b}$, wherein b is an integer of 1 to 3, and one or more selected from these salts can be used.

As the fluorine-containing inorganic lithium salt, a compound which is a double salt of LiF and Lewis acid is desirable, and of these, a fluorine-containing inorganic lithium salt containing a phosphorus atom is more preferable because it facilitates the release of free fluorine atoms. A typical fluorine-containing inorganic lithium salt is $LiPF_6$, which is dissolved to release $PF_6$ anions. When a fluorine-containing inorganic lithium salt containing a boron atom is used as the fluorine-containing inorganic lithium salt, it is preferable because it is easy to capture an excess free acid component, and from such a point of view, $LiBF_4$ is preferable.

The acetonitrile-containing nonaqueous electrolyte solution containing $LiPF_6$ as a main lithium salt has poor high-temperature durability. This is because $PF_5$ produced by the reaction of $LiPF_6$ with a trace amount of moisture in the nonaqueous electrolyte solution promotes the proton abstraction reaction at the α-position of acetonitrile in a Lewis acid catalytic manner and promotes the generation of excessive HF. The amount of HF generated at that time exceeds the HF buffering capacity of $LiFSO_3$, and it is difficult to obtain sufficient high-temperature durability. Therefore, the lithium salt preferably contains $LiPF_6$ at a molar concentration satisfying: $LiPF_6$<lithium-containing imide salt. When the content of $LiPF_6$ is within the above range, it is possible to inhibit excessive HF generation exceeding the HF buffering capacity of $LiFSO_3$.

The content of the fluorine-containing inorganic lithium salt in the nonaqueous electrolyte solution according to the present embodiment is preferably 0.01 mol or more, more preferably 0.1 mol or more, and still more preferably 0.25 mol or more, per 1 L of the nonaqueous solvent. When the content of the fluorine-containing inorganic lithium salt is within the above range, the ionic conductivity tends to increase and high-output characteristics tend to be exhibited. The amount per 1 L of the nonaqueous solvent is preferably 2.8 mol or less, more preferably 1.5 mol or less, and still more preferably 1.0 mol or less. When the content of the fluorine-containing inorganic lithium salt is within the above range, the ionic conductivity tends to increase and high-output characteristics can be exhibited, and deterioration of the ionic conductivity due to an increase in viscosity at low temperature tends to be inhibited. Moreover, the high-temperature cycle characteristics and other battery characteristics tend to be further improved while maintaining excellent performance of the nonaqueous electrolyte solution.

The content of the fluorine-containing inorganic lithium salt in the nonaqueous electrolyte solution according to the present embodiment may be, for example, 0.05 mol or more and 1.0 mol or less as the amount per 1 L of the nonaqueous solvent.

(Organolithium Salt)

The lithium salt in the present embodiment may contain an organolithium salt. The "organolithium salt" refers to a lithium salt other than an imide salt, which contains a carbon atom as anions and is soluble in acetonitrile.

Examples of the organolithium salt include an organolithium salt having an oxalic acid group. Specific examples of the organolithium salt having an oxalic acid group include organolithium salts represented by $LiB(C_2O_4)_2$, $LiBF_2(C_2O_4)$, $LiPF_4(C_2O_4)$ and $LiPF_2(C_2O_4)_2$, respectively. Of these, at least one lithium salt selected from the lithium salts represented by $LiB(C_2O_4)_2$ and $LiBF_2(C_2O_4)$ is preferable. It is more preferable to use one or more of these salts together with a fluorine-containing inorganic lithium salt. The organolithium salt having an oxalic acid group may be added to the nonaqueous electrolyte solution or contained in a negative electrode (negative electrode active material layer).

The amount of the organolithium salt added to the nonaqueous electrolyte solution in the present embodiment is preferably 0.005 mol or more, more preferably 0.01 mol or more, still more preferably 0.02 mol or more, and particularly preferably 0.05 mol or more, per 1 L of the nonaqueous solvent, from the viewpoint of ensuring better effects due to its use. However, if the amount of the organolithium salt having an oxalic acid group in the nonaqueous electrolyte solution is too large, it may precipitate. Therefore, the amount of the organolithium salt having an oxalic acid group added to the nonaqueous electrolyte solution is preferably less than 1.0 mol, more preferably less than 0.5 mol, and still more preferably less than 0.2 mol, as the amount per 1 L of the nonaqueous solvent.

The organolithium salt having an oxalic acid group is known to be poorly soluble in organic solvents having low polarity, especially chain carbonates. The content of the organolithium salt in the nonaqueous electrolyte solution according to the present embodiment may be, for example, 0.01 mol or more and 0.5 mol or less as the amount per 1 L of the nonaqueous solvent.

The organolithium salt having an oxalic acid group sometimes contains a trace amount of lithium oxalate, and sometimes reacts with a trace amount of moisture contained in other starting materials when mixed as a nonaqueous electrolyte solution, thus generating a new white precipitate of lithium oxalate. Therefore, the content of lithium oxalate in the nonaqueous electrolyte solution according to the present embodiment is preferably adjusted within a range of 500 ppm or less.

(Other Lithium Salts)

The lithium salt in the present embodiment may contain other lithium salts, in addition to the above lithium salts. Specific examples of other lithium salts include:

inorganic lithium salts containing no fluorine atom in anions, such as $LiClO_4$, $LiAlO_4$, $LiAlCl_4$, $LiB_{10}Cl_{10}$ and chloroborane Li;

organolithium salts such as $LiCF_3SO_3$, $LiCF_3CO_2$, $Li_2C_2F_4(SO_3)_2$, $LiC(CF_3SO_2)_3$, $LiCnF_{(2n+1)}SO_3$, wherein n≥2, lower aliphatic carboxylic acid Li, tetraphenylboric acid Li and $LiB(C_3O_4H_2)_2$;

organolithium salts represented by $LiPF_n(C_pF_{2p+1})_{6-n}$, wherein n is an integer of 1 to 5, and p is an integer of 1 to 8, such as $LiPF_5(CF_3)$;

organolithium salts represented by $LiBF_q(C_sF_{2s+1})_{4-q}$, wherein q is an integer of 1 to 3, and s is an integer of 1 to 8, such as $LiBF_3(CF_3)$;

lithium salts bonded to polyvalent anions;
organolithium salts represented by:
the following formula (XXa):

$$LiC(SO_2R_{jj})(SO_2R_{kk})(SO_2R_{ll}) \quad (XXa)$$

wherein $R_{jj}$, $R_{kk}$, and $R_{ll}$ may be the same or different and represent a perfluoroalkyl group having 1 to 8 carbon atoms, the following formula (XXb):

$$LiN(SO_2OR_{mm})(SO_2OR_{nn}) \quad (XXb)$$

wherein $R_{mm}$ and $R_{nn}$ may be the same or different and represent a perfluoroalkyl group having 1 to 8 carbon atoms, and
the following formula (XXc):

$$LiN(SO_2R_{oo})(SO_2OR_{pp}) \quad (XXc)$$

wherein $R_{oo}$ and $R_{pp}$ may be the same or different and represent a perfluoroalkyl group having 1 to 8 carbon atoms, and one or more of these salts can be used together with the fluorine-containing inorganic lithium salt.

The amount of the other lithium salt added to the nonaqueous electrolyte solution may be appropriately set within a range of 0.01 mol or more and 0.5 mol or less as an amount per 1 L of the nonaqueous solvent.

<Electrode Protection Additives>

The nonaqueous electrolyte solution according to the present embodiment may contain an additive for protecting the electrode (electrode protection additive). The electrode protection additive may substantially overlap with a substance (i.e., the nonaqueous solvent mentioned above) which serves as a solvent for dissolving the lithium salt. The electrode protection additive is preferably a substance which contributes to an improvement in performance of the nonaqueous electrolyte solution and the nonaqueous secondary battery, but also contains a substance which is not directly involved in the electrochemical reaction.

Specific examples of the electrode protection additive include:

fluoroethylene carbonates typified by 4-fluoro-1,3-dioxolan-2-one, 4,4-difluoro-1,3-dioxolan-2-one, cis-4,5-difluoro-1,3-dioxolan-2-one, trans-4,5-difluoro-1,3-dioxolan-2-one, 4,4,5-trifluoro-1,3-dioxolan-2-one, 4,4,5,5-tetrafluoro-1,3-dioxolan-2-one and 4,4,5-trifluoro-5-methyl-1,3-dioxolan-2-one;

unsaturated bond-containing cyclic carbonates typified by vinylene carbonate, 4,5-dimethylvinylene carbonate and vinylethylene carbonate;

lactones typified by γ-butyrolactone, γ-valerolactone, γ-caprolactone, δ-valerolactone, δ-caprolactone and ε-caprolactone;

cyclic ethers typified by 1,4-dioxane; and cyclic sulfur compounds typified by ethylene sulfite, propylene sulfite, butylene sulfite, pentene sulfite, sulfolane, 3-sulfolene, 3-methyl sulfolane, 1,3-propane sultone, 1,4-butane sultone, 1-propene 1,3-sultone and tetramethylene sulfoxide. These electrode protection additives are used alone, or in combination of two or more thereof.

The content of the electrode protection additive in the nonaqueous electrolyte solution is preferably 0.1 to 30% by volume, more preferably 0.3 to 15% by volume, still more preferably 0.4 to 8% by volume, and particularly preferably 0.5 to 4% by volume, as the amount per total amount of the nonaqueous solvent.

In the present embodiment, the larger the content of the electrode protection additive, the more deterioration of the nonaqueous electrolyte solution can be inhibited. However, the smaller the content of the electrode protection additive, the more high-output characteristics of the nonaqueous secondary battery in a low-temperature environment is improved. Therefore, by adjusting the content of the electrode protection additive within the above range, it tends to be possible to exhibit excellent performance based on high ionic conductivity of the electrolyte solution without impairing the basic function as a nonaqueous secondary battery. By preparing a nonaqueous electrolyte solution with such a composition, it tends to be possible to further improve the cycle performance of the nonaqueous secondary battery, high-output performance in a low-temperature environment, and other battery characteristics.

Acetonitrile easily undergoes electrochemical reductive decomposition. Therefore, the nonaqueous solvent containing acetonitrile preferably contains, as the electrode protection additive for forming SEI on the negative electrode, one or more cyclic aprotic polar solvents, and more preferably one or more unsaturated bond-containing cyclic carbonates.

The unsaturated bond-containing cyclic carbonate is preferably vinylene carbonate, and the content of vinylene carbonate is preferably 0.1% by volume or more and 3.5% by volume or less, more preferably 0.2% by volume or more and 3% by volume or less, and still more preferably 0.3% by volume or more and 2.5% by volume or less, based on the total amount of the nonaqueous solvent in the nonaqueous electrolyte solution. As a result, the low-temperature durability can be more effectively improved, thus making it possible to provide a secondary battery having excellent low-temperature performance.

The vinylene carbonate as the electrode protection additive inhibits the reductive decomposition reaction of acetonitrile on a surface of the negative electrode. Meanwhile, excessive film formation causes deterioration of low-temperature performance. Therefore, by adjusting the amount of vinylene carbonate added within the above range, the interface (film) resistance can be inhibited to a low level, thus making it possible to inhibit cycle deterioration at low temperature.

<Acid Anhydride>

The nonaqueous secondary battery according to the present embodiment is stabilized by partially decomposing the nonaqueous electrolyte solution at the time of initial charging to form an SEI on a surface of a negative electrode. An acid anhydride can be added to enhance this SEI more effectively. When acetonitrile is contained as a nonaqueous solvent, the strength of the SEI tends to decrease as the temperature rises, but the addition of the acid anhydride promotes the enhancement of the SEI. Therefore, use of the acid anhydride enables effective inhibition of an increase in internal resistance over time due to thermal history.

Specific examples of the acid anhydride include chain acid anhydrides typified by acetic anhydride, propionic anhydride and benzoic anhydride; cyclic acid anhydrides typified by malonic anhydride, succinic anhydride, glutaric anhydride, maleic anhydride, phthalic anhydride, 1,2-cyclohexanedicarboxylic anhydride, 2,3-naphthalenedicarboxylic anhydride or naphthalene-1,4,5,8-tetracarboxylic dianhydride; and mixed acid anhydrides having a structure in which different types of acids, such as two different types of carboxylic acids or a carboxylic acid and a sulfonic acid, undergo dehydration condensation. These acid anhydrides are used alone, or in combination of two or more thereof.

Since it is preferable for the nonaqueous secondary battery according to the present embodiment to enhance an SEI before the reductive decomposition of the nonaqueous solvent, it is preferable to contain, as the acid anhydride, at least one cyclic acid anhydride which acts early at the time of initial charging. Only one type or plural types of these cyclic acid anhydrides may be contained. Alternatively, a cyclic acid anhydride other than these cyclic acid anhydrides may be contained. The cyclic acid anhydride preferably contains at least one of succinic anhydride, maleic anhydride and phthalic anhydride.

According to a nonaqueous electrolyte solution containing at least one of succinic anhydride, maleic anhydride and phthalic anhydride, it is possible to form a strong SEI on a negative electrode, thus inhibiting more effectively an increase in resistance during high-temperature heating. In particular, it is preferable to contain succinic anhydride. Thus, it is possible to form a strong SEI on the negative electrode more effectively while inhibiting the side reaction.

When the nonaqueous electrolyte solution according to the present embodiment contains an acid anhydride, the content thereof may be preferably within a range of 0.01 part by weight or more and 10 parts by weight or less, more preferably 0.05 part by weight or more and 1 part by weight or less, and still more preferably 0.1 part by weight or more and 0.5 part by weight or less, as the amount per 100 parts by weight of the nonaqueous electrolyte solution.

The acid anhydride is preferably contained in the nonaqueous electrolyte solution. Meanwhile, as long as the acid anhydride can act in a nonaqueous secondary battery, at least one battery member selected from the group consisting of a positive electrode, a negative electrode and a separator may contain the acid anhydride. As a method of containing the acid anhydride in the battery member, for example, the acid anhydride may be contained in the battery member at the time of fabricating the battery member, or the battery member may be impregnated with the acid anhydride by a post-treatment typified by coating, dipping or spray drying on the battery member.

<Optional Additives>

In the present embodiment, for the purpose of improving charging/discharging cycle characteristics, high-temperature storage and safety (for example, prevention of overcharging) of the nonaqueous secondary battery, it is also possible for the nonaqueous electrolyte solution to appropriately contain optional additives (additives other than the acid anhydride and the electrode protection additive).

Examples of the optional additive include a sulfonic acid ester, diphenyl disulfide, cyclohexylbenzene, biphenyl, fluorobenzene, tert-butylbenzene, a phosphoric acid ester [ethyldiethylphosphonoacetate (EDPA); $(C_2H_5O)_2(P=O)-CH_2(C=O)OC_2H_5$, tris(trifluoroethyl) phosphate (TFEP); $(CF_3CH_2O)_3P=O$, triphenyl phosphate (TPP); $(C_6H_5O)_3P=O$, triallyl phosphate; $(CH_2=CHCH_2O)_3P=O$, etc.], a nitrogen-containing cyclic compound with no steric hindrance around unshared electron pair [pyridine, 1-methyl-1H-benzotriazole, 1-methylpyrazole, etc.]. In particular, the phosphoric acid ester has the effect of inhibiting side reactions during storage and is effective as the optional additive.

When the nonaqueous electrolyte solution according to the present embodiment contains other optional additives, the content thereof is preferably within a range of 0.01% by weight or more and 10% by weight or less, more preferably 0.02% by weight or more and 5% by weight or less, and still more preferably 0.05 to 3% by weight. By adjusting the content of other optional additives within the above range, it tends to be possible to add more satisfactory battery characteristics without impairing the basic function of the nonaqueous secondary battery.

<Ionic Conductivity of Nonaqueous Electrolyte Solution>

In a nonaqueous secondary battery, when a below-mentioned separator of a preferred embodiment is combined with a nonaqueous electrolyte solution having low ionic conductivity, the moving speed of lithium ions is controlled by the ionic conductivity of the nonaqueous electrolyte solution, thus failing to obtain the desired input/output characteristics Therefore, the ionic conductivity of the nonaqueous electrolyte solution according to the present embodiment is preferably 10 mS/cm or more, more preferably 15 mS/cm, and still more preferably 20 mS/cm.

<Method for Producing Nonaqueous Electrolyte Solution>

The nonaqueous electrolyte solution according to the present embodiment can be produced by mixing a nonaqueous solvent and a lithium salt together with additives (electrode protection additives, acid anhydrides, and optional additives) as necessary by any means.

<<Battery Separator>>

In another mode of the present invention, a battery separator (hereinafter also simply referred to as "separator") is provided. Since the separator is required to have insulating properties and ion permeability, it is generally formed of paper, a polyolefin non-woven fabric or a resin microporous film which is an insulating material having a porous structure. In particular, when a separator is used in a nonaqueous electrolyte secondary battery including positive and negative electrodes capable of occluding and releasing lithium, and a nonaqueous electrolyte solution prepared by dissolving an electrolyte in a nonaqueous solvent, a polyolefin microporous membrane capable of resisting redox degradation of the separator and constructing a compact and homogeneous porous structure is excellent as a separator substrate. Therefore, the separator according to the present embodiment can include a polyolefin microporous membrane.

From the viewpoint of achieving both battery safety and output performance, the separator preferably includes the following two layers:

a (first layer) substrate; and a (second layer) substrate stacked on at least one surface of the substrate. From the same viewpoint, the thickness ratio of the substrate (first layer) to the second layer is preferably 0.5 or more and 10 or less.

The weight-average molecular weight of the entire separator used in the present embodiment is preferably 100,000 or more 10,200,000 or less, and more preferably 150,000 or more and 8,000,000 or less.

(First Layer)

The substrate as the first layer is preferably a polyolefin microporous membrane from the viewpoint of redox degradation resistance of the separator and construction of a compact and homogeneous porous structure.

(Polyolefin Microporous Membrane)

The polyolefin microporous membrane can be a single-layer membrane composed of a single polyolefin-containing microporous layer, a multilayer membrane composed of a plurality of polyolefin-containing porous layers, or a multilayer membrane of a polyolefin-based resin layer and a layer containing another resin as a main component.

In the case of a two-layer membrane formed from two polyolefin-containing microporous layers, the polyolefin compositions of both layers can be different. In the case of a multilayer membrane formed from three or more polyolefin-containing microporous layers, the outermost and innermost polyolefin compositions can be different from each other, and may be, for example, a three-layer membrane.

The membrane thickness of the polyolefin microporous membrane is preferably 1.0 µm or more, more preferably 2.0 µm or more, and still more preferably 3.0 µm or more, 4.0 µm or more or 5.5 µm or more. When the membrane thickness of the microporous membrane is 1.0 µm or more, the membrane strength tends to be further improved. The membrane thickness of the microporous membrane is preferably 100 µm or less, more preferably 60 µm or less, and still more preferably 50 µm or less. When the membrane thickness of the microporous membrane is 100 µm or less, the ion permeability tends to be further improved.

(Second Layer)

The second layer is a layer stacked on at least one side of the substrate. The second layer may be disposed on one or both sides of the substrate, and it is preferable that the second layer is disposed so that at least a portion of the substrate is exposed.

From the viewpoint of the heat resistance of the separator and the safety of the battery, the second layer preferably contains a heat-resistant resin and an inorganic filler, and may also contain a thermoplastic polymer resin, an optional additive, etc., as necessary.

(Heat-Resistant Resin)

In the present embodiment, a resin having a melting point of higher than 150° C. or a resin having a melting point of 250° C. or higher is preferably used as the heat-resistant resin, or a resin having a thermal decomposition temperature of 250° C. or higher is preferably used as a resin in which no melting point is substantially present. Examples of such heat-resistant resin include wholly aromatic polyamide, polyimide, polyamideimide, polysulfone, polyether sulfone, polyketone, polyether, polyether ketone, polyetherimide, cellulose; cellulose derivatives such as ethyl cellulose, methyl cellulose, hydroxyethyl cellulose, and carboxy cellulose. Of these, wholly aromatic polyamide (also referred to aramid resin) is preferable from the viewpoint of the durability, and para-aromatic polyamide and/or meta-aromatic polyamide is/are more preferable. From the viewpoint of the formability of the porous layer and redox resistance, meta-aromatic polyamide is preferable.

When the aromatic polyamide is used as the heat-resistant resin, the terminal group concentration ratio of the aromatic polyamide is preferably [COOX, wherein X represents hydrogen, alkali metal or alkaline earth metal]/[NH$_2$]≥1. For example, the terminal carboxyl group such as COONa has an effect of removing an unfavorable SEI generated on the negative electrode side of the battery. Therefore, when using an aromatic polyamide having more terminal carboxyl groups than terminal amine groups, a nonaqueous electrolyte secondary battery having a stable discharge capacity for a long period of time tends to be obtained.

(Thermoplastic Resin)

The second layer can contain a thermoplastic resin (excluding the heat-resistant resin mentioned above). The second layer may contain the thermoplastic resin in a proportion of preferably 60% by weight or more, more preferably 90% by weight or more, still more preferably 95% by weight or more, and particularly preferably 98% by weight or more, based on the total amount thereof.

Examples of the thermoplastic resin include the following:

polyolefin resins such as polyethylene, polypropylene and α-polyolefin;

fluorine-based polymers such as polyvinylidene fluoride and polytetrafluoroethylene, or copolymers containing the same;

diene-based polymers including conjugated diene such as butadiene or isoprene as a monomer unit, or copolymers containing the same, or hydrides thereof;

acrylic polymers including (meth)acrylate or (meth)acrylic acid as a monomer unit, and including no polyalkylene glycol unit, acrylic polymers including (meth)acrylate or (meth)acrylic acid as a monomer unit and including one or two polyalkylene glycol units, copolymers containing the same, or hydrides thereof;

rubbers such as ethylene-propylene rubber, polyvinyl alcohol or vinyl polyacetate;

polyalkylene glycols having no polymerizable functional group such as polyethylene glycol or polypropylene glycol;

resins such as polyphenylene ether, polyphenylene sulfide or polyester;

copolymers including, as a copolymerization unit, an ethylenically unsaturated monomer having a number of repetitions of 3 or more of alkylene glycol units; and combinations thereof.

Of these, from the viewpoint of improving the safety of the battery including the separator, the thermoplastic polymer preferably includes a polymerization unit of (meth)acrylic acid ester or (meth)acrylic acid.

The glass transition temperature (Tg) of the thermoplastic resin is within a range of preferably −40° C. to 105° C., and more preferably −38° C. to 100° C., from the viewpoint of improving the safety in the puncture test of the battery including the separator.

From the viewpoint of wettability to the substrate, binding property between the substrate (first layer) and the second layer, and adhesion to the electrode, the second layer is preferably mixed with a polymer having a glass transition temperature of lower than 20° C., and from the viewpoint of the blocking resistance and ion permeability, the second layer is preferably mixed with a polymer having a glass transition temperature of 20° C. or higher.

The thermoplastic resin described above can be produced by a known polymerization method using the corresponding monomer or comonomer. It is possible to use, as the polymerization method, for example, appropriate method such as solution polymerization, emulsion polymerization or bulk polymerization.

In the present embodiment, since the second layer can be easily formed by coating, it is preferable that a particulate thermoplastic polymer is formed by emulsion polymerization, and the obtained thermoplastic polymer emulsion is used as an aqueous latex.

(Inorganic Filler)

The inorganic filler to be used in the second layer are not particularly limited, and is preferably an inorganic filler which have a melting point of 200° C. or higher and high electrical insulating properties, and is electrochemically stable in the use range of the lithium ion secondary battery.

Examples of the shape of the inorganic filler include a granular shape, a plate shape, a scaly shape, a needle shape, a columnar shape, a spherical shape, a polyhedral shape, and a lump shape. A plurality of types of inorganic fillers having these shapes may be used in combination.

The mean particle size (D50) of the inorganic filler is preferably 0.2 μm or more and 2.0 μm or less, and more preferably more than 0.2 μm and 1.2 μm or less. Adjusting D50 of the inorganic filler within the above range is preferable from the viewpoint of inhibiting heat shrinkage at high temperature (for example, 150° C. or higher, 200° C. or higher, or 200° C. or higher) or improving the bar impact fracture testability at high temperature even when the second layer has a small thickness (for example, 5 μm or less or 4 μm or less). Examples of the method of adjusting the particle size and particle size distribution of the inorganic filler include a method of reducing the particle size by pulverizing the inorganic filler using appropriate pulverizing apparatus such as a ball mill, a bead mill or a jet mill.

The second layer preferably contains, in addition to the heat-resistant resin, an inorganic filler in a proportion of 25% by weight to 95% by weight of based on the weight of the second layer. 25% by weight or more of the inorganic filler is preferable for the dimensional stability and heat resistance at high temperature, while 95% by weight or less of the inorganic filler is preferable for the strength, handleability or moldability.

From the viewpoint of improving the safety of the battery at high temperature, the second layer preferably contains an inorganic filler having a mean particle size within a range of 0.2 μm to 0.9 μm in a proportion of preferably 30 to 90% by weight, and more preferably 32% by weight to 85% by weight, based on the weight of the second layer.

Examples of the inorganic filler include, but are not particularly limited to, oxide-based ceramics such as alumina, silica, titania, zirconia, magnesia, ceria, yttria, zinc oxide and iron oxide; nitride-based ceramics such as silicon nitride, titanium nitride and boron nitride; ceramics such as silicon carbide, calcium carbonate, magnesium sulfate, aluminum sulfate, aluminum hydroxide, aluminum hydroxide oxide, potassium titanate, talc, kaolinite, dickite, nacrite, halloysite, pyrophyllite, montmorillonite, sericite, mica, amesite, bentonite, asbestos, zeolite, calcium silicate, magnesium silicate, diatomaceous earth and silica sand; and glass fibers. These may be used alone, or a plurality thereof may be used in combination.

Of these, aluminum oxide compounds such as alumina and aluminum hydroxide oxide; and aluminum silicate compounds having no ion exchange ability, such as kaolinite, dickite, nacrite, halloysite and pyrophyllite are preferred from the viewpoint of improving the electrochemical stability and heat resistance of the separator.

There are many crystalline forms of alumina, such as α-alumina, β-alumina, γ-alumina and θ-alumina, and all of them can be preferably used. Of these, α-alumina is preferable since it is thermally and chemically stable.

The aluminum oxide compound is particularly preferably aluminum hydroxide oxide (AlO(OH)). The aluminum hydroxide oxide is more preferably boehmite from the viewpoint of preventing internal short circuit caused by the generation of lithium dendrite. By employing particles mainly composed of boehmite as the inorganic filler constituting the second layer, it is possible to realize a very light-weight porous layer while maintaining high permeability, and to inhibit heat shrinkage at high temperature of the porous membrane even in a thinner porous layer, and to exhibit excellent heat resistance. Synthetic boehmite, which can reduce ionic impurities that adversely affect the properties of the electrochemical device, is still more preferable.

The aluminum silicate compound having no ion exchange ability is more preferably kaolin mainly composed of kaolin mineral because it is inexpensive and easily available. Wet kaolin and calcined kaolin obtained by firing wet kaolin are known as kaolin. The calcined kaolin is particularly preferable in the present embodiment. The calcined kaolin is particularly preferable from the viewpoint of electrochemical stability since water of crystallization is released during the firing treatment and impurities are also removed.

The thickness of the second is preferably 7 μm or less, and more preferably 6 μm or less, per one side of the substrate (first layer), from the viewpoint of high-temperature safety of the battery. The thickness of the second layer can be 0.01 μm or more, 0.1 μm or more, or 0.5 μm or more from the viewpoint of improving the heat resistance and insulating properties.

The second layer preferably contains at least one of the constituent components described above selected from the group consisting of ceramic, aramid resin and polyvinylidene fluoride (PVDF) from the viewpoint of the cycle performance and safety of the battery.

When the second layer is disposed only on a part of the surface of the substrate, examples of the arrangement pattern of the second layer include dots, stripes, a lattice, bands, a honeycomb, random, and combinations thereof.

(Polyolefin)

Examples of the polyolefin to be used in the present embodiment include, but are not limited to, homopolymers of ethylene or propylene, or copolymers formed from at least two monomers selected from the group consisting of ethylene, propylene, 1-butene, 4-methyl-1-pentene, 1-hexene, 1-octene and norbornene. Of these, high-density polyethylene (homopolymer) and low-density polyethylene are preferable, and high-density polyethylene (homopolymer) is more preferable, from the viewpoint of carrying out heat setting (sometimes abbreviated as "HS") at higher temperature while avoiding obstruction of the pores. A polyolefin may be used alone, or two or more thereof may be used in combination.

Ultra-high molecular weight polyethylene (UHMWPE) is preferably used in combination with a silane-modified polyolefin. In general, the ultra-high molecular weight polyethylene (UHMWPE) refers to those having a weight-average molecular weight of 1,000,000 or more.

<Silane Crosslinking Reaction>

The battery separator preferably contains a silane-modified polyolefin. More preferably, the silane-modified polyolefin is contained in the substrate (that is, polyolefin microporous membrane).

It is preferable that the battery separator containing the silane-modified polyolefin initiates the silane crosslinking reaction of the silane-modified polyolefin when it contacts with the nonaqueous electrolyte solution. Examples of the silane-modified polyolefin include silane graft-modified polyethylene and silane graft-modified polypropylene. It is considered that the functional groups included in the polyolefin constituting the separator are not incorporated into the crystal portions of the polyolefin and are crosslinked in the amorphous portions. Therefore, when the separator according to the present embodiment comes into contact with the nonaqueous electrolyte solution, a crosslinked structure is formed by utilizing the chemical substance in the electrolyte solution, thereby inhibiting an increase in internal stress or deformation of the fabricated battery, and improving the safety of a nail penetration test.

When the silane-modified polyolefin is contained in the substrate (polyolefin microporous film), the substrate can contain (A) silane graft-modified polyethylene, (B) silane graft-modified polypripropylene, (C) polyethylene (polyethylene different from the above graft-modified polyethylene: hereinafter also simply referred to as "polyethylene"), etc. The membrane breaking temperature measured by thermomechanical analysis (TMA) is 170 to 210° C. Further, the content ratio of the silane graft-modified polyethylene is 2 to 50% by weight, the content ratio of the silane graft-modified polypripropylene is 1 to 40% by weight, the content ratio of the polyethylene is 5 to 95% by weight, and the content ratio of the optional component is 0 to 10% by weight, based on 100% by weight of the total of the silane graft-modified polyethylene, the silane graft-modified polypripropylene, the polyethylene, and (D) as single or plural types of the optional components which are mixed as necessary. As a result, a high-quality separator (for example, less resin aggregate in the separator) can be realized, and it is possible to ensure high safety of the battery by including such a separator.

Examples of the optional component include components different from any of (A) to (C), and examples thereof include at least one of a polymer different from any of (A) to (C) or an additive mentioned later. The optional component is not limited to a single type. The separator may contain a plurality of types of polymers different from any of (A) to (C), a plurality of types of additives, and both the polymer and the additive. When the separator contains a plurality of optional components, the total content ratio of the plurality of optional components may be 10% by weight or less.

In this respect, high-temperature film rupture resistance can be exhibited by constructing a silane crosslinked structure (gelled structure) by silane graft-modified polyethylene and silane graft-modified polypropylene in the microporous membrane. It is presumed that this is because polypropylenes; polyethylenes; and/or polypropylene and polyethylene dispersed in the mixed resin are preferably linked by the silane crosslinked structure. That is, it is considered that polypropylenes are crosslinked with each other, and the polypropylene and polyethylene are crosslinked with each other in a compatible manner to form a contact layer between the two. In this case, polypropylene serves as a core portion, and the contact layer around the core portion serves as a shell portion to form a core-shell structure, and such a core-shell structure is dispersed in polyethylene. Further, crosslinking between polyethylenes also changes the morphology of the entire microporous membrane, thus making it possible to maintain a membrane shape even if the temperature exceeds the melting point of polyethylene (for example, about 130° C. to 140° C.) and the temperature is around the melting point of polypropylene (for example, about 170° C.) or exceeds the melting point. Further, by changing the morphology of the entire microporous membrane, the tensile elongation is also improved, which is expected to reduce the possibility that the separator is broken when the battery is deformed by an external force.

From the viewpoint of ensuring high-temperature film rupture resistance and improving tensile elongation, the content ratio of the silane graft-modified polyethylene is preferably 3% by weight or more, more preferably 4% by weight or more, preferably 49.5% by weight or less, and more preferably 49% by weight or less, based on 100% by weight in total.

From the same viewpoint, the content ratio of the silane graft-modified polypropylene is preferably 1.5% by weight or more, more preferably 2% by weight or more, preferably 39.5% by weight or less, and more preferably 39% by weight or less, based on 100% by weight in total.

Further, from the same viewpoint, the content ratio of polyethylene (polyethylene different from the silane graft-modified polyethylene) is preferably 10% by weight or more, more preferably 12% by weight or more, preferably 94.5% by weight or less, and more preferably 94% by weight or less, based on 100% by weight in total.

((A) Silane Graft-Modified Polyethylene, and (B) Silane Graft-Modified Polypropylene)

The main chain of the silane graft-modified polyethylene is polyethylene, and the silane graft-modified polyethylene is composed of a structure in which alkoxysilyl is grafted onto the main chain. Further, the main chain of silane graft-modified polypropylene is polypropylene, and the silane graft-modified polypropylene is composed of a structure in which alkoxysilyl is grafted onto the main chain.

In both the silane graft-modified polyethylene and the silane graft-modified polypropylene, it is presumed that the alkoxysilyl group is converted into a silanol group through a hydrolysis reaction with water, thus causing a crosslinking reaction to form a siloxane bond (see the following scheme: the rate of changing from T0 structure to T1 structure, T2 structure or T3 structure is optional). Examples of the alkoxide substituted with the alkoxysilyl group include, but are not particularly limited to, methoxide, ethoxide, and butoxide. For example, in the following scheme, a plurality of methyl groups (-Me) are each independently converted into ethyl, n-propyl, isopropyl, n-butyl, sec-butyl, isobutyl, and tert-butyl.

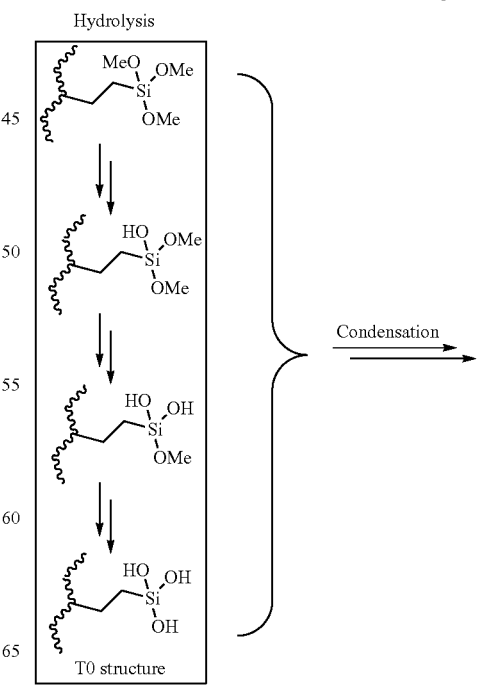

[Chemical Formula 7]

-continued
Dehydrating condensation

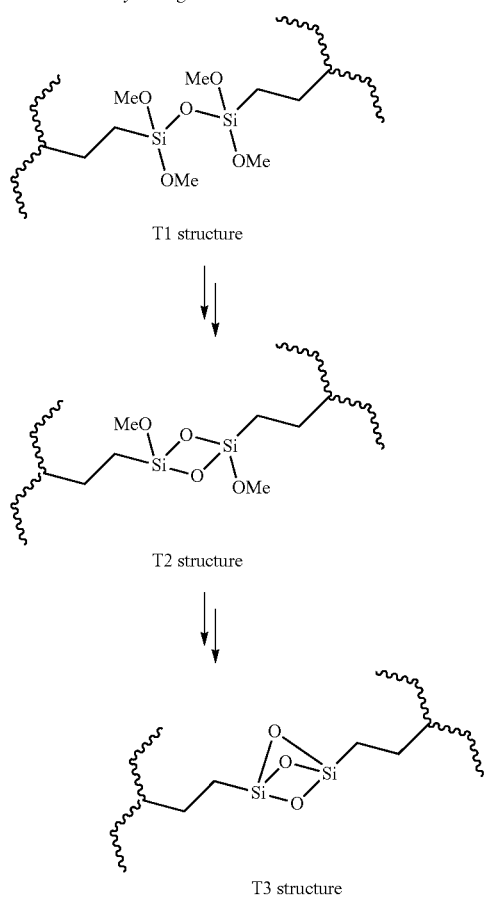

In both the silane graft-modified polyethylene and the silane graft-modified polypropylene, the main chain and the graft are connected by a covalent bond. Examples of the structure for forming a covalent bond include, but are not particularly limited to, alkyl, ether, glycol, and ester. In both cases of the silane graft-modified polyethylene and the silane graft-modified polypropylene, the graft ratio is preferably 2.0 mol % or less, and more preferably 1.7 mol % or less, in vinyl silanol units with respect to ethylene units, at the stage before carrying out the crosslinking reaction.

The polyethylene constituting the silane graft-modified polyethylene may be composed of one type of ethylene, or may be composed of two or more types of ethylenes. Two or more types of silane graft-modified polyethylenes composed of different ethylene may be used in combination.

The polypropylene constituting the silane graft-modified polypropylene may be composed of one type of propylene, or may be composed of two or more types of propylenes. Two or more types of silane graft-modified polypropylenes composed of different ethylene may be used in combination.

The polypropylene constituting the silane graft-modified polypropylene is preferably a homopolymer of propylene.

The silane-modified polyolefin preferably has a density of 0.90 to 0.96 g/cm$^3$ and a melt flow rate (MFR) of 0.2 to 5 g/min.

Both the silane-modified polyethylene and the silane-modified polypropylene preferably have an average-viscosity molecular weight (Mv) of 20,000 to 150,000 and a density of 0.90 to 0.96 g/cm$^3$, and the melt flow rate (MFR) at 190° C. of the silane-modified polyethylene and MFR at 230° C. of the silane-modified polypropylene are 0.2 to 5 g/min.

The condensation reaction of the silane-modified polyolefin is accelerated as a catalytic reaction under conditions in which an acidic condition, an alkaline condition, and a base with low nucleophilicity are present. Siloxane bonds formed by condensation have high thermodynamic stability. While C—C bond energy is 86 kcal·mol$^{-1}$ and C—Si bond energy is 74 kcal·mol$^{-1}$, the Si—O bond energy of is 128 kcal·mol$^{-1}$. As a result, the thermodynamic stability of the siloxane bond is suggested (NPLs 1 and 2). Therefore, by the presence of HF or $H_2SO_4$ having a constant concentration in the reaction system, the crosslinking reaction of the silane-modified polyolefin in the polymer structure of the separator to the siloxane bond is accelerated in a high yield, and thus a highly heat-resistant structure can be constructed in the separator.

Since the Si-containing compound has a high reactivity with F anion, the crosslinking point formed by the siloxane bond may be decomposed by the F anion having a high concentration. The bond energy of Si—F is very high as 160 kcal·mol$^{-1}$ and the Si—F bond has high thermodynamic stability, so it is considered that the F anion continues to be consumed until the concentration in the system becomes equal to or less than a certain level in the equilibrium reaction (NPLs 1 and 2). The decomposition reaction of the crosslinking point by the F anion is estimated to be the cleavage reaction of the C—Si bond or Si—OSi bond of the siloxane bond. In the experiment in which the bond dissociation energy of Si—X is estimated using the compound $Me_3Si$—X, it has been reported that the bond dissociation energy D of Si—X is D=394±8 kJ/mol when X=Me, D=513±11 kJ/mol when X=OMe, and D=638±5 kJ/mol when X=F (NPL 3). Under the acidic condition, considering the stability of the product after the C—Si bond or Si—OSi bond cleavage of the siloxane bond, it is estimated that the Si—OSi bond is easily cleaved to convert into Si—F and HO—Si. Therefore, when the F anion concentration in the reaction system becomes equal to or higher than a certain level, it is considered that the siloxane bond at the crosslinking point is decomposed, leading to deterioration of the heat resistance of the separator.

In the present invention, it has been found that the crosslinking reaction to the siloxane bond can be promoted and the in-battery crosslinking reaction of the separator having high heat resistance can be controlled by utilizing the fact that $HFSO_3$ produces HF and $H_2SO_4$ in a given amount in the system by the equilibrium reaction. Since the decomposition reaction of $HFSO_3$ is the equilibrium reaction, the crosslinking reaction of the siloxane bond can be continuously raised for a long period of time, and the probability of the crosslinking reaction can be greatly improved. The non-crystalline structure of the polyethylene has a high entanglement structure, and the entropy elasticity of the polyethylene is remarkably increased only by forming a partial crosslinked structure. Therefore, the molecular mobility of the amorphous portion is lowered, and it is difficult to form a siloxane bond for all the silanol units. In the present invention, the addition under a plurality of conditions is considered, and thus the problem could be fundamentally solved.

<Island Structure Containing Calcium>

In the separator of the present embodiment, it is preferable that at least one or more island structures containing calcium are detected when TOF-SIMS measurement is carried out over an area of 100 μm square, and the size of the island structure has a region of 9 µm² or more and 245 µm² or less. The size of the island structure containing calcium is more preferably 10 µm² or more, and still more preferably 11 µm² or more. The size of the island structure containing calcium is more preferably 230 µm² or less, and still more preferably 214 µm² or less.

In the separator of the present embodiment, when two or more island structures containing calcium are detected by carrying out TOF-SIMS measurement over an area of 100 µm square, both minimum and maximum values of a distance between weighted centers of gravity positions of the island structure is preferably 6 µm or more and 135 µm or less. The distance between weighted centers of gravity positions is more preferably 8 µm or more, and still more preferably 10 µm or more. The distance between weighted centers of gravity positions is more preferably 130 µm or less, and still more preferably 125 µm or less.

When a battery using a nonaqueous electrolyte solution containing $LiFSO_3$ is fabricated, there is a possibility that an excessive amount of HF is present in the battery by variations due to the amount of moisture brought in by each member. In the present embodiment, by providing an island structure containing calcium in the separator, HF in the system can be consumed as $CaF_2$ and the HF concentration can be controlled.

Calcium is heterogeneously distributed in the form of an aggregated island structure inside the separator. Since calcium reacts with HF to produce $CaF_2$, it can be presumed that calcium acts as a trapping agent for HF. Calcium is gradually consumed from the surface of the island structure, so that it is presumed that, if calcium is heterogeneously present in the separator, calcium is not completely consumed in a short period of time and continuously maintain the effect. As a result, deterioration of the battery can be inhibited in the long term.

The silane crosslinked separator may catalyze a cleavage reaction, which is a reverse reaction of the crosslinking reaction, when excess HF is present after crosslinking. Therefore, it is presumed that the cleavage reaction is inhibited by continuously trapping HF with the heterogeneously distributed calcium, thus making it possible to improve the long-term stability of the crosslinked structure of the silane crosslinked separator.

Further, when $LiPF_6$ is contained in the electrolyte, an excessive amount of F anions may be generated due to variations in amount of moisture. Therefore, it was experimentally found that, by providing the island structure containing calcium in the separator, the stability of the siloxane bond can be similarly ensured and the crosslinked structure of the separator can be maintained for a long period of time.

(Non-Woven Fabric Separator)

The separator according to the present embodiment may include a non-woven fabric. Examples of the non-woven fabric separator in the present embodiment include those in which a layer including a non-woven fabric and an inorganic pigment in a mixed state, and a layer containing an inorganic pigment as a main component are stacked in this order on a substrate containing a non-woven fabric as a main component.

When the non-woven fabric separator contains an inorganic pigment, the non-woven fabric separator can be formed by applying the inorganic pigment to a substrate including the non-woven fabric. Further, the non-woven fabric separator does not include a layer in which anon-woven fabric and an inorganic pigment are mixed, and may be formed of two layers of a substrate including a non-woven fabric as a main component and a layer containing an inorganic pigment as a main component.

The separator including the non-woven fabric of the present embodiment can be produced as follows. A solution containing an inorganic pigment (hereinafter referred to as "coating solution") is coated on the surface of the non-woven fabric substrate, followed by drying in a state where at least a part of the coating solution penetrates into the inside of the non-woven fabric substrate. The portion formed by drying the coating solution is referred to as "coating layer".

The non-woven fabric substrate used for the separator of the present embodiment is not particularly limited. Examples of the method for forming the fiber into a non-woven fabric sheet include a spunbond method, a melt blown method, an electrostatic spinning method, and a wet method. The wet method is preferable because a non-woven fabric having a thin and compact structure can be obtained. Examples of the method for bonding the fibers include a chemical bond method and a heat fusion method. The heat fusion method is preferable because a non-woven fabric having a smooth surface can be obtained.

Examples of the fibers forming the non-woven fabric in the present embodiment include polyolefins such as polypropylene and polyethylene; polyesters such as polyethylene terephthalate, polyethylene isophthalate and polyethylene naphthalate; acrylics such as polyacrylonitrile; polyamides such as 6,6 nylon and 6 nylon; various synthetic fibers; various cellulose pulps such as wood pulp, hemp pulp and cotton pulp; and cellulose-based recycled fibers such as rayon and lyocell. Of these, a non-woven fabric mainly composed of polyester or polypropylene is preferable because of the heat resistance, low hygroscopicity, etc. The preferred fiber diameter of the fibers forming the non-woven fabric depends on the physical properties of the coating solution used, but is preferably within a range of 2 to 8 µm.

The coating layer in the present embodiment contains an inorganic pigment and a binder resin. It is possible to use, as the inorganic pigment, alumina such as ax-alumina, 3-alumina and γ-alumina, alumina hydrate such as boehmite, magnesium oxide, and calcium oxide. Of these, α-alumina or alumina hydrate is preferably used because of its high stability to the electrolyte used in the lithium ion battery. It is possible to use, as the binder resin, various synthetic resins such as a styrene-butadiene resin, an acrylic acid ester resin, a methacrylic acid ester resin, and fluorine-based resin such as polyvinylidene fluoride. The amount of the binder resin used is preferably 0.1 to 30% by weight based on the inorganic pigment.

The coating solution can be optionally mixed with, in addition to the above-mentioned inorganic pigments and binders, various dispersants such as polyacrylic acid and sodium carboxymethyl cellulose, various thickeners such as hydroxyethyl cellulose, sodium carboxymethyl cellulose and polyethylene oxide, various wetting agents, and various additives such as preservatives and defoamers.

In the present embodiment, when the substrate is absent, characteristics of the battery deteriorate. In particular, cycle characteristics deteriorate. In the absence of the substrate, the layer containing the inorganic pigment mixed is directly exposed to the potential between the electrodes, and as a result, a decomposition product is generated by the electrochemical reaction.

In the non-woven fabric separator of the present embodiment, it is preferable that the thickness of the substrate is 2 µm or more, and is 3 times or less the thickness of the mixed layer of the non-woven fabric and the inorganic pigment.

When the thickness of the substrate is 2 µm or more, properties of the battery (particularly cycle characteristics) become satisfactory. It is considered that this is because the interface between the electrode and the separator is intricately in contact with each other, but when the thickness of the substrate layer is 2 µm or more, it is difficult for the layer containing the inorganic pigment to come into contact with the electrode, and thus a decomposition product due to an electrochemical reaction is less likely to be generated.

Further, when the thickness of the substrate is 3 times or less the thickness of the layer in which the inorganic pigment is mixed, characteristics of the battery (particularly cycle characteristics) become satisfactory. It is presumed that this is because the compressive elastic modulus of the layer in which the inorganic pigment is mixed is higher than that of the substrate, so that the electrode swelling during charging can be inhibited by setting the thickness within the range.

Further, in the non-woven fabric separator of the present embodiment, it is preferable that the presence ratio of the inorganic pigment in the layer in which the inorganic pigment is mixed decreases continuously or stepwise from the layer side containing the pigment as the main component to the substrate side. The cycle characteristics of the battery using the separator having such a structure become particularly satisfactory. More preferably, in the layer in which the inorganic pigment is mixed, the presence ratio of the inorganic pigment in the portion having a depth of ¼ from the layer side containing the inorganic pigment as the main component is 1.5 times or more the presence ratio of the inorganic pigment in the portion having a depth of ¾. As a result, a separator having particularly satisfactory battery cycle characteristics is obtained.

The "depth" in the present embodiment will be described. First, description will be made of the "depth" of the layer containing the inorganic pigment as the main component, the layer in which the non-woven fabric and the inorganic pigment are mixed, and the substrate. In each layer, the "depth" expressed by "length" is the distance L1 in the opposite plane direction when the boundary surface between the surface or the adjacent layer in each layer is "depth 0 (zero)". In each layer, the "depth" expressed by the "ratio" is the ratio (L1/L2) of the distance L1 to the total thickness L2 of each layer.

Next, the "depth" of the separator or the non-woven fabric substrate will be described. In the separator or non-woven fabric substrate, the "depth" expressed by "length" is the distance L3 in the opposite surface direction when one surface of the separator or non-woven fabric substrate is "depth 0 (zero)". In the separator or the substrate, the "depth" expressed by the "ratio" is the ratio (L3/L4) of the distance L3 to the total thickness L4 of the separator or the substrate.

In the present embodiment, "layer containing the inorganic pigment as a main component" is a region where the presence ratio of the inorganic pigment exceeds 4/1 when the cross-section of the separator is observed by an electron microscope. In the "substrate", the presence ratio of the inorganic pigment is less than ¼ when the cross-section of the separator is observed by an electron microscope. Further, "layer in which the non-woven fabric and the inorganic pigment are mixed" is a region where the presence ratio of the inorganic pigment is ¼ or more and 4/1 or less when the cross-section of the separator is observed by an electron microscope.

The "presence ratio of the inorganic pigment" in the present embodiment means the volume ratio of inorganic pigment/non-woven fabric. When a given depth of the cross-section of the separator is linearly scanned using a scanning electron microscope (hereinafter referred to as "SEM"), it is possible to calculate by "length of the portion identified as the inorganic pigment"/"length of the portion identified as the non-woven fabric". In the inorganic pigment or non-woven fabric, if there is a unique element which is not contained in the other one, or there is an element which is commonly contained in both, but the content of each differs greatly, the material can be identified by energy dispersive X-ray spectroscopy (hereinafter referred to as "EDS").

In order to obtain a separator in which a substrate including the non-woven fabric as a main component, a layer in which the non-woven fabric and the inorganic pigment are mixed, and a layer containing the inorganic pigment as a main component are overlapped in this order, the penetration depth of the coating solution is adjusted. In the present embodiment, the penetration depth of the coating solution is preferably ¼ or more of the thickness of the non-woven fabric substrate, and is preferably set at (thickness of the non-woven fabric substrate−2) µm or less.

There are the following methods for adjusting the penetration depth of the coating solution. As the first method, there is a method of adjusting the substrate fiber constituting the non-woven fabric substrate. In this method, in order to decrease the penetration depth of the coating solution, the mixing ratio of the fine fibers may be increases. In order to increase the penetration depth of the coating solution, the mixing ratio of fine fibers may be lowered. Further, the penetration depth can be adjusted by adjusting the amount of the oil agent adhering to the surface of the substrate fiber, and the amount of the surfactant such as a dispersant or a defoamer when the non-woven fabric substrate is formed by the wet method. For example, in order to decrease the penetration depth, the amount of the oil agent or the dispersant adhering to the substrate fiber may be decreased. In the present embodiment, the amount of the oil agent adhering to the substrate fiber is preferably within a range of 0.01 to 1% by weight.

As the second method, there is a method of adjusting the viscosity of the coating solution (high shear viscosity, low shear viscosity). In this method, in order to decrease the penetration depth of the coating solution, the viscosity of the coating solution may be increased. In order to increase the penetration depth of the coating solution, the viscosity of the coating solution may be decreased. Examples of the method of adjusting the viscosity of the coating solution include a method of adjusting the solid component concentration of the coating solution, a method of adding a thickener, a method of adjusting the amount of the thickener added, and a method of adjusting the temperature of the coating solution. In the present embodiment, the B-type viscosity of the coating solution is preferably within a range of 10 to 10,000 mPa·s, and more preferably within a range of 200 to 2,000 mPa·s. By adjusting the B-type viscosity within the above range, the separator of the present embodiment can be easily obtained.

As a third method, there is a method of adjusting the surface tension of the coating solution. In this method, in order to decrease the penetration depth of the coating solution, the surface tension of the coating solution may be increased. In order to increase the penetration depth of the coating solution, the surface tension of the coating solution may be decreased. Examples of the method of adjusting the surface tension of the coating solution include a method of adding a wetting agent, a method of adjusting the amount of the wetting agent added, and a method of adjusting the temperature of the coating solution. In the present embodiment, when the coating solution is aqueous, the surface tension is preferably 30 to 70 mN/m, and particularly preferably 45 to 65 mN/m. When the surface tension of the aqueous coating solution is within the above range, the separator of the present embodiment can be easily obtained.

As a fourth method, there is a method of selecting a coating method. In this method, in order to decrease the penetration depth of the coating solution, it is possible to use a coating method in which the dynamic pressure in the direction of injecting the coating solution into the non-woven fabric substrate does not easily act. In order to increase the penetration depth of the coating solution, it is possible to use a coating method in which the dynamic pressure in the direction of injecting the coating solution into the non-woven fabric substrate is likely to act. Examples of the coating method in which the dynamic pressure in the direction of injecting the coating solution into the non-woven fabric substrate is difficult to act include die coating and curtain coating. Examples of the coating method in which the dynamic pressure in the direction of injecting the coating solution into the non-woven fabric substrate easily acts include impregnation coating, blade coating, and rod coating. Examples of the intermediate coating method between both include gravure coating. In the present embodiment, the kiss reverse type gravure coating is preferably used because the penetration depth can be easily adjusted. In particular, a small diameter gravure having a gravure diameter of 150 mm or less is more preferably used.

By appropriately combining these methods, the penetration depth of the coating solution can be adjusted, and it is also possible to make the thickness of the non-woven fabric substrate 1/4 or more and (thickness of the non-woven fabric substrate−2) μm or less.

[Method for Producing Separator for Battery]
(Method for Producing Polyolefin Microporous Membrane)

The method for producing a separator for a battery will be described below by way of the case where the polyolefin microporous membrane is single-layer membrane (flat membrane), but it is not intended to exclude forms other than the flat membrane. The method for producing a microporous membrane according to the present embodiment includes the following steps:

(1) a sheet-forming step;
(2) a stretching step;
(3) a porous structure-forming step; and
(4) a heat treatment step. The method for producing a microporous membrane according to the present embodiment may include, as necessary, a resin modification step or kneading step before the sheet molding step (1), and/or a winding and slitting step after the heat treatment step (3).

In the kneading step, it is possible to knead polyolefin, and as necessary, other resins and plasticizers or inorganic materials using a kneader. The polyolefin composition may optionally contain known additives, for example, dehydrating condensation catalysts, plasticizers, metal soaps such as calcium stearate or zinc stearate, ultraviolet absorbers, light stabilizers, antistatic agents, anti-fogging agents, and coloring pigments. In the starting material composition according to the present embodiment, it is preferable to adjust the ratio of these resins according to the mean viscosity molecular weight of the polyethylene and the silane-modified polyolefin used.

The polyolefin used in the kneading step or the sheet-forming step (1) is not limited to the olefin homopolymer, and may be polyolefin in which a monomer having a functional group is copolymerized, or functional group-modified polyolefin.

When the polyolefin starting material has no functional group capable of being involved in the formation of the crosslinked structure or the molar fraction of such a functional group is less than a predetermined ratio, the polyolefin starting material is subjected to the resin-modifying step, and the functional group is incorporated into the resin backbone or the molar fraction of the functional group is increased to obtain the functional group-modified polyolefin. The resin-modifying step may be carried out by a known method.

Examples of the plasticizer include, but are not particularly limited to, organic compounds that can form a homogeneous solution with polyolefin at temperature below the boiling point. More specifically, examples thereof include decalin, xylene, dioctyl phthalate, dibutyl phthalate, stearyl alcohol, oleyl alcohol, decyl alcohol, nonyl alcohol, diphenyl ether, n-decane, n-dodecane, and paraffin oil. Of these, paraffin oil and dioctyl phthalate are preferable. A plasticizer may be used alone, or two or more thereof may be used in combination. The proportion of the plasticizer is not particularly limited, but from the viewpoint of the porosity of the obtained microporous membrane, it is preferably 20% by weight or more, and from the viewpoint of the viscosity during melt kneading, it is preferably 90% by weight or less, as necessary, based on the total weight of the polyolefin and silane graft-modified polyolefin.

The sheet-forming step (1) is a step of extruding a mixture of the obtained kneaded mixture or a mixture of a polyolefin and a plasticizer, cooling and solidifying the mixture, and molding the mixture into a sheet shape to obtain a sheet. Examples of the sheet molding method include, but are not particularly limited to, a method of solidifying a melt kneaded and extruded by compression cooling. Examples of the cooling method include a method of directly contacting a cooling medium such as cold air and cooling water, and a method of contacting with a roll or a press cooled by a refrigerant. A method of contacting with a roll or a press cooled by a refrigerant is preferable due to excellent controllability in membrane thickness.

The stretching step (2) is a step in which the obtained sheet is stretched in at least one direction after extracting the plasticizer or inorganic material to obtain a stretched sheet. Examples of the method of stretching the sheet include MD uniaxial stretching with a roll stretcher, TD uniaxial stretching with a tenter, sequential biaxial stretching with a combination of a roll stretcher and tenter, or a tenter and tenter, and simultaneous biaxial stretching with a biaxial tenter or inflation molding. Simultaneous biaxial stretching is preferable from the viewpoint of obtaining a more homogeneous membrane. The total area ratio is preferably 8-fold or more, more preferably 15-fold or more, and still more preferably 20-fold or more or 30-fold or more, from the viewpoint of membrane thickness homogeneity, and balance among tensile elongation, porosity and mean pore size. If the total area ratio is 8-fold or more, it will tend to be easier to obtain high strength and a satisfactory thickness distribution. The area ratio is also 250-fold or less from the viewpoint of preventing rupture.

The porous structure-forming step (3) is a step in which the plasticizer is extracted from the stretched sheet after the stretching step to form pores in the stretched sheet. Examples of the method of extracting the plasticizer include, but are not particularly limited to, a method of immersing the stretched sheet in an extraction solvent or a method of showering the stretched sheet with an extraction solvent. The extraction solvent used is not particularly limited, but it is preferably one that is a poor solvent for the polyolefin and a good solvent for the plasticizer and/or inorganic material, and that has a boiling point that is lower than the melting point of the polyolefin. Examples of such extraction solvent include, but are not particularly limited to, hydrocarbons such as n-hexane and cyclohexane; halogenated hydrocarbons such as methylene chloride, 1,1,1-trichloroethane and fluorocarbon-based compounds; alcohols such as ethanol and isopropanol; ketones such as acetone and 2-butanone; and alkali water. An extraction solvent may be used alone, or two or more thereof may be used in combination.

The heat treatment step (4) is a step in which, after the stretching step, the plasticizer is extracted from the sheet as necessary and heat treatment is further carried out to obtain a microporous membrane. Examples of method of heat treatment include, but are not particularly limited to, a heat setting method in which a tenter and/or roll stretcher is utilized for stretching and relaxation procedures. A relaxation procedure is a procedure of shrinking carried out at a prescribed temperature and relaxation factor, in the machine direction (MD) and/or transverse direction (TD) of the membrane. The relaxation factor is the value of the MD dimension of the membrane after the relaxation procedure divided by the MD dimension of the membrane before the procedure, or the value of the TD dimension after the relaxation procedure divided by the TD dimension of the membrane before the procedure, or the product of the relaxation factor in the MD and the relaxation factor in the TD, when both the MD and TD have been relaxed.

The winding and slitting step is a step in which the obtained microporous membrane is slit as necessary and wound around a predetermined core for handleability in the subsequent step.

In the post-treatment step, when the obtained polyolefin microporous membrane is subjected to surface treatment, the coating solution is easily coated and the adhesion between the polyolefin as the first layer and the second layer is improved, which is preferable. Examples of the method for surface treatment include a corona discharge treatment method, a plasma treatment method, a mechanical roughening method, a solvent treatment method, an acid treatment method, and an ultraviolet oxidation method.

(Method of Disposing Second Layer)

The second layer can be disposed on the substrate by, for example, coating a coating solution containing a heat-resistant resin and/or a thermoplastic resin onto the substrate. A heat-resistant resin and/or a thermoplastic resin may be synthesized by emulsion polymerization, and the obtained emulsion may be used as it is as a coating solution. The coating solution preferably contains water, a poor solvent such as a mixed solvent of water and a water-soluble organic medium (for example, methanol or ethanol).

Regarding the method of coating the coating solution containing the heat-resistant resin and/or the thermoplastic resin onto the polyolefin microporous film (substrate), the method is not particularly limited as long as it is a method capable of realizing desired coating pattern, coating film thickness and coating area. For example, a known method for coating an inorganic particle-containing coating solution may be used.

The method for removing the solvent from the coating film after coating is not particularly limited as long as it does not adversely affect the substrate (first layer) and the second layer. Examples thereof include a method of drying the coating film at a temperature below its melting point while fixing the substrate, a method of drying under reduced pressure at low temperature, and a method in which the substrate is immersed in a poor solvent for the heat-resistant resin and/or the thermoplastic resin, and then the heat-resistant resin and/or the thermoplastic resin is/are coagulated into particles and, at the same time, the solvent is extracted.

<Method for Producing Island Structure Containing Calcium>

In the separator production process, when starting materials are charged in an extruder, a constant concentration of calcium stearate is mixed with the starting materials, thus making it possible to form a calcium island structure in the separator. However, when using starting materials having significantly different molecular weights, there is a difference in dissolution viscosity between the starting materials. Further, since the molecular weight of the resin starting material is tens of thousands to millions of g/mol, whereas the molecular weight of calcium stearate is 284 g/mol, it is thermodynamically difficult to homogeneously disperse calcium stearate in the resin starting material. In the case of melt mixing containing a silane-modified polyolefin, dispersion is further difficult due to the presence of units having heterofunctional groups. In such a complicated mixed resin, while shear stirring by an extruder at high rotation speed improves the homogeneity of dispersion of calcium stearate, the island structure is finely dispersed adjacently, so that there is a problem that the F anion in the electrolyte solution is consumed more than necessary. Shear stirring by an extruder at high rotation speed causes deterioration of the molecular weight of the polyolefin, which greatly impairs the mechanical strength development and pore-opening property of the separator.

In the present invention, it is possible to control the construction of an island structure containing calcium having a limited size and the degree of dispersion by using those in which Mv=2,000,000 to 9,000,000 (starting material A), those in which Mv=500,000 to 2,000,000 (starting material B) and those in which Mv=20,000 to 150,000 (starting material C) as polyolefin starting materials, namely, three types in total, and adjusting the ratio of the content in accordance with each molecular weight.

In the starting material composition mentioned above, the ratio of the starting material C in the whole is 5% by weight to 60% by weight, and the ratio of the starting material A to the starting material B contained in addition thereto is preferably 8:2 to 0.5:9.5.

The separator obtained by the method including various steps described above can be used for a nonaqueous secondary battery including a nonaqueous electrolyte solution described above and positive and negative electrodes capable of occluding and releasing lithium, and can be preferably used for a lithium ion secondary battery.

<<Nonaqueous Secondary Battery>>

The nonaqueous electrolyte solution according to the present embodiment can be used to form a nonaqueous secondary battery.

The nonaqueous secondary battery according to the present embodiment is configured with a positive electrode, a negative electrode, a separator and a nonaqueous electrolyte solution housed in a suitable battery exterior.

In the nonaqueous secondary battery according to the present embodiment, the recovery charging capacity retention rate after being charged with a constant current of 15 mA/cm$^2$ by the method mentioned in detail in the item of the Examples is preferably 90% or more, and more preferably 92% or more, 94% or more or 96% or more. The upper limit of the recovery charging capacity retention rate is not limited, but is preferably, for example, 100% or less, less than 100%, 99% or less, or less than 99%.

Figure 3:
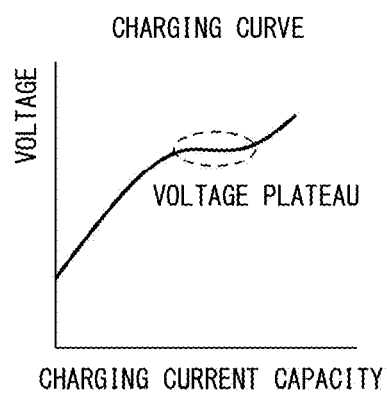
FIG. 3 is a schematic diagram for explaining a voltage plateau observed in the charging curve of a nonaqueous secondary battery.

Further, it is preferable that no voltage plateau is observed in a charging curve within a voltage range of 3.9 to 4.2 V at the time of the quick charging test at the current density of 15 mA/cm² of the nonaqueous secondary battery according to the present embodiment. As used herein, a "voltage plateau" refers to a region where the slope of the charging curve during constant current (CC) charging is relatively gentle, as shown in FIG. 3, and the charging curve at the time of the quick charging test at the current density of 15 mA/cm² can be, for example, a charge amount-voltage curve as shown in FIG. 3. In the present embodiment, the phenomenon that "the slope of the charging curve becomes relatively gentle" refers to the region where, when a specific region of the charging curve is approximated to y=ax+b, the value of the "a" becomes ⅓ or less relative to the maximum value of the "a". According to this embodiment, it was found that "no voltage plateau is observed" is one of the indexes for determining that electrodeposition (precipitation of lithium (Li) metal on the surface of the negative electrode) does not occur.

Figure 2:
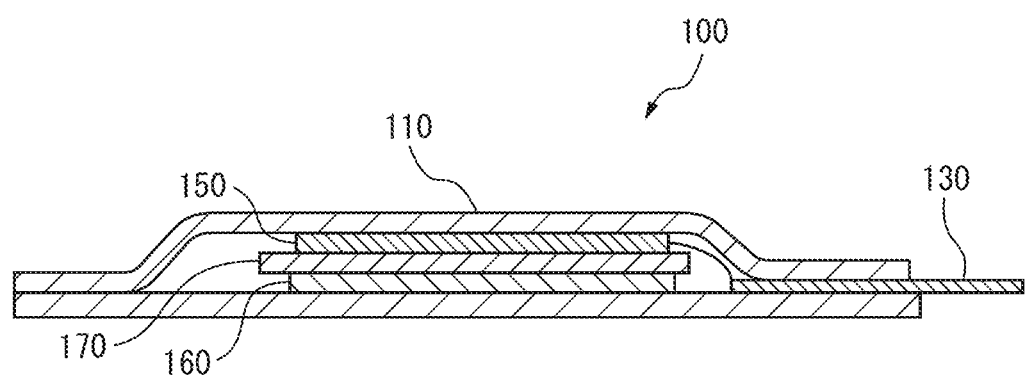
FIG. 2 is a cross-sectional view taken along line A-A of the nonaqueous secondary battery of FIG. 1.

Specifically, the nonaqueous secondary battery according to the present embodiment may be a nonaqueous secondary battery 100 shown in FIGS. 1 and 2. Here, FIG. 1 is a plan view schematically illustrating a nonaqueous secondary battery, and FIG. 2 is a cross-sectional view taken along line A-A of FIG. 1.

The nonaqueous secondary battery 100 shown in FIGS. 1 and 2 is composed of a pouch-type cell. The nonaqueous secondary battery 100 houses a layered electrode structure formed by stacking a positive electrode 150 and a negative electrode 160 via a separator 170 in a space 120 of a battery exterior 110, and a nonaqueous electrolyte solution (not shown). The battery exterior 110 is made of, for example, an aluminum laminate film, and is sealed by heat-sealing upper and lower films at the outer periphery of the space formed by the two aluminum laminate films. The layered product in which the positive electrode 150, the separator 170 and the negative electrode 160 are stacked in this order is impregnated with the nonaqueous electrolyte solution. However, in FIG. 2, in order to avoid complicating the drawing, the respective layers constituting the battery exterior 110 and the respective layers of the positive electrode 150 and the negative electrode 160 are not shown separately.

The aluminum laminate film constituting the battery exterior 110 is preferably an aluminum laminate film in which both sides of the aluminum foil are coated with a polyolefin-based resin.

The positive electrode 150 is connected to a positive electrode lead 130 in the nonaqueous secondary battery 100. Although not shown, the negative electrode 160 is also connected to a negative electrode lead 140 in the nonaqueous secondary battery 100. One end of each of the positive electrode lead 130 and the negative electrode lead 140 is pulled out to the outside of the battery exterior 110 so that they can be connected to an external device, etc. and their ionomer portions are heat-sealed together with one side of the battery exterior 110.

In the nonaqueous secondary battery 100 shown in FIGS. 1 and 2, the positive electrode 150 and the negative electrode 160 each have one layered electrode structure, but the number of laminated positive electrodes 150 and 160 can be appropriately increased by the capacity design. In the case of a layered electrode structure having a plurality of positive electrodes 150 and negative electrodes 160, tabs of the same electrode may be joined by welding, etc., and then joined to a lead by welding, etc. and taken out of the battery. As the tab of the same pole, a mode composed of the exposed portion of a current collector, a mode configured by welding a metal piece to the exposed portion of a current collector, etc. are possible.

The positive electrode 150 is composed of a positive electrode current collector and a positive electrode active material layer. The negative electrode 160 is composed of a negative electrode current collector and a negative electrode active material layer.

The positive electrode active material layer contains a positive electrode active material, and the negative electrode active material layer contains a negative electrode active material.

The positive electrode 150 and the negative electrode 160 are disposed so that the positive electrode active material layer and the negative electrode active material layer face each other via the separator 170.

Hereinafter, each element constituting the nonaqueous secondary battery according to the present embodiment will be described in order.

<Positive Electrode>

In the nonaqueous secondary battery according to the present embodiment, the positive electrode has a positive electrode active material layer on one or both sides of the positive electrode current collector.

[Positive Electrode Current Collector]

The positive electrode current collector is composed of, for example, a metal foil such as an aluminum foil, a nickel foil or a stainless steel foil. The surface of the positive electrode current collector may be coated with carbon, and may be processed into a mesh shape. The thickness of the positive electrode current collector is preferably 5 to 40 μm, more preferably 7 to 35 μm, and still more preferably 9 to 30 μm.

[Positive Electrode Active Material Layer]

The positive electrode active material layer contains a positive electrode active material, and may further contain a conductive aid and/or a binder as necessary.

(Positive Electrode Active Material)

The positive electrode active material layer preferably contains a material capable of occluding and releasing lithium ions as the positive electrode active material. When such a material is used, it tends to be possible to obtain high voltage and high energy density, which is preferable.

The positive electrode active material includes, for example, a positive electrode active material containing at least one transition metal element selected from the group consisting of Ni, Mn and Co, and is suitably at least one selected from lithium-containing metal oxides represented by the following general formula (a):

$$Li_p Ni_q Co_r Mn_s M_t O_u \qquad (a)$$

wherein M is at least one metal selected from the group consisting of Al, Sn, In, Fe, V, Cu, Mg, Ti, Zn, Mo, Zr, Sr and Ba; p, q, r, s, t and u are within the following ranges: 0<p<1.3, 0<q<1.2, 0<r<1.2, 0≤s<0.5, 0≤t<0.3, 0.7≤q+r+s+t≤1.2, and 1.8<u<2.2, and p is the value determined by the charging/discharging state of the battery.

Examples of the positive electrode active material include:
lithium cobalt oxide typified by LiCoO₂;
lithium manganese oxide typified by LiMnO₂, LiMn₂O₄ and Li₂Mn₂O₄;
lithium nickel oxide typified by LiNiO₂;

lithium-containing composite metal oxide represented by $Li_zMO_2$, typified by $LiNi_{1/3}Co_{1/3}Mn_{1/3}O_2$, $LiNi_{0.5}Co_{0.2}Mn_{0.3}O_2$, $LiNi_{0.8}Co_{0.2}O_2$, $LiNi_{0.6}Co_{0.2}Mn_{0.2}O_2$, $LiNi_{0.75}Co_{0.15}Mn_{0.15}O_2$, $LiNi_{0.8}Co_{0.1}Mn_{0.1}O_2$, $LiNi_{0.85}Co_{0.075}Mn_{0.075}O_2$, $LiNi_{0.8}Co_{0.15}Al_{0.05}O_2$, $LiNi_{0.81}Co_{0.1}Al_{0.09}O_2$ and $LiNi_{0.85}Co_{0.1}Al_{0.5}O_2$ (M contains at least one transition metal element selected from the group consisting of Ni, Mn and Co and represents two or more metal elements selected from the group consisting of Ni, Mn, Co, Al and Mg, and z represents a number of more than 0.9 and less than 1.2);

metal oxide or metal chalcogenide with tunnel and layered structures, typified by $MnO_2$, $FeO_2$, $FeS_2$, $V_2O_5$, $V_6O_{13}$, $TiO_2$, $TiS_2$, $MoS_2$ and $NbSe_2$;

sulfur;

conductive polymer typified by polyaniline, polythiophene, polyacetylene and polypyrrole.

In particular, when a Ni content ratio q of the Li-containing metal oxide represented by the general formula (a) satisfies: $0.5<q<1.2$, it is preferable because both a reduction in amount of Co, which is rare metal, and higher energy density are achieved.

Here, as the Ni content ratio increases, deterioration tends to progress at a low voltage. The positive electrode active material of the lithium-containing metal oxide represented by the general formula (a) has the active point which causes oxidative deterioration of the nonaqueous electrolyte solution, and this active point sometimes unintentionally consumes a compound added to protect the negative electrode on the positive electrode side. Of these, an acid anhydride tends to be easily affected. In particular, when acetonitrile is contained as a nonaqueous solvent, the acid anhydride is consumed on the positive electrode side, which is a problem.

From the viewpoint of long lifetime, a lithium phosphorus metal oxide having an olivine crystal structure containing an iron (Fe) atom is preferably used, and it is more preferable to use a lithium phosphorus metal oxide having an olivine structure represented by the following formula (Xba):

$$Li_wM^{II}PO_4 \quad (Xba)$$

wherein $M^{II}$ represents one or more transition metal elements including Fe, and the value of w is determined by the charging/discharging state of the battery and represents a number of 0.05 to 1.10.

From the viewpoint of the lithium phosphorus metal oxide represented by the formula (Xba), a phosphoric acid metal oxide containing Li and Fe is more preferable, and containing Fe is most preferable. Specific examples of the lithium phosphorus metal oxide having an olivine-type structure containing Fe include a compound represented by the formula $Li_wFePO_4$, wherein w is 0.05 to 1.1.

As the positive electrode active material in the present embodiment, only the lithium-containing metal oxide as mentioned above may be used, or other positive electrode active materials may be used in combination with the lithium-containing metal oxide.

These additive decomposition products taken in and deposited on the positive electrode side not only increase the internal resistance of the nonaqueous secondary battery, but also accelerate deterioration of the lithium salt. Further, the protection of the negative electrode surface also becomes insufficient. In order to deactivate the active point which essentially causes oxidative deterioration of the nonaqueous electrolyte solution, it is preferable to control the Jahn-Teller strain or to coexist with a component which acts as a neutralizer. Therefore, the positive electrode active material preferably contains at least one metal selected from the group consisting of Al, Sn, In, Fe, V, Cu, Mg, Ti, Zn, Mo, Zr, Sr and Ba.

For the same reason, it is preferable that the surface of the positive electrode active material is coated with a compound containing at least one metal element selected from the group consisting of Zr, Ti, Al and Nb. It is more preferable that the surface of the positive electrode active material is coated with an oxide containing at least one metal element selected from the group consisting of Zr, Ti, Al and Nb. It is still more preferable that the surface of the positive electrode active material is coated with at least one oxide selected from the group consisting of $ZrO_2$, $TiO_2$, $Al_2O_3$, $NbO_3$ and $LiNbO_2$ because it does not inhibit the permeation of lithium ions.

The positive electrode active material may be a lithium-containing compound other than the lithium-containing metal oxide represented by the formula (a). Examples of such a lithium-containing compound include a composite oxide containing lithium and a transition metal element, a metal chalcogenide containing lithium, a metal phosphate compound containing lithium and a transition metal element, and a metal silicate compound containing lithium and a transition metal element. From the viewpoint of obtaining higher voltage, the lithium-containing compound is particularly preferably a metal phosphate compound containing lithium and at least one transition metal element selected from the group consisting of Co, Ni, Mn, Fe, Cu, Zn, Cr, V and Ti.

More specific examples include compounds each represented by the following formula (XX-1):

$$Li_vM^ID_2 \quad (XX-1)$$

wherein D represents a chalcogen element, $M^I$ represents one or more transition metal elements containing at least one transition metal element, the value of v is determined by the charging/discharging state of the battery and represents a number of 0.05 to 1.10, the following formula (XX-2):

$$Li_wM^{II}PO_4 \quad (XX-2)$$

wherein D represents a chalcogen element, $M^{II}$ represents one or more transition metal elements containing at least one transition metal element, the value of w is determined by the charging/discharging state of the battery and represents a number of 0.05 to 1.10, and the following formula (XX-3):

$$Li_tM^{III}_uSiO_4 \quad (XX-3)$$

wherein D represents a chalcogen element, $M^{III}$ represents one or more transition metal elements containing at least one transition metal element, the value of t is determined by the charging/discharging state of the battery and represents a number of 0.05 to 1.10, and u represents an integer of 0 to 2.

The lithium-containing compound represented by the above formula (XX-1) has a layered structure, and the compounds represented by the above formulas (XX-2) and (XX-3) have an olivine structure. For the purpose of stabilizing the structure, these lithium-containing compounds may be those in which transition metal elements are partially substituted with Al, Mg or other transition metal elements, those in which these metal elements are included in grain boundaries, those in which oxygen atoms are partially substituted with a fluorine atom, or those in which a surface of the positive electrode active material is partially coated with other positive electrode active materials.

The positive electrode active material may be used alone, or in combination of two or more thereof. Since lithium ions can be occluded and released in a reversible and stable manner, and high energy density can be achieved, it is preferable that the positive electrode active material layer contains at least one transition metal element selected from Ni, Mn and Co.

When a lithium-containing compound and other positive electrode active materials are used in combination as the positive electrode active material, a ratio of both used is preferably 80% by weight or more, and more preferably 85% by weight or more, as the ratio of the lithium-containing compound used to the entire positive electrode active material used.

(Conductive Aid)

Examples of the conductive aid include carbon blacks typified by graphite, acetylene black and Ketjen black, and carbon fiber. The content of the conductive aid is preferably set at 10 parts by weight or less, and more preferably 1 to 5 parts by weight, as the amount per 100 parts by weight of the positive electrode active material.

(Binder)

Examples of the binder include polyvinylidene fluoride (PVDF), polytetrafluoroethylene (PTFE), polyacrylic acid, styrene-butadiene rubber and fluororubber. The content of the binder is preferably set at 6 parts by weight or less, and more preferably 0.5 to 4 parts by weight, as the amount per 100 parts by weight of the positive electrode active material.

[Formation of Positive Electrode Active Material Layer]

The positive electrode active material layer is formed by coating a positive electrode mixture-containing slurry, which is prepared by dispersing a positive electrode mixture obtained by mixing a positive electrode active material, and a conductive aid and a binder as necessary, in a solvent, onto a positive electrode current collector, followed by drying (removing the solvent) and pressing as necessary. It is possible to use, as such a solvent, a known solvent. Examples thereof include N-methyl-2-pyrrolidone, dimethylformamide, dimethylacetamide, and water.

<Negative Electrode>

The negative electrode in the nonaqueous secondary battery according to the present embodiment has a negative electrode active material layer on one or both sides of the negative electrode current collector.

[Negative Electrode Current Collector]

The negative electrode current collector is composed of, for example, a metal foil such as a copper foil, a nickel foil or a stainless steel foil. Further, the negative electrode current collector may have carbon coating applied on a surface thereof or may be processed into a mesh shape. The thickness of the negative electrode current collector is preferably 5 to 40 µm, more preferably 6 to 35 µm, and still more preferably 7 to 30 µm.

[Negative Electrode Active Material Layer]

The negative electrode active material layer contains a negative electrode active material, and may further contain a conductive aid and/or a binder as necessary.

(Negative Electrode Active Material)

Examples of the negative electrode active material include amorphous carbon (hard carbon), graphite (artificial graphite, natural graphite), thermally decomposed carbon, coke, glassy carbon, calcined product of organic polymer compound, mesocarbon microbeads, carbon materials typified by carbon fiber, activated carbon, carbon colloid and carbon black, as well as metallic lithium, metal oxides, metal nitrides, lithium alloys, tin alloys, Si materials, intermetallic compounds, organic compounds, inorganic compounds, metal complexes and organic polymer compounds. The negative electrode active materials may be used alone, or in combination of two or more thereof. Examples of the Si material include silicon, Si alloy, and Si oxide.

It is preferable that the negative electrode active material layer contains, as the negative electrode active material, a material capable of occluding lithium ions at a lower potential than 0.4V (vs. Li/Li$^+$) from the viewpoint of increasing the battery voltage.

The nonaqueous electrolyte solution according to the present embodiment has an advantage that even when a Si material is applied to the negative electrode active material, it is possible to inhibit various deterioration phenomena due to a volume change of the negative electrode when charging/discharging cycle is repeated. Therefore, in the nonaqueous secondary battery according to the present embodiment, use of the Si material typified by a silicon alloy, etc. as the negative electrode active material is a preferred mode in that excellent charging/discharging cycle characteristics are achieved while having a high capacity derived from the Si material.

In the present embodiment, a Si material, especially $SiO_x$, wherein $0.5 \leq x \leq 1.5$, may be contained as the negative electrode active material. The Si material may be in any form of a crystalline structure, a low crystalline structure and an amorphous. When a Si material is used as the negative electrode active material, it is preferable to coat a surface of the active material with a conductive material because the conductivity between the active material particles is improved.

Silicon has an operating potential of about 0.5 V (vs. Li/Li$^+$), which is slightly higher than the operating potential of graphite of about 0.05 V (vs. Li/Li$^+$). Therefore, use of the Si material reduces the risk of lithium electrodeposition. Acetonitrile used as the nonaqueous solvent in the present embodiment may react with lithium metal to cause gas generation. Therefore, the negative electrode active material, which hardly causes lithium electrodeposition, is preferable when used in combination with a nonaqueous electrolyte solution containing acetonitrile.

Meanwhile, a negative electrode active material having an excessively high operating potential reduces the energy density of the battery. Therefore, from the viewpoint of improving the energy density, it is preferable that the negative electrode active material operates at a lower potential than 0.4 V (vs. Li/Li$^+$).

The content of the Si material is preferably within a range of 0.10% by weight or more and 100% by weight or less, more preferably 1% by weight or more and 80% by weight or less, and still more preferably 3% by weight or more and 60% by weight or less, as the amount per total amount of the negative electrode active material layer. By adjusting the content of the Si material within the above range, it is possible to ensure a balance between higher capacity of the nonaqueous secondary battery and charging/discharging cycle performance.

(Conductive Aid)

Examples of the conductive aid include carbon black typified by graphite, acetylene black and Ketjen black, and carbon fiber. The content of the conductive aid is preferably 20 parts by weight or less, and more preferably 0.1 to 10 parts by weight, as the amount per 100 parts by weight of the negative electrode active material.

(Binder)

Examples of the binder include carboxymethyl cellulose, polyvinylidene fluoride (PVDF), polytetrafluoroethylene (PTFE), polyacrylic acid and fluororubber. A diene-based rubber such as a styrene-butadiene rubber can also be exemplified. The content of the binder is preferably set at 10 parts by weight or less, and more preferably 0.5 to 6 parts by weight, as the amount per 100 parts by weight of the negative electrode active material.

[Formation of Negative Electrode Active Material Layer]

The negative electrode active material layer is formed by applying a negative electrode mixture-containing slurry, which is prepared by dispersing a negative electrode mixture obtained by mixing a negative electrode active material, and a conductive aid and/or a binder as necessary, in a solvent, to a negative electrode current collector, followed by drying (removing the solvent) and pressing as necessary. Examples of such a solvent include N-methyl-2-pyrrolidone, dimethylformamide, dimethylacetamide, and water.

<Battery Exterior>

It is possible to employ, as the configuration of the battery exterior of the nonaqueous secondary battery in the present embodiment, a known configuration. For example, a battery can or a laminated film exterior may be used as the battery exterior.

It is possible to use, as the battery can, for example, a metal can made of steel, stainless steel, aluminum or a clad material.

The laminated film exterior can be used as an exterior in a state where two sheets are stacked with the hot melt resin side facing inward, or bent so that the heat-melting resin side faces inward, and then the end is sealed by heat sealing. When the laminated film exterior is used, a positive electrode lead (or a lead tab connected to a positive electrode terminal and a positive electrode terminal) may be connected to a positive electrode current collector, and a negative electrode lead (or a lead tab connected to a negative electrode terminal and a negative electrode terminal) may be connected to a negative electrode current collector. In this case, the laminated film outer may be sealed in a state where the ends of the positive electrode lead and the negative electrode lead (or lead tabs connected to the positive electrode terminal and the negative electrode terminal respectively) are pulled out to the outside of the battery exterior.

It is possible to use, as the laminate film exterior, for example, a laminate film having a three-layer structure of a hot melt resin/metal film/resin.

An aluminum laminate film constituting a battery exterior 110 is preferably a laminate film in which both sides of an aluminum foil is coated with a polyolefin-based resin.

<Shape of Nonaqueous Secondary Battery>

The shape of the nonaqueous secondary battery according to the present embodiment can be applied to, for example, a square-type, a square cylinder-type, a cylindrical-type, an elliptical-type, a button-type, a coin type, a flat-type, and a laminated-type.

The nonaqueous secondary battery according to the present embodiment can be particularly preferably applied to a square-type, a square cylinder-type and a laminate-type.

<Method for Producing Nonaqueous Secondary Battery>

The nonaqueous secondary battery according to the present embodiment can be fabricated by a known method using the above-mentioned nonaqueous electrolyte solution, positive electrode, negative electrode, separator and battery exterior.

First, a layered product composed of a positive electrode, a negative electrode and a separator is formed. At this time, for example, it is possible to employ:

a mode in which a long positive electrode and negative electrode are wound in a laminated state where a long separator is interposed into these gaps to form a layered product having a wound structure;

a mode in which a positive electrode sheet and a negative electrode sheet obtained by cutting into a plurality of sheets having the same area and shape are alternately stacked via a separator sheet to form a layered product; and a mode in which a long separator is folded into a spiral, and a cathode sheet and an anode sheet are alternately inserted into the gaps between the spiral separators to form a layered product having a laminated structure.

Next, the above layered product is housed in the battery exterior and the nonaqueous electrolyte solution according to the present embodiment is injected into the battery exterior, and then the layered product is immersed in the nonaqueous electrolyte solution, followed by sealing, thus enabling the production of the nonaqueous secondary battery according to the embodiment.

Alternatively, a nonaqueous secondary battery may be fabricated by impregnating a substrate made of a polymer material with the nonaqueous electrolyte solution according to the present embodiment to fabricate an electrolyte membrane in a gel state in advance, forming a layered product having a laminated structure using a sheet-shaped positive electrode and negative electrode, an electrolyte film thus obtained, and a separator, and housing the layered product in a battery exterior.

It should be noted that when the arrangement of the electrodes is designed such that there is a portion where the outer peripheral edge of the negative electrode active material layer and the outer peripheral edge of the positive electrode active material layer overlap, or there is a portion having too small width in the non-opposing portion of the negative electrode active material layer, there is a possibility that electrode misalignment occurs during battery assembling. In this case, charging/discharging cycle characteristics of the nonaqueous secondary battery may deteriorate. In order to prevent such a situation, it is preferable to fix the position of the electrode in advance with tapes such as a polyimide tape, a polyphenylene sulfide tape, a PP tape, and an adhesive.

When a nonaqueous electrolyte solution using acetonitrile is used, due to its high ionic conductivity, lithium ions released from the positive electrode during the initial charging of the nonaqueous secondary battery may diffuse to the entire negative electrode. In the nonaqueous secondary battery, the area of the negative electrode active material layer is commonly larger than that of the positive electrode active material layer. However, if lithium ions are diffused and stored to the portion of the negative electrode active material layer which does not face the positive electrode active material layer, lithium ions are not released during initial discharging and remain in the negative electrode. Therefore, the contribution of the unreleased lithium ions becomes an irreversible capacity. For this reason, the nonaqueous secondary battery using a nonaqueous electrolyte solution containing acetonitrile may exhibit low initial charging/discharging efficiency.

Meanwhile, when the area of the positive electrode active material layer is larger than that of the negative electrode active material layer, or both are the same, current is likely to be concentrated at the edge portion of the negative electrode active material layer during charging, thus making it easier to form lithium dendrite.

For the above reasons, a ratio of the area of the entire negative electrode active material layer to the area of the portion where the positive electrode active material layer and the negative electrode active material layer face each other is preferably more than 1.0 and less than 1.1, more preferably more than 1.002 and less than 1.09, still more preferably more than 1.005 and less than 1.08, and particularly preferably more than 1.01 and less than 1.08. In the nonaqueous secondary battery using a nonaqueous electrolyte solution containing acetonitrile, it is possible to improve the initial charging/discharging efficiency by decreasing the ratio of the area of the entire negative electrode active material layer to the area of the portion where the positive electrode active material layer and the negative electrode active material layer face each other.

Decreasing the ratio of the area of the entire negative electrode active material layer to the area of the portion where the positive electrode active material layer and the negative electrode active material layer face each other means limiting the proportion of the area of the portion of the negative electrode active material layer which does not face the positive electrode active material layer. Thus, it becomes possible to minimize the amount of lithium ions stored in the portion of the negative electrode active material layer which does not face the positive electrode active material layer (i.e., the amount of lithium ions which are not released from the negative electrode during the initial discharge and become the irreversible capacity) of lithium ions released from the positive electrode during initial charging. Therefore, by designing the ratio of the area of the entire negative electrode active material layer to the area of the portion where the positive electrode active material layer and the negative electrode active material layer face each other within the above range, it is possible to enhance initial charging/discharging efficiency of the battery and also to inhibit the formation of lithium dendrite while intendedly improving load characteristics of the battery by using acetonitrile.

The nonaqueous secondary battery according to the present embodiment can function as a battery by initial charging, but is stabilized by partially decomposing the nonaqueous electrolyte solution at the time of initial charging. Initial charging is preferably carried out at 0.001 to 0.3 C, more preferably 0.002 to 0.25 C, and still more preferably 0.003 to 0.2 C. It is also possible to give preferable results by carrying out initial charging via constant voltage charging on the way. The constant current which discharges the design capacity in one hour is 1 C. By setting a long voltage range in which the lithium salt is involved in the electrochemical reaction, a stable and strong SEI is formed on a surface of the electrode, which exerts the effect of inhibiting an increase in internal resistance, and somehow exert satisfactory effect on members other than the negative electrode 160, such as the positive electrode 150 and the separator 170 without causing firm fixation of the reaction product to only the negative electrode 160. Therefore, it is remarkably effective to carry out initial charging in consideration of the electrochemical reaction of the lithium salt dissolved in the nonaqueous electrolyte solution.

The nonaqueous secondary battery 100 in the present embodiment can also be used as a battery pack in which a plurality of nonaqueous secondary batteries 100 are connected in series or in parallel. From the viewpoint of controlling the charging/discharging state of the battery pack, the working voltage range per one battery pack is preferably 2 to 5 V, more preferably 2.5 to 5 V, and particularly preferably 2.75 V to 5 V.

While embodiments for carrying out the present invention have been described above, the present invention is not limited to the above embodiments, and various modifications can be made without departing from the scope thereof.

EXAMPLES

Hereinafter, the present invention will be described in more detail by way of Examples. However, the present invention is not limited to these Examples.

First Embodiment (1) Preparation of Nonaqueous Electrolyte Solution

In an inert atmosphere, various nonaqueous solvents, various acid anhydrides and various additives were mixed so as to have a predetermined concentration. Further, various lithium salts were added so as to have a predetermined concentration to prepare aqueous electrolyte solutions (S1) to (S44).

Abbreviations of nonaqueous solvents, lithium salts and additives in Tables 1-1 to 1-6 have the following meanings, respectively. Parts by weight of each additive in Tables 1-1 to 1-6 indicates parts by weight based on 100 parts by weight of the nonaqueous electrolyte solution excluding the additive.

(Lithium Salt)
　$LiPF_6$: lithium hexafluorophosphate
　LiFSI: lithium bis(fluorosulfonyl)imide
　LiBOB: lithium bisoxalatoborate
　$LiFSO_3$: lithium fluorosulfonate
(Nonaqueous Solvent)
　AcN: acetonitrile
　EMC: ethyl methyl carbonate
　EC: ethylene carbonate
　VC: vinylene carbonate
　FEC: fluoroethylene carbonate
　DFA: 2,2-difluoroethylacetate
　DEC: diethyl carbonate
　GBL: γ-butyrolactone
　MBL: α-methyl-γ-butyrolactone
(Additive: Others)
　SAH: succinic anhydride
　TEVS: triethoxyvinylsilane

TABLE 1-1

| Electrolyte solution No. | Lithium salt | | | | Composition of nonaqueous solvent | | | | | |
| | $LiPF_6$ [mol/L] | LiFSI [mol/L] | LiBOB [mol/L] | $LiFSO_3$ [ppm by weight] | [% by volume] | | | | | |
| | | | | | AcN | EMC | EC | VC | FEC | Ethylene sulfite |
|---|---|---|---|---|---|---|---|---|---|---|
| S01 | 0.3 | 1 | — | — | 47 | — | — | 2 | — | 4 |
| S02 | 0.3 | 1.5 | — | — | 20 | 63.7 | 10 | 2 | — | 3.8 |
| S03 | 0.3 | 1 | — | — | 45.5 | 41 | 10 | 1.5 | — | 2 |
| S04 | 0.3 | 1 | — | — | 60 | 24.5 | 10 | 2 | — | 3.5 |
| S05 | 0.3 | 1 | — | — | 47 | — | — | 2 | — | 4 |

TABLE 1-1-continued

| Electrolyte solution No. | | | | | | | | | | |
|---|---|---|---|---|---|---|---|---|---|---|
| S06 | 0.3 | 1 | — | — | 60 | 24.5 | 10 | 2 | — | — |
| S07 | 0.3 | 1 | — | — | 60 | 24.5 | 10 | 2 | — | — |
| S08 | 0.3 | 1 | — | — | 60 | 24.5 | 10 | 2 | — | — |
| S09 | 0.3 | 1 | — | — | 60 | 24.5 | 10 | 2 | — | — |
| S10 | 0.3 | 1 | — | — | 45.5 | 36 | 10 | 3.5 | — | 5 |

| Electrolyte solution No. | Composition of nonaqueous solvent [% by volume] | | | | | | | | Additive [% by weight] | |
|---|---|---|---|---|---|---|---|---|---|---|
| | 3-Sulfolene | Dimethyl sulfite | Diethyl sulfite | Trimethylene sulfite | DFA | DEC | GBL | MBL | SAH | TEVS |
| S01 | — | — | — | — | 28 | — | — | 19 | — | — |
| S02 | — | — | — | — | — | — | — | — | — | — |
| S03 | — | — | — | — | — | — | — | — | — | — |
| S04 | — | — | — | — | — | — | — | — | — | — |
| S05 | — | — | — | — | 47 | — | — | — | — | — |
| S06 | 3.5 | — | — | — | — | — | — | — | — | — |
| S07 | — | 3.5 | — | — | — | — | — | — | — | — |
| S08 | — | — | 3.5 | — | — | — | — | — | — | — |
| S09 | — | — | — | 3.5 | — | — | — | — | — | — |
| S10 | — | — | — | — | — | — | — | — | — | — |

TABLE 1-2

| Electrolyte solution No. | Lithium salt | | | | Composition of nonaqueous solvent [% by volume] | | | | | |
|---|---|---|---|---|---|---|---|---|---|---|
| | LiPF$_6$ [mol/L] | LiFSI [mol/L] | LiBOB [mol/L] | LiFSO$_3$ [ppm by weight] | AcN | EMC | EC | VC | FEC | Ethylene sulfite |
| S11 | 1 | — | — | — | — | 69 | 29 | 2 | — | — |
| S12 | 0.3 | 1 | — | — | 49 | — | 21 | 2 | — | — |
| S13 | 1 | — | — | — | 35 | 41 | 20 | — | — | 4 |
| S14 | 0.3 | 1 | — | — | 40 | 35 | 10 | 11 | — | 4 |
| S15 | 0.3 | 1 | — | — | 45 | 28 | 10 | 7 | — | 10 |
| S16 | 0.3 | 1 | — | — | — | 65 | 26 | 7 | — | 2 |
| S17 | 0.3 | 1 | — | — | 10 | 60.5 | 20 | 7.5 | — | 2 |
| S18 | 0.3 | 1 | — | — | 49 | — | 4 | 2 | — | — |
| S19 | 0.3 | 1 | — | — | 49 | — | 21 | 2 | — | — |
| S20 | 1.3 | — | 0.1 | — | 47 | — | — | 11 | — | 4 |

| Electrolyte solution No. | Composition of nonaqueous solvent [% by volume] | | | | | | | | Additive [% by weight] | |
|---|---|---|---|---|---|---|---|---|---|---|
| | 3-Sulfolene | Dimethyl sulfite | Diethyl sulfite | Trimethylene sulfite | DFA | DEC | GBL | MBL | SAH | TEVS |
| S11 | — | — | — | — | — | — | — | — | — | — |
| S12 | — | — | — | — | — | 28 | — | — | 0.2 | — |
| S13 | — | — | — | — | — | — | — | — | — | — |
| S14 | — | — | — | — | — | — | — | — | — | — |
| S15 | — | — | — | — | — | — | — | — | — | — |
| S16 | — | — | — | — | — | — | — | — | — | — |
| S17 | — | — | — | — | — | — | — | — | — | — |
| S18 | — | — | — | — | 28 | — | — | 17 | — | — |
| S19 | — | — | — | — | — | 28 | — | — | — | — |
| S20 | — | — | — | — | — | 38 | — | — | — | — |

TABLE 1-3

| Electrolyte solution No. | Lithium salt | | | | Composition of nonaqueous solvent [% by volume] | | | | | |
|---|---|---|---|---|---|---|---|---|---|---|
| | LiPF$_6$ [mol/L] | LiFSI [mol/L] | LiBOB [mol/L] | LiFSO$_3$ [ppm by weight] | AcN | EMC | EC | VC | FEC | Ethylene sulfite |
| S21 | 0.3 | 1 | — | — | 49 | — | — | 2 | — | — |
| S22 | 0.3 | 1 | — | — | 49 | — | 21 | 2 | — | — |
| S23 | 0.3 | 1 | — | — | 49 | — | — | 2 | — | — |
| S24 | 0.3 | 1 | — | — | 49 | — | 21 | 2 | — | — |
| S25 | 0.3 | 1 | — | — | 47 | — | — | 1 | 1 | — |
| S26 | 0.3 | 1 | — | — | 49 | — | 16 | 2 | — | — |
| S27 | 0.3 | 1 | — | — | 49 | — | 10 | 2 | — | — |
| S28 | 0.3 | 1.5 | — | — | 5 | 78.7 | 10 | 2.5 | — | 3.8 |
| S29 | 0.3 | 1 | — | — | 10 | 73.7 | 10 | 2.5 | — | 3.8 |
| S30 | 0.3 | 1.25 | — | — | 10 | 73.7 | 10 | 2.5 | — | 3.8 |

| Electrolyte solution No. | Composition of nonaqueous solvent [% by volume] | | | | | | | | Additive [% by weight] | |
|---|---|---|---|---|---|---|---|---|---|---|
| | 3-Sulfolene | Dimethyl sulfite | Diethyl sulfite | Trimethylene sulfite | DFA | DEC | GBL | MBL | SAH | TEVS |
| S21 | — | — | — | — | — | 28 | — | 21 | — | — |
| S22 | — | — | — | — | 28 | — | — | — | — | — |
| S23 | — | — | — | — | 49 | — | — | — | — | — |
| S24 | — | — | — | — | — | 28 | — | — | — | — |
| S25 | — | — | — | — | 28 | — | — | 21 | — | — |
| S26 | — | — | — | — | 33 | — | — | — | — | — |
| S27 | — | — | — | — | 39 | — | — | — | — | — |
| S28 | — | — | — | — | — | — | — | — | — | — |
| S29 | — | — | — | — | — | — | — | — | — | — |
| S30 | — | — | — | — | — | — | — | — | — | — |

TABLE 1-4

| Electrolyte solution No. | Lithium salt | | | | Composition of nonaqueous solvent [% by volume] | | | | | |
|---|---|---|---|---|---|---|---|---|---|---|
| | LiPF$_6$ [mol/L] | LiFSI [mol/L] | LiBOB [mol/L] | LiFSO$_3$ [ppm by weight] | AcN | EMC | EC | VC | FEC | Ethylene sulfite |
| S31 | 0.3 | 1.5 | — | — | 10 | 73.7 | 10 | 2.5 | — | 3.8 |
| S32 | 0.3 | 1.5 | — | — | 20 | 63.7 | 10 | 2.5 | — | 3.8 |
| S33 | 0.3 | 1 | — | — | 10 | 62.7 | 21 | 2.5 | — | 3.8 |
| S34 | 0.3 | 1 | — | — | 10 | 74.7 | 10 | 2.5 | — | 2.8 |
| S35 | 0.3 | 1 | — | — | 10 | 79.7 | 4 | 2.5 | — | 3.8 |
| S36 | 0.3 | 1 | — | — | 10 | 66 | 21 | 3 | — | — |
| S37 | 0.3 | 1 | — | — | 20 | 34.5 | 21 | 2.5 | — | — |
| S38 | 0.3 | 1.5 | — | 5 | 10 | 73.7 | 10 | 2.5 | — | 3.8 |
| S39 | 0.3 | 1.5 | — | 1 | 20 | 63.7 | 10 | 2.5 | — | 3.8 |
| S40 | 0.3 | 1.5 | — | 0.1 | 65 | 18.7 | 10 | 2.5 | — | 3.8 |

| Electrolyte solution No. | Composition of nonaqueous solvent [% by volume] | | | | | | | | Additive [% by weight] | |
|---|---|---|---|---|---|---|---|---|---|---|
| | 3-Sulfolene | Dimethyl sulfite | Diethyl sulfite | Trimethylene sulfite | DFA | DEC | GBL | MBL | SAH | TEVS |
| S31 | — | — | — | — | — | — | — | — | — | — |
| S32 | — | — | — | — | — | — | — | — | — | — |
| S33 | — | — | — | — | — | — | — | — | — | — |
| S34 | — | — | — | — | — | — | — | — | — | — |
| S35 | — | — | — | — | — | — | — | — | — | — |
| S36 | — | — | — | — | — | — | — | — | — | — |
| S37 | — | — | — | — | — | — | 22 | — | — | — |
| S38 | — | — | — | — | — | — | — | — | — | — |
| S39 | — | — | — | — | — | — | — | — | — | — |
| S40 | — | — | — | — | — | — | — | — | — | — |

TABLE 1-5

| Electrolyte solution No. | Lithium salt | | | | Composition of nonaqueous solvent | | | | | |
|---|---|---|---|---|---|---|---|---|---|---|
| | LiPF$_6$ [mol/L] | LiFSI [mol/L] | LiBOB [mol/L] | LiFSO$_3$ [ppm by weight] | [% by volume] | | | | | |
| | | | | | AcN | EMC | EC | VC | FEC | Ethylene sulfite |
| S41 | 1 | — | — | 1,000 | — | 69 | 29 | 2 | — | — |
| S42 | 1 | — | — | 0 | — | 69 | 29 | 2 | — | — |
| S43 | 0.3 | 1.3 | — | 10 | 25 | 54 | 15 | 2 | — | 4 |
| S44 | 0.3 | 1.3 | — | 8 | 50 | 29 | 15 | 2 | — | 4 |

| Electrolyte solution No. | Composition of nonaqueous solvent [% by volume] | | | | | | | | Additive [% by weight] | |
|---|---|---|---|---|---|---|---|---|---|---|
| | 3-Sulfolene | Dimethyl sulfite | Diethyl sulfite | Trimethylene sulfite | DFA | DEC | GBL | MBL | SAH | TEVS |
| S41 | — | — | — | — | — | — | — | — | — | — |
| S42 | — | — | — | — | — | — | — | — | — | — |
| S43 | — | — | — | — | — | — | — | — | — | 0.1 |
| S44 | — | — | — | — | — | — | — | — | — | 0.5 |

TABLE 1-6

| Electrolyte solution No. | Lithium salt | | Composition of nonaqueous solvent [% by volume] | | | | |
|---|---|---|---|---|---|---|---|
| | LiPF6 [mol/L] | LiFSI [mol/L] | AcN | EMC | EC | VC | Ethylene sulfite |
| S45 | 1 | 0.3 | 35 | 39 | 20 | 2 | 4 |
| S46 | 1 | 0.3 | 35 | 49 | 10 | 2 | 4 |
| S47 | 1 | 0.3 | 35 | 59 | — | 2 | 4 |

(2) Fabrication of Nonaqueous Secondary Battery
(2-1) Fabrication of Positive Electrode
(2-1-1) Fabrication of Positive Electrode (P1)

A composite oxide of lithium, nickel, manganese and cobalt (LiNi$_{0.5}$Mn$_{0.3}$Co$_{0.2}$O$_2$) as a positive electrode active material (A), an acetylene black powder as a conductive aid (B), and polyvinylidene fluoride (PVDF) as a binder (C) were mixed at a weight ratio of 93.9:3.3:2.8 to obtain a positive electrode mixture.

N-methyl-2-pyrrolidone as the solvent was added to the obtained positive electrode mixture so as to have a solid content of 68% by weight, followed by further mixing to prepare a positive electrode mixture-containing slurry. While adjusting the basis weight of the positive electrode mixture-containing slurry, the positive electrode mixture-containing slurry was coated on one side of an aluminum foil having a thickness of 15 μm and a width of 280 mm, which serves as a positive electrode current collector, using a 3-roll transfer coater so as to have a coating pattern having a coating width of 240 to 250 mm, a coating length of 125 mm and a non-coating length of 20 mm, and then the solvent was dried and removed in a hot air drying furnace. Both sides of the electrode roll thus obtained were subjected to trimming cut, followed by drying under reduced pressure at 130° C. for 8 hours. Then, the electrode roll was rolled by a roll press so that the density of the positive electrode active material layer became 2.7 g/cm$^3$ to obtain a positive electrode (P1) composed of the positive electrode active material layer and the positive electrode current collector. The basis weight excluding the positive electrode current collector was 9.3 mg/cm$^2$.

(2-1-2) Fabrication of Positive Electrode (P2)

A composite oxide of lithium, nickel, manganese and cobalt (LiNi$_{0.8}$Mn$_{0.1}$Co$_{0.1}$O$_2$) as a positive electrode active material (A), an acetylene black powder as a conductive aid (B), and polyvinylidene fluoride (PVDF) as a binder (C) were mixed at a weight ratio of 94:3:3 to obtain a positive electrode mixture.

N-methyl-2-pyrrolidone as the solvent was added to the obtained positive electrode mixture so as to have a solid content of 68% by weight, followed by further mixing to prepare a positive electrode mixture-containing slurry. While adjusting the basis weight of the positive electrode mixture-containing slurry, the positive electrode mixture-containing slurry was coated on one side of an aluminum foil having a thickness of 15 μm and a width of 280 mm, which serves as a positive electrode current collector, using a 3-roll transfer coater so as to have a coating pattern having a coating width of 240 to 250 mm, a coating length of 125 mm and a non-coating length of 20 mm, and then the solvent was dried and removed in a hot air drying furnace. Both sides of the electrode roll thus obtained were subjected to trimming cut, followed by drying under reduced pressure at 130° C. for 8 hours. Then, the electrode roll was rolled by a roll press so that the density of the positive electrode active material layer became 2.9 g/cm$^3$ to obtain a positive electrode (P2) composed of the positive electrode active material layer and the positive electrode current collector. The basis weight excluding the positive electrode current collector was 16.6 mg/cm$^2$.

(2-2) Fabrication of Negative Electrode
(2-2-1) Fabrication of Negative Electrode (N1)

A graphite powder as a negative electrode active material (a), and a carboxymethyl cellulose (density of 1.60 g/cm$^3$) solution (solid component concentration of 1.83% by weight) and a diene-based rubber (glass transition temperature of −5° C., number-average particle size during drying: 120 nm, density of 1.00 g/cm$^3$, dispersion medium: water, solid component concentration of 40% by weight) as binders (c) were mixed at a solid component weight ratio of 97.4:1.1:1.5 to obtain a negative electrode mixture.

Water as the solvent was added to the negative electrode mixture thus obtained so as to have a solid content of 45% by weight, followed by further mixing to prepare a negative electrode mixture-containing slurry. While adjusting the basis weight of the negative electrode mixture-containing slurry, the negative electrode mixture-containing slurry was coated on one side of a copper foil having a thickness of 8

µm and a width of 280 mm, which serves as a negative electrode current collector, using a 3-roll transfer coater so as to have a coating pattern having a coating width of 240 to 250 mm, a coating length of 125 mm and a non-coating length of 20 mm, and then the solvent was dried and removed in a hot air drying furnace. Both sides of the electrode roll thus obtained were subjected to trimming cut, followed by drying under reduced pressure at 80° C. for 12 hours. Then, the electrode roll was rolled by a roll press so that the density of the negative electrode active material layer became 1.4 g/cm$^3$ to obtain a negative electrode (N1) composed of the negative electrode active material layer and the negative electrode current collector. The basis weight excluding the negative electrode current collector was 5.9 mg/cm$^2$.

(2-2-2) Fabrication of Negative Electrode (N2)

A graphite powder as a negative electrode active material (a), an acetylene black powder as a conductive aid (b), and polyvinylidene fluoride (PVDF) as a binder (c) were mixed at a weight ratio of 90.0:3.0:7.0 to obtain a negative electrode mixture.

Water as the solvent was added to the negative electrode mixture thus obtained so as to have a solid content of 45% by weight, followed by further mixing to prepare a negative electrode mixture-containing slurry. While adjusting the basis weight of the negative electrode mixture-containing slurry, the negative electrode mixture-containing slurry was coated on one side of a copper foil having a thickness of 8 µm and a width of 280 mm, which serves as a negative electrode current collector, using a 3-roll transfer coater so as to have a coating pattern having a coating width of 240 to 250 mm, a coating length of 125 mm and a non-coating length of 20 mm, and then the solvent was dried and removed in a hot air drying furnace. Both sides of the electrode roll thus obtained were subjected to trimming cut, followed by drying under reduced pressure at 80° C. for 12 hours. Then, the electrode roll was rolled by a roll press so that the density of the negative electrode active material layer became 1.4 g/cm$^3$ to obtain a negative electrode (N2) composed of the negative electrode active material layer and the negative electrode current collector. The basis weight excluding the negative electrode current collector was 11.9 mg/cm$^2$.

(2-3) Assembling of Battery (2-3-1) Assembling of Coin-Type Nonaqueous Secondary Battery A polypropylene gasket was set in a CR2032 type battery casing (SUS304/Al-cladding), and the positive electrode (P1) obtained as mentioned above punched in a disk shape having a diameter of 15.958 mm was set in the center of the gasket while the positive electrode active material layer faces upward. A glass fiber filter paper (GA-100, manufactured by Advantech Co., Ltd.) punched in a disk shape having a diameter of 16.156 mm was set therein, and 150 µL of electrolyte solutions (S1 to S27) were injected. Then, the negative electrode (N1) obtained as mentioned above punched in a disk shape having a diameter of 16.156 mm was set therein while the negative electrode active material layer faces downward. Further, a spacer and a spring were set in a battery casing, and a battery cap was fitted and crimped with a caulking machine. The overflowing electrolyte solution was wiped off with a waste cloth. After maintaining at a temperature of 25° C. for 12 hours to fully adapt the electrolyte solution to the layered product, a coin-type nonaqueous secondary battery (P1/N1) was obtained.

The same procedure was used to obtain a coin-type nonaqueous secondary battery (P2/N2) including P2 as the positive electrode, N2 as the negative electrode, and S11 and S28 to S32 as the nonaqueous electrolyte solutions.

(2-3-2) Assembling of Small Nonaqueous Secondary Battery

The positive electrode obtained as mentioned above punched in a disk shape having a diameter of 15.958 mm, and the negative electrode obtained as mentioned above punched in a disk shape having a diameter of 16.156 mm were overlapped on both sides of separators (B1 to B3) to obtain a layered product. The layered product was inserted into a SUS disk-shaped battery casing. Then, 200 µL of each of nonaqueous electrolyte solutions (S38 to S44) was injected into the battery casing to immerse the layered product in the nonaqueous electrolyte solution, followed by sealing the battery casing. After maintaining at a temperature of 25° C. for 12 hours to fully adapt the electrolyte solution to the layered product, a small nonaqueous secondary battery (P1/N1) was obtained.

The same procedure was used to obtain a coin-type nonaqueous secondary battery (P2/N2) including P2 as the positive electrode, N2 as the negative electrode, a polyethylene microporous membrane separator (thickness of 21 µm, air permeability of 285 sec/100 cm$^3$, porosity of 41%) as the separator, and S29 and S33 to S37 as the nonaqueous electrolyte solutions.

(2-4) Fabrication of Separator (2-4-1) Fabrication of Separator (B1)

[Method for Producing Silane Graft-Modified Polyolefin]

The polyolefin starting material to be used as the silane graft-modified polyolefin may have a viscosity-average molecular weight (Mv) of 100,000 or more and 1,000,000 or less, a weight-average molecular weight (Mw) of 30,000 or more and 920,000 or less and a number-average molecular weight of 10,000 or more and 150,000 or less, and may be a copolymerized α olefin of propylene or butene. An organic peroxide (di-t-butyl peroxide) was added while melt kneading the polyethylene starting material with an extruder to generate radicals in the polymer chain of the α olefin. Thereafter, trimethoxyalkoxide-substituted vinylsilane was injected into the kneaded mixture to cause an addition reaction. By the addition reaction, an alkoxysilyl group is introduced into the α, olefin polymer to form a silane-graft structure. A suitable amount of an antioxidant (pentaerythritoltetrakis[3-(3,5-di-tetra-butyl-4-hydroxyphenyl)propionate]) is simultaneously added to adjust the radical concentration in the system, thus inhibiting a chain-style chain reaction (gelation) in the α olefin. The obtained silane-grafted polyolefin molten resin is cooled in water and pelletized, and after heat drying at 80° C. for 2 days, the moisture and unreacted trimethoxyalkoxide-substituted vinylsilane are removed. The residual concentration of the unreacted trimethoxyalkoxide-substituted vinylsilane in the pellets is about 3,000 ppm or less.

<Fabrication of Substrate as First Layer>

To 30% by weight of a polyethylene homopolymer with a viscosity-average molecular weight of 3,000,000 (ultra-high molecular weight polyethylene (A)), 50% by weight of a polyethylene homopolymer with a viscosity-average molecular weight of 700,000 (polyethylene (B)) and 20% by weight of a silane-grafted polyethylene (silane-modified polyethylene (C)) having MFR of 0.4 g/min obtained by modification reaction of a polyolefin having a viscosity-average molecular weight of 125,000 as starting materials with trimethoxyalkoxide-substituted vinylsilane (the resin composition of (A):(B):(C) thus being 3:5:2), 1,000 ppm by weight of pentaerythrityl-tetrakis-[3-(3,5-di-t-butyl-4-hydroxyphenyl)propionate] as an antioxidant with respect to the entire resin were added, followed by dry mixing using a tumbler blender to obtain a mixture. To the ultra-high molecular weight polyethylene (A), 3,000 ppm of calcium stearate is mixed. The obtained mixture was supplied to a twin-screw extruder through a feeder in a nitrogen atmosphere. Also, liquid paraffin (kinematic viscosity at 37.78° C.: $7.59 \times 10^{-5}$ m$^2$/s) was injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70% by weight (i.e., polymer concentration of 30% by weight). The melt kneading conditions were as follows: a preset temperature of 230° C., a screw rotational speed of 240 rpm and a discharge throughput of 18 kg/h.

The melt kneaded mixture was then extrusion cast through a T-die on a cooling roll controlled to a surface temperature of 25° C. to obtain a gel sheet (sheet-shaped molded product) having a raw membrane thickness of 1,370 µm.

The sheet-shaped molded product was then simultaneously fed into a biaxial tenter stretching machine for biaxial stretching to obtain a stretched sheet. The stretching conditions were as follows: an MD factor of 7.0, a TD factor of 6.4 (i.e., a factor of 7.0×6.4) and a biaxial stretching temperature of 122° C. The stretched gel sheet was then fed into a dichloromethane tank and thoroughly immersed in the dichloromethane for extraction removal of the liquid paraffin, and then dichloromethane was dried off to obtain a porous structure. The porous structure was fed to a TD tenter heat setting (HS) was carried out at a heat setting temperature of 133° C. and a stretch ratio of 1.9, and then relaxation was carried out to a factor of 1.75 in the TD direction to obtain a microporous membrane. The edges of the microporous membrane were cut and rolled into a mother roll having a width of 1,100 mm and a length of 5,000 m.

During the evaluation, the microporous membrane wound out from the mother roll was slit as necessary for use as the evaluation substrate (first layer). With respect to the evaluation substrate, the membrane thickness, air permeability and porosity were measured. The evaluation results are shown in Table 4.

<Fabrication of Second Layer>
[Method for Synthesizing Resin Binder]

The acrylic latex to be used as the resin binder is produced by the following method.

In a reactor equipped with a stirrer, a reflux condenser, a drip tank and a thermometer, 70.4 parts by weight of ion-exchanged water, and 0.5 part by weight of "AQUALON KH1025" (registered trademark, aqueous 25% solution manufactured by Dai-ichi Kogyo Seiyaku Co., Ltd.) and 0.5 part by weight of "ADEKA REASOAP SR1025" (registered trademark, aqueous 25% solution manufactured by Adeka Corporation) as emulsifiers were charged. The temperature inside the reactor was then raised to 80° C., and 7.5 parts by weight of an aqueous 2% solution of ammonium persulfate was added while keeping the temperature at 80° C., to obtain an initial mixture. Five minutes after completion of the addition of the aqueous ammonium persulfate solution, the emulsified liquid was added dropwise from the drip tank into the reactor over a period of 150 minutes.

The emulsified liquid was prepared by forming a mixture of 70 parts by weight of butyl acrylate, 29 parts by weight of methyl methacrylate, 1 part by weight of methacrylic acid, 3 parts by weight of "AQUALON KH1025" (registered trademark, aqueous 25% solution manufactured by Dai-ichi Kogyo Seiyaku Co., Ltd.) and 3 parts by weight of "ADEKA REASOAP SR1025" (registered trademark, aqueous 25% solution manufactured by Adeka Corporation) as emulsifiers, 7.5 parts by weight of an aqueous 2% solution of ammonium persulfate, and 52 parts by weight of ion-exchanged water, and mixing the mixture with a homomixer for 5 minutes.

After completion of the dropwise addition of the emulsified liquid, the temperature inside the reactor was kept at 80° C. for 90 minutes, followed by cooling to room temperature. The obtained emulsion was adjusted to a pH of 8.0 with an aqueous 25% ammonium hydroxide solution, and then a small amount of water was added to obtain an acrylic latex with a solid content of 40%. The obtained acrylic latex had a number-average particle size of 145 nm and a glass transition temperature of −30° C.

A dispersion was prepared by homogeneously dispersing 95 parts by weight of aluminum hydroxide oxide (mean particle size: 1.4 µm) as inorganic particles and 0.4 part by weight (in terms of solid content) of an aqueous ammonium polycarboxylate solution (SN dispersant 5468 manufactured by SAN NOPCO LIMITED, solid component concentration: 40%) as an ionic dispersant, in 100 parts by weight of water. The obtained dispersion was shredded with a bead mill (cell volume: 200 cc, zirconia bead diameter: 0.1 mm, filling volume: 80%) and the particle size distribution of the inorganic particles was adjusted to D50=1.0 µm, to prepare an inorganic particle-containing slurry. To the dispersion with adjusted particle size distribution, 2.0 parts by weight (in terms of solid content) of the acrylic latex produced above as a resin binder was added.

The microporous membrane was then continuously wound out from a mother roll of the microporous membrane and one side of the microporous membrane was coated with the inorganic particle-containing slurry using a gravure reverse coater, followed by drying with a dryer at 60° C. to remove water, followed by winding up to obtain a separator mother roll.

During the evaluation, the separator wound out from the mother roll was slit as necessary for use as the evaluation substrate. Regarding inorganic particles as the second layer in Table 4, the inorganic particles are expressed as "ceramic".

(2-4-2) Fabrication of Separator (B2)

A separator (B2) was fabricated by the same method as in (2-4-1) above targeting the physical properties shown in Table 4.

(2-4-3) Fabrication of Separator (B3)
<Fabrication of Substrate as First Layer>

To 100% by weight of a polyethylene homopolymer with a viscosity-average molecular weight of 500,000, 1,000 ppm by weight of pentaerythrityl-tetrakis-[3-(3,5-di-t-butyl-4-hydroxyphenyl)propionate] as an antioxidant was added, followed by dry mixing using a tumbler blender to obtain a mixture. To the polyethylene homopolymer, 3,000 ppm of calcium stearate is mixed. The obtained mixture was supplied to a twin-screw extruder through a feeder in a nitrogen atmosphere. Also, liquid paraffin (kinematic viscosity at 37.78° C.: $7.59 \times 10^{-5}$ m$^2$/s) was injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70% by weight (i.e., polymer concentration of 30% by weight). The melt kneading conditions were as follows: a preset temperature of 230° C., a screw rotational speed of 240 rpm and a discharge throughput of 18 kg/h.

The melt kneaded mixture was then extrusion cast through a T-die on a cooling roll controlled to a surface temperature of 25° C. to obtain a gel sheet (sheet-shaped molded product) having a raw membrane thickness of 1,370 μm.

The sheet-shaped molded product was then simultaneously fed into a biaxial tenter stretching machine for biaxial stretching to obtain a stretched sheet. The stretching conditions were as follows: an MD factor of 7.0, a TD factor of 6.4 (i.e., a factor of 7.0×6.3) and a biaxial stretching temperature of 128° C. The stretched gel sheet was then fed into a dichloromethane tank and thoroughly immersed in the dichloromethane for extraction removal of the liquid paraffin, and then dichloromethane was dried off to obtain a porous structure. The porous structure was fed to a TD tenter and heat setting (HS) was carried out at a heat setting temperature of 133° C. and a stretch ratio of 1.95, and then relaxation was carried out to a factor of 1.75 in the TD direction to obtain a microporous membrane. The edges of the microporous membrane were cut and rolled into a mother roll having a width of 1,100 mm and a length of 5,000 m.

During the evaluation, the microporous membrane wound out from the mother roll was slit as necessary for use as the evaluation substrate (first layer). With respect to the evaluation substrate, the membrane thickness, air permeability and porosity were measured. The evaluation results are shown in Table 4.

<Fabrication of Second Layer>

A second layer was fabricated by the same method as in (2-4-1) above targeting the physical properties shown in Table 4.

(3) Evaluation of Nonaqueous Secondary Battery

For the coin-type nonaqueous secondary batteries (P1/N1) obtained as mentioned above (Examples 1 to 10 and Comparative Examples 1 to 17), first, an initial charging treatment and the initial charging/discharge capacity measurement were carried out according to the following procedure (3-1). Then, each coin-type nonaqueous secondary battery was evaluated according to the procedure (3-2). The charging/discharging was carried out using a charging/discharging apparatus ACD-M01A (trade name) manufactured by Aska Electronic Co., Ltd., and a program thermostatic bath IN804 (trade name) manufactured by Yamato Scientific Co., Ltd.

As used herein, "1 C" means the current value at which a fully charged battery is expected to be discharged in one hour with a constant current to terminate discharging.

Specifically, in a coin-type nonaqueous secondary battery (P1/N1), a coin-type nonaqueous secondary battery (P2/N2), a small nonaqueous secondary battery (P1/N1), and a small nonaqueous secondary battery (P2/N2), "1 C" means the current value at which a fully charged battery of 4.2 V is expected to be discharged to 3.0 V in one hour with a constant current to terminate discharging.

The coin-type nonaqueous secondary battery (P1/N1) and the small nonaqueous secondary battery (P1/N1) assembled according to the above procedure (2-3-1) are 3 mAh class cells, and the battery voltage at which the battery is fully charged is defined as 4.2 V, and a current corresponding to 1 C is set at 3 mA. Similarly, the coin-type nonaqueous secondary battery (P2/N2) and the small nonaqueous secondary battery (P2/N2) are 6 mAh class cells, and the battery voltage at which the battery is fully charged is defined as 4.2 V, and a current corresponding to 1 C is set at 6 mA. Hereinafter, unless otherwise specified, the notation of current value and the voltage is omitted for convenience.

(3-1) Initial Charging/Discharging Treatment of Nonaqueous Secondary Battery

After setting the ambient temperature of the coin-type nonaqueous secondary battery (P1/N1) at 25° C. and charging with a constant current corresponding to 0.1 C to reach a fully charged state, the battery was charged with a constant voltage for 1.5 hours. Then, the battery was discharged to a predetermined voltage with a constant current corresponding to 0.3 C. The initial efficiency was calculated by dividing this discharge capacity by the charging capacity. For the battery whose initial efficiency was less than 80%, the predetermined battery capacity was not satisfied and it was difficult to obtain correct evaluation results, thus failing to carry out subsequent evaluation tests. The discharge capacity at this time was defined as the initial capacity. According to the same procedure, the initial charging/discharging treatment of the coin-type nonaqueous secondary battery (P2/N2), the small nonaqueous secondary battery (P1/N1) and the small nonaqueous secondary battery (P2/N2) was carried out.

(3-2) Quick Charging Test of Nonaqueous Secondary Battery

The recovery charging capacity retention rate was calculated as follows. After the initial charging/discharging treatment, the battery was charged to 4.2 V with a constant current of 0.2 C. The charging current capacity at this time was defined as the charging capacity A. After discharging with a constant current of 0.5 C, the battery was charged to 4.2 V with a constant current of 15 mA/cm$^2$ which is the maximum charging current density. Then, the battery was discharged with a constant current of 0.5 C and charged again to 4.2 V with a constant current of 0.2 C. The charging current capacity at this time was defined as the charging capacity C. The charging capacity C when the charging capacity A was set at 100% was defined as the recovery charging capacity retention rate.

Recovery charging capacity retention rate=(charging capacity $C$/charging capacity $A$)×100[%]

After determining the charging capacity A and before charging with a constant current of 15 mA/cm$^2$ which is the maximum charging current density, charging/discharging may be repeated with each current value within a range in which the value of the charging capacity C does not change. Further, after charging with a constant current of 15 mA/cm$^2$ which is the maximum charging current density and before charging again to 4.2 V with a constant current of 0.2 C, charging/discharging may be repeated with each current value within a range in which the value of the charging capacity C does not change. The range in which the value of the charging capacity C does not change is the range in which the error from the value of the charging capacity C when charging/discharging is not repeated with each current value is within 3%.

(3-2-1) Quick Charging Test of Coin-Type Nonaqueous Secondary Battery (P1/N1) and Small Nonaqueous Secondary Battery (P1/N1)

For various nonaqueous secondary batteries (P1/N1) subjected to the initial charging/discharging treatment by the method mentioned in (3-1), the ambient temperature was set at 25° C. and the batteries were charged to 4.2 V with a constant current of 0.6 mA corresponding to 0.2 C. The charging current capacity at this time was defined as the charging capacity A. Thereafter, the batteries were discharged with a current value of 1.5 mA corresponding to 0.5 C to reach 2.7 V, and then discharged with a constant voltage of 2.7 V until the current attenuated to 0.3 mA corresponding to 0.1 C. Then, the same charging/discharging as above was carried out for 5 cycles.

Next, the batteries were charged to 4.2 V with a constant current of 15 mA corresponding to 5 C. Thereafter, the batteries were discharged with the current value of 1.5 mA corresponding to 0.5 C to reach 2.7 V, and then discharged with a constant voltage of 2.7 V until the current attenuated to 0.3 mA corresponding to 0.1 C. Thereafter, the same charging/discharging as above was carried out for 5 cycles.

Next, the batteries were charged to 4.2 V with a constant current of 30 mA (15 mA/cm$^2$) corresponding to 10 C. The charging current capacity at this time was defined as the charging capacity B. Thereafter, the batteries were discharged with a current value of 1.5 mA corresponding to 0.5 C to reach 2.7 V, and then discharged with a constant voltage of 2.7 V until the current attenuated to 0.3 mA corresponding to 0.1 C. Thereafter, the same charging/discharging as above was carried out for 5 cycles.

Next, various nonaqueous secondary batteries were charged to 4.2 V with a constant current of 0.6 mA corresponding to 0.2 C. The charging current capacity at this time was defined as the charging capacity C. Thereafter, the batteries were discharged with a current value of 1.5 mA corresponding to 0.5 C to reach 2.7 V, and then discharged with a constant voltage of 2.7 V until the current attenuated to 0.3 mA corresponding to 0.1 C. Thereafter, the same charging/discharging as above was carried out for 5 cycles, and a total of 20 cycles of charging/discharging was carried out.

(3-2-2) Calculation of Quick Charging Capacity Retention Rate of Coin-Type Nonaqueous Secondary Battery (P1/N1) and Small Nonaqueous Secondary Battery (P1/N1)

For various nonaqueous secondary batteries (P1/N1) subjected to the quick charging test by the method mentioned in (3-2-1), the quick charging capacity retention rate was calculated based on the following equation. At that time, a charging curve was made with reference to FIG. 3, and the presence or absence of a voltage plateau was observed in the voltage range of 3.9 to 4.2 V. The results are shown in Table 2-1 and Table 2-2.

Quick charging capacity retention rate=(charging capacity $B$/charging capacity $A$)×100 [%]

(3-2-3) Calculation of Recovery Charging Capacity Retention Rate of Coin-Type Nonaqueous Secondary Battery (P1/N1) and Small Nonaqueous Secondary Battery (P1/N1)

For various nonaqueous secondary batteries (P1/N1) subjected to the quick charging test by the method mentioned in (3-2-1), the recovery charging capacity retention rate was calculated based on the following equation. The results are shown in Table 2-1 and Table 2-2.

Recovery charging capacity retention rate=(charging capacity $C$/charging capacity $A$)×100[%]

Examples 1 to 10 and Comparative Examples 1 to 17

Here, the interpretation of the test results for the coin-type nonaqueous secondary battery (P1/N1) will be described.

The quick charging capacity retention rate is an index that the larger the value, the more the battery can be charged in a short time. The quick charging capacity retention rate is preferably 40% or more, more preferably 45% or more, and still more preferably 50% or more.

The recovery charging capacity retention rate is an index of irreversible capacity in the quick charging test. The larger this value is, the smaller the amount of lithium irreversibly consumed in the quick charging test, and thus a larger battery capacity can be used even after the quick charging. The recovery charging capacity retention rate is preferably 90% or more, more preferably 95% or more, and still more preferably 97% or more. Meanwhile, when the recovery charging capacity retention rate exceeds 100%, a continuous side reaction occurs in the battery, and thus the recovery charging capacity retention rate is preferably 100% or less. Even when the value of the quick charging capacity retention rate is large, the capacity of a battery with a small recovery charging capacity retention rate decreases quickly. Therefore, in order to satisfy practical battery performance, it is necessary to satisfy both performances of the quick charging capacity retention rate and the recovery charging capacity retention rate.

The voltage plateau observed in the voltage range of 3.9 to 4.2 V in the charging curve suggests that lithium metal is electrodeposited on the surface of the negative electrode. When the lithium metal is electrodeposited on the surface of the negative electrode, reductive decomposition of the nonaqueous electrolyte solution proceeds on the surface of the lithium metal, which leads to deterioration of the battery. Therefore, it is preferable that no voltage plateau is observed.

TABLE 2-1

| | | | Quick charging test | | |
|---|---|---|---|---|---|
| | Electrolyte solution No. | Positive electrode active material | Quick charging capacity retention rate [%] | Recovery charging capacity retention rate [%] | Presence or absence of voltage plateau |
| Example 1 | S01 | P1 | 62 | 99 | Not observed |
| Example 2 | S02 | P1 | 46 | 97 | Not observed |
| Example 3 | S03 | P1 | 63 | 96 | Not observed |
| Example 4 | S04 | P1 | 70 | 96 | Not observed |
| Example 5 | S05 | P1 | 73 | 95 | Not observed |
| Example 6 | S06 | P1 | 68 | 95 | Not observed |
| Example 7 | S07 | P1 | 67 | 96 | Not observed |
| Example 8 | S08 | P1 | 65 | 96 | Not observed |
| Example 9 | S09 | P1 | 66 | 95 | Not observed |
| Example 10 | S10 | P1 | 61 | 94 | Not observed |
| Comparative Example 1 | S11 | P1 | 21 | 94 | Observed |
| Comparative Example 2 | S12 | P1 | 5 | 63 | Observed |
| Comparative Example 3 | S13 | P1 | — | — | — |
| Comparative Example 4 | S14 | P1 | 68 | 76 | Observed |
| Comparative Example 5 | S15 | P1 | 70 | 86 | Observed |
| Comparative Example 6 | S16 | P1 | 5 | 94 | Observed |
| Comparative Example 7 | S17 | P1 | 52 | 74 | Observed |
| Comparative Example 8 | S18 | P1 | 66 | 180 | Observed |

TABLE 2-1-continued

|  | Electrolyte solution No. | Positive electrode active material | Quick charging test | | |
|---|---|---|---|---|---|
|  |  |  | Quick charging capacity retention rate [%] | Recovery charging capacity retention rate [%] | Presence or absence of voltage plateau |
| Comparative Example 9 | S19 | P1 | 69 | 79 | Observed |
| Comparative Example 10 | S20 | P1 | 66 | 87 | Observed |
| Comparative Example 11 | S21 | P1 | 64 | 89 | Observed |
| Comparative Example 12 | S22 | P1 | 69 | 75 | Observed |
| Comparative Example 13 | S23 | P1 | 70 | 81 | Observed |
| Comparative Example 14 | S24 | P1 | 69 | 75 | Observed |
| Comparative Example 15 | S25 | P1 | 71 | 89 | Observed |
| Comparative Example 16 | S26 | P1 | 61 | 85 | Observed |
| Comparative Example 17 | S27 | P1 | 63 | 152 | Observed |

In Examples 1 to 10, the results met the passing level in all the tests. Meanwhile, in Comparative Examples 1 to 2 and 4 to 17, voltage plateaus were all generated. In Comparative Example 1 and Comparative Example 6 in which nonaqueous electrolyte solutions are composed of a general carbonate solvent, the ionic conductivity is lower than that of the acetonitrile-containing nonaqueous electrolyte solution, so that the quick charging capacity retention rate was significantly inferior as compared with the Examples. In Comparative Example 2, even when using an acetonitrile-containing nonaqueous electrolyte solution having high ionic conductivity, an SEI on the surface of the negative electrode was constructed without using the oxygen-containing sulfur compound represented by the general formula (1), so that the movement of lithium ions was hindered and the quick charging capacity retention rate was significantly reduced as compared with the Examples. In Comparative Example 3, charging was continued greatly exceeding a predetermined battery capacity at the time of initial charging, and the subsequent discharge capacity was only 0.4 mAh with respect to the normal battery capacity of 3 mAh. From this result, it is considered that, in the acetonitrile-containing nonaqueous electrolyte solution in which only ethylene sulfite was added without adding vinylene carbonate, satisfactory negative electrode SEI was not formed at the time of initial charging, and reductive decomposition reaction of acetonitrile proceeded continuously. In Comparative Example 3, since the initial efficiency was less than 80%, the quick charging test after the initial charging/discharging treatment could not be carried out. In Comparative Example 4 and Comparative Example 10, the amount of vinylene carbonate added was larger than that of ethylene sulfite, and the total amount of vinylene carbonate and ethylene sulfite added exceeded 10% by volume, so that not only the properties of negative electrode SEI derived from vinylene carbonate became dominant, but also the internal resistance increased more than necessary due to the excessive amount of additives. Therefore, the movement of lithium ions was hindered, and the quick charging capacity retention rate significantly decreased as compared with the Examples. In Comparative Example 7, although the total amount of vinylene carbonate and ethylene sulfite added was 10% by volume or less, the amount of vinylene carbonate added was larger than that of ethylene sulfite added and the properties of the negative electrode SEI derived from vinylene carbonate became dominant. Therefore, the recovery charging capacity retention rate significantly decreases as compared with the Examples. In Comparative Example 5, although the amount of vinylene carbonate added was smaller than that of ethylene sulfite added, the total amount of vinylene carbonate and ethylene sulfite added exceeded 10% by volume, and thus the internal resistance increased more than necessary due to the excess amount of the additive. Therefore, the recovery capacity retention rate decreased as compared with the Examples. In Comparative Example 8, Comparative Example 9 and Comparative Examples 11 to 17, the nonaqueous electrolyte solution does not contain the oxygen-containing sulfur compound represented by the general formula (1) and satisfactory negative electrode SEI cannot be formed, so that the recovery charging capacity retention rate did not exceed 90%, or exceeded 100%. It is considered that irreversible deterioration progressed during quick charging.

From the above results, in the present embodiment, by adjusting the amount of vinylene carbonate and the oxygen-containing sulfur compound represented by the general formula (1) to an appropriate ratio, it was possible to prevent the occurrence of voltage plateaus while exhibiting excellent quick charging performance. Furthermore, since irreversible deterioration and electrodeposition during quick charging could be inhibited, excellent recovery charging capacity retention rate was exhibited.

Examples 11 to 16 and Comparative Examples 18 to 20

Here, the interpretation of the test results for the small nonaqueous secondary battery (P1/N1) will be described.

TABLE 2-2

|  | Electrolyte solution No. | Positive electrode active material | Separator | Quick charging test | | |
|---|---|---|---|---|---|---|
|  |  |  |  | Quick charging capacity retention rate [%] | Recovery charging capacity retention rate [%] | Presence or absence of voltage plateau |
| Example 11 | S38 | P1 | B3 | 69 | 96 | Not observed |
| Example 12 | S39 | P1 | B3 | 72 | 97 | Not observed |
| Example 13 | S40 | P1 | B3 | 72 | 96 | Not observed |
| Example 14 | S40 | P1 | B2 | 72 | 97 | Not observed |
| Example 15 | S43 | P1 | B1 | 68 | 95 | Not observed |
| Example 16 | S44 | P1 | B1 | 70 | 97 | Not observed |

TABLE 2-2-continued

|  | Electrolyte solution No. | Positive electrode active material | Separator | Quick charging test | | |
|---|---|---|---|---|---|---|
|  |  |  |  | Quick charging capacity retention rate [%] | Recovery charging capacity retention rate [%] | Presence or absence of voltage plateau |
| Comparative Example 18 | S41 | P1 | B3 | 67 | 85 | Observed |
| Comparative Example 19 | S42 | P1 | B2 | 63 | 83 | Observed |
| Comparative Example 20 | S42 | P1 | B1 | 59 | 81 | Observed |

In Examples 11 to 16, the results met the passing level in all the tests regardless of the type of the separator. Meanwhile, in Comparative Examples 18 to 20, which are nonaqueous electrolyte solutions composed of a general carbonate solvent, a voltage plateau was generated due to insufficient ionic conductivity. In Comparative Examples 18 to 20, the recovery capacity retention rate was significantly decreased as compared with the Examples.

(3-2-4) Quick Charging Test of Coin-Type Nonaqueous Secondary Battery (P2/N2) and Small Nonaqueous Secondary Battery (P2/N2)

For various nonaqueous secondary batteries (P2/N2) subjected to initial charging/discharging treatment by the method mentioned in (3-1), the ambient temperature was set at 25° C., and the batteries were charged to 4.2 V with a constant current of 1.2 mA corresponding to 0.2 C. The charging current capacity at this time was defined as the charging capacity A. Then, the batteries were discharged with a current value of 3 mA corresponding to 0.5 C to reach 2.7 V, and then discharged with a constant voltage of 2.7 V until the current attenuated to 0.6 mA corresponding to 0.1 C. Thereafter, the same charging/discharging as above was carried out for 5 cycles.

Next, the batteries were charged to 4.2 V with a constant current of 18 mA corresponding to 3 C. Then, the batteries were discharged with a current value of 3 mA corresponding to 0.5 C to reach 2.7 V, and then discharged with a constant voltage of 2.7 V until the current attenuated to 0.6 mA corresponding to 0.1 C. Thereafter, the same charging/discharging as above was carried out for 5 cycles.

Next, the batteries were charged to 4.2 V with a constant current of 30 mA (15 mA/cm$^2$) corresponding to 5 C. The charging current capacity at this time was defined as the charging capacity B. Then, the batteries were discharged with a current value of 3 mA corresponding to 0.5 C to reach 2.7 V, and then discharged with a constant voltage of 2.7 V until the current attenuated to 0.6 mA corresponding to 0.1 C. Thereafter, the same charging/discharging as above was carried out for 5 cycles.

Next, various nonaqueous secondary batteries were charged to 4.2 V with a constant current of 1.2 mA corresponding to 0.2 C. The charging current capacity at this time was defined as the charging capacity C. Thereafter, the batteries were discharged with a current value of 3.0 mA corresponding to 0.5 C to reach 2.7 V, and then discharged with a constant voltage of 2.7 V until the current attenuated to 0.6 mA corresponding to 0.1 C. Thereafter, the same charging/discharging as above was carried out for 5 cycles, and a total of 20 cycles of charging/discharging was carried out.

(3-2-5) Calculation of Quick Charging Capacity Retention Rate of Coin-Type Nonaqueous Secondary Battery (P2/N2) and Small Nonaqueous Secondary Battery (P2/N2)

For various nonaqueous secondary batteries (P2/N2) subjected to the quick charging test by the method mentioned in (3-2-4), the quick charging capacity retention rate was calculated based on the equation mentioned in (3-2-2). At that time, a charging curve was made with reference to FIG. 3, and the presence or absence of a voltage plateau was observed in the voltage range of 3.9 to 4.2 V. The results are shown in Tables 3-1 and 3-2.

(3-2-6) Calculation of Recovery Charging Capacity Retention Rate of Coin-Type Nonaqueous Secondary Battery (P2/N2) and Small Nonaqueous Secondary Battery (P2/N2)

For various nonaqueous secondary batteries (P2/N2) subjected to the quick charging test by the method mentioned in (3-2-5), the recovery charging capacity retention rate was calculated based on the formula mentioned in (3-2-3). The results are shown in Tables 3-1 and 3-2.

Examples 17 to 21 and Comparative Example 21

Here, the interpretation of the test results for the coin-type nonaqueous secondary battery (P2/N2) will be described. For the coin-type nonaqueous secondary battery (P2/N2), the quick charging capacity retention rate is preferably 20% or more, more preferably 25% or more, and still more preferably 30% or more.

The recovery charging capacity retention rate is preferably 95% or more, more preferably 97% or more, and still more preferably 98% or more. Even when the value of the quick charging capacity retention rate is large, the capacity of a battery with a small recovery charging capacity retention rate decreases quickly. Therefore, in order to satisfy practical battery performance, it is necessary to satisfy both performances of the quick charging capacity retention rate and the recovery charging capacity retention rate.

The voltage plateau observed in the voltage range of 3.9 to 4.2 V in the charging curve suggests that lithium metal is electrodeposited on the surface of the negative electrode. When the lithium metal is electrodeposited on the surface of the negative electrode, the reductive decomposition of the nonaqueous electrolyte solution proceeds on the surface of the lithium metal, which leads to deterioration of the battery. Therefore, it is preferable that no voltage plateau is observed.

TABLE 3-1

|  | Electrolyte solution No. | Positive electrode active material | Quick charging test | | |
|---|---|---|---|---|---|
|  |  |  | Quick charging capacity retention rate [%] | Recovery charging capacity retention rate [%] | Presence or absence of voltage plateau |
| Example 17 | S28 | P2 | 23 | 98 | Not observed |

TABLE 3-1-continued

| | Electrolyte solution No. | Positive electrode active material | Quick charging test | | |
|---|---|---|---|---|---|
| | | | Quick charging capacity retention rate [%] | Recovery charging capacity retention rate [%] | Presence or absence of voltage plateau |
| Example 18 | S29 | P2 | 22 | 96 | Not observed |
| Example 19 | S30 | P2 | 32 | 95 | Not observed |
| Example 20 | S31 | P2 | 21 | 99 | Not observed |
| Example 21 | S32 | P2 | 36 | 99 | Not observed |
| Comparative Example 21 | S11 | P2 | 11 | 93 | Observed |

In Examples 17 to 21, the results met the passing level in all the tests. Meanwhile, in Comparative Example 21 in which a nonaqueous electrolyte solution is composed of a general carbonate solvent, the quick charging capacity retention rate and the recovery charging capacity retention rate were lower than those of Examples 17 to 21, and a voltage plateau was also observed.

Examples 22 to 25 and Comparative Examples 22 to 23

Here, the interpretation of the test results for the small nonaqueous secondary battery (P2/N2) will be described. For the small nonaqueous secondary battery (P2/N2), the quick charging capacity retention rate is preferably 20% or more, more preferably 21% or more, and still more preferably 23% or more.

The recovery charging capacity retention rate is preferably 95% or more, more preferably 96% or more, and still more preferably 97% or more. Even when the value of the quick charging capacity retention rate is large, the capacity of a battery with a small recovery charging capacity retention rate decreases quickly. Therefore, in order to satisfy practical battery performance, it is necessary to satisfy both performances of the quick charging capacity retention rate and the recovery charging capacity retention rate.

The voltage plateau observed in the voltage range of 3.9 to 4.2 V in the charging curve suggests that lithium metal is electrodeposited on the surface of the negative electrode. When the lithium metal is electrodeposited on the surface of the negative electrode, the reductive decomposition of the nonaqueous electrolyte solution proceeds on the surface of the lithium metal, which leads to deterioration of the battery. Therefore, it is preferable that no voltage plateau is observed.

TABLE 3-2

| | Electrolyte solution No. | Positive electrode active material | Quick charging test | | |
|---|---|---|---|---|---|
| | | | Quick charging capacity retention rate [%] | Recovery charging capacity retention rate [%] | Presence or absence of voltage plateau |
| Example 22 | S33 | P2 | 20 | 96 | Not observed |
| Example 23 | S34 | P2 | 23 | 96 | Not observed |
| Example 24 | S29 | P2 | 22 | 97 | Not observed |
| Example 25 | S35 | P2 | 23 | 97 | Not observed |
| Comparative Example 22 | S36 | P2 | 17 | 85 | Observed |
| Comparative Example 23 | S37 | P2 | 20 | 86 | Observed |

In Examples 22 to 25, the results met the passing level in all the tests. Meanwhile, in Comparative Examples 22 to 23 in which the nonaqueous electrolyte solution does not contain an oxygen-containing sulfur compound, a voltage plateau was observed.

In general, ethylene carbonate has a role of strengthening the negative electrode SEI formed by the reductive decomposition of vinylene carbonate. However, especially in the case of a nonaqueous electrolyte solution containing acetonitrile, since the decomposition potentials of acetonitrile and ethylene carbonate may be close to each other and the internal resistance may be increased, the quick charging performance may also deteriorate along with this phenomenon. Therefore, it is required for ethylene carbonate to be adjusted to an appropriate range. Of Examples, in Examples 23 to 25 in which the amount of ethylene carbonate was small, the quick charging capacity retention rate was higher than that in Example 22.

(3-3) Cycle Test at 50° C. of Small Nonaqueous Secondary Battery (P2/N2)

For the small nonaqueous secondary battery (P2/N2) subjected to initial charging/discharging treatment by the method mentioned in (3-1), the ambient temperature was set at 50° C. First, the battery was charged with a constant current of 9 mA corresponding to 1.5 C to reach 4.2 V, and then charged with a constant voltage of 4.2 V until the current attenuated to 0.3 mA corresponding to 0.05 C. Then, the battery was discharged to 3.0 V with a constant current of 9 mA. Provided that this process of carrying out charging once and discharging once, respectively, serves as one cycle, charging/discharging was carried out for 100 cycles. The discharge capacity in the 100th cycle when the discharge capacity in the 1st cycle was 100% was defined as the capacity retention rate of the cycle test at 50° C.

Examples 26 to 29 and Comparative Examples 24 to 25

Here, the interpretation of each test result shown in Table 3-3 will be described. The capacity retention rate in the cycle test at 50° C. indicates the ratio of the discharge capacity in the 100th cycle to the discharge capacity in the 1st cycle. The larger the value, the more the battery capacity deteriorates when charging/discharging is repeated in a high-temperature environment. The capacity retention rate is preferably 85% or more, more preferably 86% or more, and still more preferably 88% or more.

TABLE 3-3

|  | Electrolyte solution No. | Positive electrode active material | Cycle test at 50° C. Capacity retention rate [%] |
|---|---|---|---|
| Example 26 | S33 | P2 | 85 |
| Example 27 | S34 | P2 | 86 |
| Example 28 | S29 | P2 | 88 |
| Example 29 | S35 | P2 | 86 |
| Comparative Example 24 | S36 | P2 | 82 |
| Comparative Example 25 | S37 | P2 | 81 |

As shown in Table 3-3, in Examples 26 to 29, it was confirmed that the decrease in capacity retention rate is small when the cycle was carried out in the environment at 50° C., and the cycle performance in the high-temperature environment is improved.

TABLE 4

|  |  |  |  |  | B1 | B2 | B3 |
|---|---|---|---|---|---|---|---|
| First layer |  | Thickness (TA) |  | μm | 11 | 16.2 | 14.5 |
|  |  | Porosity |  | % | 46 | 49 | 60 |
|  |  | Air permeability |  | sec/cm$^3$ | 140 | 165 | 78 |
|  |  | Puncture strength |  | gf | 470 | 642 | 378 |
|  | Calcium island structure | Number |  | Number | 5 | 3 | 20 |
|  |  | Size | Minimum value | μm$^2$ | 15 | 27 | 2 |
|  |  |  | Maximum value | μm$^2$ | 70 | 60 | 7 |
|  |  | Distance between weighted centers of gravity positions | Minimum value | μm | 20 | 16 | 1 |
|  |  |  | Maximum value | μm | 107 | 90 | 5 |
| Second layer | Inorganic particles | Type |  | — | Ceramic | Ceramic | Ceramic |
|  |  | Thickness (TB) |  | μm | 4.5 | 4.5 | 4.5 |
|  |  | Ratio (TA/TB) |  | — | 2.4 | 3.6 | 3.2 |

Third Embodiment (1) Preparation of Nonaqueous Electrolyte Solution

As shown in [Table 1-6], various nonaqueous solvents were mixed in an inert atmosphere so as to have a predetermined concentration, and then various lithium salts were added so as to have a predetermined concentration to prepare nonaqueous electrolyte solutions (S45) to (S47).

(2) Fabrication of Coin-Type Nonaqueous Secondary Battery (P3/N3)

(2-1) Fabrication of Positive Electrode (P3)

Lithium iron phosphate (LiFePO$_4$) having an olivine-type structure as a positive electrode active material (A), and a carbon black powder as a conductive aid (B) and polyvinylidene fluoride (PVDF) as a binder were mixed at a weight ratio of 89:3:8 to obtain a positive electrode mixture.

N-methyl-2-pyrrolidone as the solvent was added to the obtained positive electrode mixture so as to have a solid content of 68% by weight, followed by further mixing to prepare a positive electrode mixture-containing slurry. While adjusting the basis weight of the positive electrode mixture-containing slurry, the positive electrode mixture-containing slurry was coated on one side of an aluminum foil having a thickness of 15 μm and a width of 280 mm, which serves as a positive electrode current collector, using a 3-roll transfer coater so as to have a coating pattern having a coating width of 240 to 250 mm, a coating length of 125 mm and a non-coating length of 20 mm, and then the solvent was dried and removed in a hot air drying furnace. Both sides of the electrode roll thus obtained were subjected to trimming cut, followed by drying under reduced pressure at 130° C. for 8 hours. Then, the electrode roll was rolled by a roll press so that the density of the positive electrode active material layer became 1.8 g/cm$^3$ to obtain a positive electrode (P3) composed of the positive electrode active material layer and the positive electrode current collector. The basis weight excluding the positive electrode current collector was 11.0 mg/cm$^2$.

(2-2) Fabrication of Negative Electrode (N3)

A graphite powder as a negative electrode active material, a carbon black powder as a conductive aid and polyvinylidene fluoride (PVDF) as a binder were mixed at solid component weight ratio of negative electrode active material (90.0):conductive aid (3.0):binder (7.0) to obtain a negative electrode mixture.

Water as the solvent was added to the negative electrode mixture thus obtained so as to have a solid content of 45% by weight, followed by further mixing to prepare a negative electrode mixture-containing slurry. While adjusting the basis weight of the negative electrode mixture-containing slurry, the negative electrode mixture-containing slurry was coated on one side of a copper foil having a thickness of 8 μm and a width of 280 mm, which serves as a negative electrode current collector, using a 3-roll transfer coater so as to have a coating pattern having a coating width of 240 to 250 mm, a coating length of 125 mm and a non-coating length of 20 mm, and then the solvent was dried and removed in a hot air drying furnace. Both sides of the electrode roll thus obtained were subjected to trimming cut, followed by drying under reduced pressure at 80° C. for 12 hours. Then, the electrode roll was rolled by a roll press so that the density of the negative electrode active material layer became 1.3 g/cm$^3$ to obtain a negative electrode (N3) composed of the negative electrode active material layer and the negative electrode current collector. The basis weight excluding the negative electrode current collector was 5.4 mg/cm$^2$.

(2-3) Assembling of Coin-Type Nonaqueous Secondary Battery (P3/N3)

A polypropylene gasket was set in a CR2032 type battery casing (SUS304/Al-cladding), and the positive electrode (P3) obtained as mentioned above punched in a disk shape having a diameter of 15.958 mm was set in the center of the gasket while the positive electrode active material layer faces upward. A glass fiber filter paper (GA-100, manufactured by Advantech Co., Ltd.) punched in a disk shape having a diameter of 16.156 mm was set therein, and 150 μL of nonaqueous electrolyte solutions (S45 to S47) were injected. Then, the negative electrode (N3) obtained as mentioned above punched in a disk shape having a diameter of 16.156 mm was set therein while the negative electrode active material layer faces downward. Further, a spacer and a spring were set in a battery casing, and a battery cap was fitted and crimped with a caulking machine. The overflowing electrolyte solution was wiped off with a waste cloth. After maintaining at a temperature of 25° C. for 12 hours to fully adapt the electrolyte solution to the layered product, a coin-type nonaqueous secondary battery (P3/N3) was obtained.

(3) Evaluation of Coin-Type Nonaqueous Secondary Battery (P3/N3)

For the coin-type nonaqueous secondary batteries (P3/N3) obtained as mentioned above (Examples 30 to 32), first, an initial charging treatment and the initial charging/discharge capacity measurement were carried out according to the following procedure (3-1). Then, each coin-type nonaqueous secondary battery (P3/N3) was evaluated according to the procedure (3-2). The charging/discharging was carried out using a charging/discharging apparatus ACD-M01A (trade name) manufactured by Aska Electronic Co., Ltd., and a program thermostatic bath IN804 (trade name) manufactured by Yamato Scientific Co., Ltd.

As used herein, "1 C" means the current value at which a fully charged battery is expected to be discharged in one hour with a constant current to terminate discharging.

Specifically, in a coin-type nonaqueous secondary battery (P3/N3), "1 C" means the current value at which a fully charged battery of 4.2 V is expected to be discharged to 2.5 V in one hour with a constant current to terminate discharging.

The coin-type nonaqueous secondary battery (P3/N3) assembled according to the above procedure (2-3) is a 3 mAh class cell, and the battery voltage at which the battery is fully charged is defined as 4.2 V, and a current corresponding to 1 C is set at 3 mA. Hereinafter, unless otherwise specified, the notation of current value and the voltage is omitted for convenience.

(3-1) Initial Charging/Discharging Treatment of Nonaqueous Secondary Battery

After setting the ambient temperature of the coin-type nonaqueous secondary battery (P3/N3) at 25° C. and charging with a constant current corresponding to 0.1 C to reach a fully charged state, the battery was charged with a constant voltage for 1.5 hours. Then, the battery was discharged to a predetermined voltage with a constant current corresponding to 0.3 C. The initial efficiency was calculated by dividing this discharge capacity by the charging capacity. The discharge capacity at this time was defined as the initial capacity. For the battery whose initial efficiency was less than 80%, the predetermined battery capacity was not satisfied and it was difficult to obtain correct evaluation results, thus failing to carry out subsequent evaluation tests.

(3-2) Quick Charging Test of Nonaqueous Secondary Battery (P3/N3)

For the coin-type nonaqueous secondary battery (P3/N3) subjected to the initial charging/discharging treatment by the method mentioned in (3-1), the ambient temperature was set at 25° C., and the battery was charged to 4.2 V with a constant current of 0.6 mA corresponding to 0.2 C. The charging current capacity at this time was defined as the charging capacity A. Thereafter, the battery was discharged with a current value of 1.5 mA corresponding to 0.5 C to reach 2.0 V, and then discharged with a constant voltage of 2.0 V until the current attenuated to 0.3 mA corresponding to 0.1 C. Then, the same charging/discharging as above was carried out for 5 cycles.

Next, the battery was charged to 4.2 V with a constant current of 15 mA corresponding to 5 C. Thereafter, the battery was discharged with a current value of 1.5 mA corresponding to 0.5 C to reach 2.0 V, and then discharged with a constant voltage of 2.0 V until the current attenuated to 0.3 mA corresponding to 0.1 C. Thereafter, the same charging/discharging as above was carried out for 5 cycles.

Next, the battery was charged to 4.2 V with a constant current of 30 mA (15 mA/cm$^2$) corresponding to 10 C. The charging current capacity at this time was defined as the charging capacity B. Thereafter, the battery was discharged with a current value of 1.5 mA corresponding to 0.5 C to reach 2.0 V, and then discharged with a constant voltage of 2.0 V until the current attenuated to 0.3 mA corresponding to 0.1 C. Then, the same charging/discharging as above was carried out for 5 cycles.

Next, the coin-type nonaqueous secondary battery was charged to 4.2 V with a constant current of 0.6 mA corresponding to 0.2 C. The charging current capacity at this time was defined as the charging capacity C. Thereafter, the battery was discharged with a current value of 1.5 mA corresponding to 0.5 C to reach 2.0 V, and then discharged with a constant voltage of 2.0 V until the current attenuated to 0.3 mA corresponding to 0.1 C. Thereafter, the same charging/discharging as above was carried out for 5 cycles, and a total of 20 cycles of charging/discharging was carried out.

For the nonaqueous secondary battery subjected to the quick charging test by the method mentioned above, the quick charging capacity retention rate was calculated based on the following equation. At that time, a charging curve was made with reference to FIG. 3, and the presence or absence of a voltage plateau was observed in the voltage range of 3.0 to 4.2 V. The results are shown in Table 5-1.

Quick charging capacity retention rate=(charging capacity $B$/charging capacity $A$)×100 [%]

For the nonaqueous secondary battery subjected to the quick charging test by the method mentioned above, the recovery charging capacity retention rate was calculated based on the following equation. The results are shown in Table 5-1.

Recovery charging capacity retention rate=(charging capacity $C$/charging capacity $A$)×100[%]

Examples 30 to 32

Here, the interpretation of the test results for the coin-type nonaqueous secondary battery (P3/N3) will be described.

The quick charging capacity retention rate is an index that the larger the value, the more the battery can be charged in a short time. The quick charging capacity retention rate is preferably 40% or more, more preferably 43% or more, and still more preferably 45% or more.

The recovery charging capacity retention rate is an index of irreversible capacity in the quick charging test. The larger this value is, the smaller the amount of lithium irreversibly consumed in the quick charging test, and thus a larger battery capacity can be used even after the quick charging. The recovery charging capacity retention rate is preferably 90% or more, more preferably 95% or more, and still more preferably 97% or more.

The voltage plateau observed in the voltage range of 3.0 to 4.2 V in the charging curve suggests that lithium metal is electrodeposited on the surface of the negative electrode. When the lithium metal is electrodeposited on the surface of the negative electrode, reductive decomposition of the non-aqueous electrolyte solution proceeds on the surface of the lithium metal, which leads to deterioration of the battery. Therefore, it is preferable that no voltage plateau is observed.

TABLE 5-1

|  | | Quick charging test | | |
|---|---|---|---|---|
| Electrolyte solution No. | Positive electrode active material | Quick charging capacity retention rate [%] | Recovery charging capacity retention rate [%] | Presence or absence of voltage plateau |
| Example 30 | S45 | P3 | 48 | 97 | Not observed |
| Example 31 | S46 | P3 | 49 | 97 | Not observed |
| Example 32 | S47 | P3 | 51 | 98 | Not observed |

In Examples 30 to 32, the results met the passing level in all the tests.

(3-3) Cycle Test at 50° C. of Coin-Type Nonaqueous Secondary Battery (P3/N3)

For the coin-type nonaqueous secondary battery (P3/N3) subjected to the initial charging/discharging treatment by the method mentioned in (3-1), the ambient temperature was set at 50° C. First, the battery was charged with a constant current of 4.5 mA corresponding to 1.5 C to reach 4.2 V, and then charged with a constant voltage of 4.2 V until the current attenuated to 0.15 mA corresponding to 0.05 C. Thereafter, the battery was discharged to 2.5 V with a constant current of 4.5 mA. Provided that this process of carrying out charging once and discharging once, respectively, serves as one cycle, charging/discharging was carried out for 100 cycles. The discharge capacity in the 100th cycle when the discharge capacity in the 1st cycle was 100% was defined as the capacity retention rate of the cycle test at 50° C.

For the coin-type nonaqueous secondary battery (P3/N3) subjected to the cycle test at 50° C. by the above method, DCIR was calculated based on the following equation. The results are shown in Table 5-2.

DCIR=(voltage 10 seconds after start of discharging−voltage immediately before discharging)/current [Ω]

Based on the following equation, the DCIR increase rate in the cycle test at 50° C. was calculated. The results are shown in Table 5-2.

DCIR increase rate=DCIR in the 100th cycle/DCIR in the 1st cycle×100[%]

Examples 33 to 35

Here, the interpretation of each test results shown in Table 5-2 will be described.

The capacity retention rate in the cycle test at 50° C. indicates the ratio of the discharge capacity in the 100th cycle to the discharge capacity in the 1st cycle. The larger the value, the more the battery capacity deteriorates when charging/discharging is repeated in a high-temperature environment. The capacity retention rate is preferably 88% or more, more preferably 89% or more, and still more preferably 90% or more. DCIR (abbreviation for direct current internal response) gradually increases as the battery deteriorates, leading to a decrease in battery capacity. If an SEI of the negative electrode is strengthened too much, DCIR increases and the voltage decreases significantly immediately after the start of discharging, thus failing to take out a predetermined battery capacity. Therefore, DCIR in the 1st cycle is preferably 41Ω or less, more preferably 40.5Ω r less, and still more preferably 40Ω or less. The DCIR increase rate is preferably 120% or less, more preferably 115% or less, and still more preferably 111% or less.

TABLE 5-2

| | | | Cycle test at 50° C. | | |
|---|---|---|---|---|---|
| Electrolyte solution No. | Positive electrode active material | Capacity retention rate [%] | DCIR in 1st cycle [Ω] | DCIR in 100th cycle [Ω] | DCIR increase rate [%] |
| Example 33 | S45 | P3 | 90 | 40.9 | 45.4 | 111 |
| Example 34 | S46 | P3 | 90 | 39.4 | 45.3 | 115 |
| Example 35 | S47 | P3 | 86 | 41.8 | 51.0 | 122 |

In Examples 33 to 34, it was confirmed that the capacity slightly decreases when the cycle test at high temperature was carried out, the DCIR increase rate was inhibited, and the cycle performance was improved. Meanwhile, in Example 35 using the nonaqueous electrolyte solution containing no ethylene carbonate, an increase in DCIR during the cycle test at 50° C. was larger than that in Examples 33 to 34, and the capacity retention rate in the cycle test at 50° C. decreased.

From the above results, it was confirmed that, in the present embodiment, a positive electrode containing a compound having an olivine-type structure represented by the formula $Li_wFePO_4$, wherein w is 0.05 to 1.1, as a positive electrode active material, and an electrolyte solution containing acetonitrile and ethylene in which vinylene carbonate and ethylene sulfite are adjusted in an appropriate ratio, are combined, thereby forming a highly heat-resistant negative electrode SEI, which has low initial resistance and is capable of inhibiting an increase in resistance even if charging/discharging is repeated in a high-temperature environment, on the negative electrode surface, and thus exhibiting excellent high-temperature cycle performance.

Second Embodiment (1) Preparation of Nonaqueous Electrolyte Solution

In an inert atmosphere, various nonaqueous solvents were mixed so as to have a predetermined concentration. Further, various lithium salts were added so as to have a predetermined concentration to prepare aqueous electrolyte solutions (5101) to (S112). The compositions of these nonaqueous electrolyte solutions are shown in Table 6.

<Description of Abbreviations in Table 6>
(Nonaqueous Solvent)
  AN: acetonitrile
  EMC: ethyl methyl carbonate
  EC: ethylene carbonate
  ES: ethylene sulfite
  VC: vinylene carbonate
(Lithium Salt)
  $LiPF_6$: lithium hexafluorophosphate
  LiFSI: lithium bis(fluorosulfonyl)imide ($LiN(SO_2F)_2$)
  $LiFSO_3$: lithium fluorosulfonate

TABLE 6

| Electrolyte solution No. | Lithium salt | | | Composition of nonaqueous solvent [% by volume] | | | | |
|---|---|---|---|---|---|---|---|---|
| | $LiPF_6$ [mol/L] | LiFSI [mol/L] | $LiFSO_3$ [pm by weight] | AN | EMC | EC | ES | VC |
| S101 | — | 1 | 90 | 48.5 | 28 | 21 | — | 2.5 |
| S102 | — | 0.1 | 10 | 48.5 | 28 | 21 | — | 2.5 |
| S103 | 0.3 | 1 | 50 | 48.5 | 28 | 21 | — | 2.5 |
| S104 | 1 | 0.3 | 50 | 48.5 | 28 | 21 | — | 2.5 |
| S105 | 1.3 | — | — | 48.5 | 28 | 21 | — | 2.5 |
| S106 | — | — | — | 48.5 | 28 | 21 | — | 2.5 |
| S107 | 0.3 | 1 | 5 | 35 | 42 | 21 | — | 2 |
| S108 | 0.3 | 1 | 30 | 35 | 42 | 21 | — | 2 |
| S109 | 0.3 | 1 | 250 | 35 | 42 | 21 | — | 2 |
| S110 | 0.3 | 1 | 20 | 5 | 62.5 | 30 | — | 2.5 |
| S111 | 0.3 | 1 | 20 | 10 | 53.5 | 30 | 4 | 2.5 |
| S112 | — | 1 | 80 | 44 | 28 | 21 | 4.5 | 2.5 |

(2) Storage Test of Nonaqueous Electrolyte Solution
(2-1) Storage Test at 25° C. or 85° C. for One Hour of Nonaqueous Electrolyte Solution For the nonaqueous electrolyte solutions (S101) to (S106) and (S38) to (S40) obtained as mentioned above, a storage test at 25° C. or 85° C. for one hour was carried out.

The nonaqueous electrolyte solution was collected in a SUS container in an argon box, and after sealing, nonaqueous electrolyte solution was stored in a thermostatic bath at 25° C. or 85° C. for one hour. Next, the nonaqueous electrolyte solution after storage was subjected to neutralization titration with a 0.01 M sodium hydroxide-methanol solution, and the obtained acid content was measured as HF. The measurement results were evaluated according to the following criteria.

Evaluation Criteria:
  A: Acid content is 0.01 ppm by weight or more and less than 20 ppm by weight.
  B: Acid content is 20 ppm by weight or more and less than 60 ppm by weight.
  C: Acid content is 60 ppm by weight or more and less than 100 ppm by weight.
  D: Acid content is 100 ppm by weight or more.
  E: Acid content is less than 0.01 ppm by weight.

An excessive amount of HF adversely affects battery performance, for example, it corrodes materials such as electrodes and current collectors to cause decomposition of the solvent. Therefore, the amount of HF generated after storage at 25° C. or 85° C. for one hour is preferably less than 100 ppm by weight, more preferably less than 60 ppm by weight, and still more preferably less than 20 ppm by weight. Since a small amount of HF generated at normal temperature serves as a catalyst for forming a negative electrode SEI or promoting a silane crosslinking reaction of a silane-modified polyolefin, the amount of HF generated after storage at 25° C. for one hour is preferably 0.01 ppm by weight or more. The test results are shown in Table 7-1.

TABLE 7-1

| | Electrolyte solution No. | Amount of HF generated | |
|---|---|---|---|
| | | 25° C. | 85° C. |
| Example 101 | S101 | A | A |
| Example 102 | S102 | A | A |
| Example 103 | S103 | A | B |
| Example 104 | S104 | B | C |
| Example 105 | S38 | A | B |
| Example 106 | S39 | A | B |
| Example 107 | S40 | A | B |
| Comparative Example 101 | S105 | B | D |
| Comparative Example 102 | S106 | E | E |

It was found from a comparison between Examples 101 to 107 and Comparative Examples 101 to 102 with respect to the amount of HF generated after storage at 85° C. for one hour that the amount of HF generated under high-temperature conditions can be adjusted to 0.01 ppm by weight or more and less than 100 ppm by weight by adjusting the $LiFSO_3$ content within an appropriate range. Especially, it was found from a comparison of Examples 101 to 107 that the amount of HF generated under high-temperature conditions can be inhibited to 0.01 ppm by weight or more and less than 60 ppm by weight by containing $LiPF_6$ within a range of $LiPF_6$<lithium-containing imide salt, and the amount of HF generated under high-temperature conditions can be inhibited to 0.01 ppm by weight or more and less than 20 ppm by weight by not containing $LiPF_6$.

It was also found from a comparison between Examples 101 to 107 and Comparative Example 102 with respect to the amount of HF generated after storage at 25° C. for one hour that the amount of HF generated under room temperature conditions can be adjusted to 0.01 ppm by weight or more by adjusting the $LiFSO_3$ content within an appropriate range. Especially, it was found from a comparison between Examples 101 to 103 and 105 to 107 and Example 104 that the amount of HF generated under room temperature conditions can be inhibited to 0.01 ppm by weight or more and less than 20 ppm by weight by not containing $LiPF_6$, or by containing $LiPF_6$ within a range of $LiPF_6$<lithium-containing imide salt.

(2-2) Storage Test at 85° C. for 24 Hours of Nonaqueous Electrolyte Solution

The nonaqueous electrolyte solutions (5101) to (S105) obtained as mentioned above were subjected to a storage test at 85° C. for 24 hours.

In an argon box, a nonaqueous electrolyte solution was collected in an NMR tube inner tube (diameter of 3 mm), and after covering, the argon box was sealed with a parafilm. After storing this NMR tube inner tube at 85° C. for 24 hours, the NMR tube inner tube was taken out from the argon box and inserted into an outer tube filled with a DMSO-$d_6$ solution containing $C_6H_2F_4$, and then NMR measurement by the double tube method was carried out. As the NMR measuring device, ECS400 manufactured by JEOL RESONANCE Inc. was used. The measurement conditions were as follows: pulse angle of 45°, number of scans of 256 times, and measuring temperature of 25° C. The amount of hydrogen fluoride (HF) generated was quantitatively determined from the results of NMR.

An excessive amount of HF adversely affects battery performance, for example, it corrodes materials such as electrodes and current collectors to cause decomposition of the solvent. Therefore, the amount of HF generated after storage at 85° C. for 24 hours is preferably 1,000 ppm by weight or less, more preferably 500 ppm by weight or less, and still more preferably 100 ppm by weight or less. The test results are shown in Table 7-2.

TABLE 7-2

|  | Electrolyte solution No. | Amount of HF generated [ppm] 85° C. |
| --- | --- | --- |
| Example 108 | S101 | <100 |
| Example 109 | S102 | <100 |
| Example 110 | S103 | 483 |
| Example 111 | S104 | 940 |
| Comparative Example 103 | S105 | 1,490 |

It was found from a comparison between Examples 108 to 111 and Comparative Example 103 with respect to the amount of HF generated after storage at 85° C. for 24 hours that the amount of HF generated under high-temperature conditions can be adjusted to 1,000 ppm by weight or less by adjusting the $LiFSO_3$ content within an appropriate range. Especially, it was found from a comparison of Examples 108 to 111 that the amount of HF generated under high-temperature conditions can be inhibited to 500 ppm by weight or less by containing $LiPF_6$ within a range of $LiPF_6$<lithium-containing imide salt, and the amount of HF generated under high-temperature conditions can be inhibited to 100 ppm by weight or less by not containing $LiPF_6$.

(3) Fabrication of Coin-Type Nonaqueous Secondary Battery (3-1) Fabrication of Positive Electrode Lithium iron phosphate ($LiFePO_4$) having an olivine-type structure as a positive electrode active material, a carbon black powder as a conductive aid, and polyvinylidene fluoride (PVDF) as a binder were mixed at a weight ratio of 84:10:6 to obtain a positive electrode mixture.

N-methyl-2-pyrrolidone as the solvent was added to the obtained positive electrode mixture so as to have a solid content of 68% by weight, followed by further mixing to prepare a positive electrode mixture-containing slurry. While adjusting the basis weight of the positive electrode mixture-containing slurry, the positive electrode mixture-containing slurry was coated on one side of an aluminum foil having a thickness of 15 µm and a width of 280 mm, which serves as a positive electrode current collector, using a 3-roll transfer coater so as to have a coating pattern having a coating width of 240 to 250 mm, a coating length of 125 mm and a non-coating length of 20 mm, and then the solvent was dried and removed in a hot air drying furnace. Both sides of the electrode roll thus obtained were subjected to trimming cut, followed by drying under reduced pressure at 130° C. for 8 hours. Then, the electrode roll was rolled by a roll press so that the density of the positive electrode active material layer became 1.9 g/cm$^3$ to obtain a positive electrode composed of the positive electrode active material layer and the positive electrode current collector. The basis weight excluding the positive electrode current collector was 17.5 mg/cm$^2$.

(3-2) Fabrication of Negative Electrode

A graphite powder as a negative electrode active material, a carbon black powder as a conductive aid, and carboxymethyl cellulose and styrene-butadiene rubber as binders were mixed at a solid component weight ratio of 95.7:0.5:3.8 to obtain a negative electrode mixture.

Water as the solvent was added to the negative electrode mixture thus obtained so as to have a solid content of 45% by weight, followed by further mixing to prepare a negative electrode mixture-containing slurry. While adjusting the basis weight of the negative electrode mixture-containing slurry, the negative electrode mixture-containing slurry was coated on one side of a copper foil having a thickness of 8 µm and a width of 280 mm, which serves as a negative electrode current collector, using a 3-roll transfer coater so as to have a coating pattern having a coating width of 240 to 250 mm, a coating length of 125 mm and a non-coating length of 20 mm, and then the solvent was dried and removed in a hot air drying furnace. Both sides of the electrode roll thus obtained were subjected to trimming cut, followed by drying under reduced pressure at 80° C. for 12 hours. Then, the electrode roll was rolled by a roll press so that the density of the negative electrode active material layer became 1.5 g/cm$^3$ to obtain a negative electrode composed of the negative electrode active material layer and the negative electrode current collector. The basis weight excluding the negative electrode current collector was 7.5 mg/cm$^2$.

(3-3) Assembling of Coin-Type Nonaqueous Secondary Battery

A polypropylene gasket was set in a CR2032 type battery casing (SUS304/Al-cladding), and the positive electrode obtained as mentioned above punched in a disk shape having a diameter of 15.958 mm was set in the center of the gasket while the positive electrode active material layer faces upward. A glass fiber filter paper (GA-100, manufactured by Advantech Co., Ltd.) punched in a disk shape having a diameter of 16.156 mm was set therein, and 150 µL of a nonaqueous electrolyte solution was injected. Then, the negative electrode obtained as mentioned above punched in a disk shape having a diameter of 16.156 mm was set therein while the negative electrode active material layer faces downward. Further, a spacer and a spring were set in a battery casing, and a battery cap was fitted and crimped with a caulking machine. The overflowing electrolyte solution was wiped off with a waste cloth. After maintaining at a temperature of 25° C. for 12 hours to fully adapt the electrolyte solution to the layered product, a coin-type nonaqueous secondary battery was obtained.

(4) Evaluation of Coin-Type Nonaqueous Secondary Battery

For the coin-type nonaqueous secondary batteries obtained as mentioned above, first, an initial charging treatment and the initial charging/discharge capacity measurement were carried out according to the following procedure (4-1). Then, each coin-type nonaqueous secondary battery was evaluated according to the procedure (4-2). The charging/discharging was carried out using a charging/discharging apparatus ACD-M01A (trade name) manufactured by Aska Electronic Co., Ltd., and a program thermostatic bath IN804 (trade name) manufactured by Yamato Scientific Co., Ltd.

As used herein, "1 C" means the current value at which a fully charged battery is expected to be discharged in one hour with a constant current to terminate discharging.

(4-1) Initial Charging/Discharging Treatment of Nonaqueous Secondary Battery

After setting the ambient temperature of the coin-type nonaqueous secondary battery at 25° C. and charging with a constant current of 0.46 mA corresponding to 0.1 C to reach 3.8 V, the battery was discharged with a constant voltage of 3.8 V until the current attenuated to 0.05 C. Thereafter, the battery was discharged to 2.5 V with a constant current of 1.38 mA corresponding to 0.3 C.

(4-2) Cycle Test at 25° C.

For the coin-type nonaqueous secondary battery subjected to the initial charging/discharging treatment by the method mentioned in (4-1), the ambient temperature was set at 25° C. and the battery was charged with a constant current of 6.9 mA corresponding to 1.5 C to reach 3.8 V, and then charged with a constant voltage of 3.8 V until the current attenuated to 0.05 C. Thereafter, the battery was discharged to 2.5 V with a constant current of 6.9 mA corresponding to 1.5 C. Provided that this process of carrying out charging once and discharging once, respectively, serves as one cycle, charging/discharging was carried out for 100 cycles. In the 1st cycle, 50th cycle, and 100th cycle, the battery was charged with a constant current of 4.6 mA corresponding to 1 C to reach 3.8V, and then charged with a constant voltage of 3.8V until the current attenuated to 0.05 C. Thereafter, the battery was discharged to 2.5 V with a constant current of 1.38 mA corresponding to 0.3 C.

The discharge capacity in the 99th cycle at the time of the cycle test when the discharge capacity in the 1st cycle at the time of the initial charging/discharging treatment was set at 100% was determined as the cycle capacity retention rate at 25° C., and then evaluated according to the following criteria.

Evaluation Criteria:
A: Capacity retention rate is 80% or more.
B: Capacity retention rate is 70% or more and less than 80%.
C: Capacity retention rate is less than 70%.

The cycle capacity retention rate at 25° C. is an index of output performance and battery deterioration during long-term use at normal temperature. It is considered that the larger this value is, the less the reduction in capacity due to long-term use at normal, and higher output performance can be maintained for a long period of time. Therefore, the cycle capacity retention rate at 25° C. is preferably 70% or more, and more preferably 80% or more. The obtained evaluation results are shown in Table 8.

(4-3) AC Impedance Measurement

For the coin-type nonaqueous secondary battery subjected to a cycle test at 25° C. by the method mentioned in (4-2), the battery was charged with a constant voltage of 3.8 V until the current attenuated to 0.05 C after reaching 3.8 V with a constant current of 4.6 mA corresponding to 1 C, and then AC impedance was measured. For the measurement, a frequency response analyzer 1400 (trade name) manufactured by Solartron Metrology and a potentiostat/galvanostat 1470E (trade name) manufactured by Solartron Metrology were used. An AC signal was applied while changing the frequency from 1,000 kHz to 0.01 Hz, and the impedance was measured from the voltage/current response signals to obtain the AC impedance value. For the AC impedance value, the real number component (Z') of the impedance at a frequency of 1 kHz was read. The amplitude of the AC voltage to be applied was ±5 mV, and the ambient temperature of the battery when measuring the AC impedance was 25° C.

The AC impedance value at 1 kHz corresponds to the sum of the interfacial resistance component and the bulk resistance component of the negative electrode. Since the battery members used in this test and the electrolyte composition excluding the amount of $LiFSO_3$ added are all the same, there is no difference in the bulk resistance component. Therefore, it is considered that the smaller this value, the more an increase in interface resistance component of the negative electrode in the cycle test at 25° C. is inhibited. The obtained evaluation results are shown in Table 8.

TABLE 8

| | Electrolyte solution No. | Cycle capacity retention at 25 °C. | AC impedance value [Ω] |
|---|---|---|---|
| Example 112 | S107 | A | 10.0 |
| Example 113 | S108 | A | 10.3 |
| Comparative Example 104 | S109 | C | 12.4 |

In Comparative Example 104 in which the content of $LiFSO_3$ is more than 200 ppm by weight, the cycle capacity retention rate at 25° C. was less than 70%, whereas, in Examples 112 to 113, the cycle capacity retention rate at 25° C. was 80% or more. In Comparative Example 104 in which the content of $LiFSO_3$ is large, the AC impedance value after the cycle at 25° C. was higher than that in Examples 112 to 113. Therefore, it is presumed that $LiFSO_3$ undergoes reductive decomposition at the negative electrode and is deposited on the surface of the negative electrode, or the amount of HF increases to cause formation and deposition of an excessive amount of LiF on the surface of the negative electrode, leading to an increase in internal resistance and a decrease in capacity retention rate during the cycle at 25° C. From the above results, it was found preferable to keep the content of $LiFSO_3$ in the nonaqueous electrolyte solution within a predetermined range.

(5) Evaluation of Long-Term Cycle Performance and Safety Performance after Long-Term Cycle
(5-1) Fabrication and Evaluation of Separator
(5-1-1) Fabrication of Separator (A01)
[Method for Manufacturing Silane Graft-Modified Polyolefin]

The polyolefin starting material to be used as the silane graft-modified polyolefin may have a viscosity-average molecular weight (Mv) of 100,000 or more and 1,000,000 or less, a weight-average molecular weight (Mw) of 30,000 or more and 920,000 or less and a number-average molecular weight of 10,000 or more and 150,000 or less, and may be a copolymerized α olefin of propylene or butene. An organic peroxide (di-t-butyl peroxide) was added while melt kneading the polyethylene starting material with an extruder to generate radicals in the polymer chain of the α olefin. Thereafter, trimethoxyalkoxide-substituted vinylsilane was injected into the kneaded mixture to cause an addition reaction. By the addition reaction, an alkoxysilyl group is introduced into the α olefin polymer to form a silane-graft structure. A suitable amount of an antioxidant (pentaerythritoltetrakis[3-(3,5-di-tetra-butyl-4-hydroxyphenyl)propionate]) is simultaneously added to adjust the radical concentration in the system, thus inhibiting a chain-style chain reaction (gelation) in the α olefin. The obtained silane-grafted polyolefin molten resin is cooled in water and pelletized, and after heat drying at 80° C. for 2 days, the moisture and unreacted trimethoxyalkoxide-substituted vinylsilane are removed. The residual concentration of the unreacted trimethoxyalkoxide-substituted vinylsilane in the pellets is about 3,000 ppm or less.

<Fabrication of Substrate as First Layer>

To 30% by weight of a polyethylene homopolymer with a viscosity-average molecular weight of 3,000,000 (ultra-high molecular weight polyethylene (A)), 50% by weight of a polyethylene homopolymer with a viscosity-average molecular weight of 700,000 (polyethylene (B)) and 20% by weight of a silane-grafted polyethylene (silane-modified polyethylene (C)) having MFR of 0.4 g/min obtained by modification reaction of a polyolefin having a viscosity-average molecular weight of 125,000 as starting materials with trimethoxyalkoxide-substituted vinylsilane (the resin composition of (A):(B):(C) thus being 3:5:2), 1,000 ppm by weight of pentaerythrityl-tetrakis-[3-(3,5-di-t-butyl-4-hydroxyphenyl)propionate] as an antioxidant with respect to the entire resin were added, followed by dry mixing using a tumbler blender to obtain a mixture. To the ultra-high molecular weight polyethylene (A), 3,000 ppm of calcium stearate is mixed. The obtained mixture was supplied to a twin-screw extruder through a feeder in a nitrogen atmosphere. Also, liquid paraffin (kinematic viscosity at 37.78° C.: $7.59 \times 10^{-5}$ m$^2$/s) was injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70% by weight (i.e., polymer concentration of 30% by weight). The melt kneading conditions were as follows: a preset temperature of 230° C., a screw rotational speed of 240 rpm and a discharge throughput of 18 kg/h.

The melt kneaded mixture was then extrusion cast through a T-die on a cooling roll controlled to a surface temperature of 25° C. to obtain a gel sheet (sheet-shaped molded product) having a raw membrane thickness of 1,370 µm.

The sheet-shaped molded product was then simultaneously fed into a biaxial tenter stretching machine for biaxial stretching to obtain a stretched sheet. The stretching conditions were as follows: an MD factor of 7.0, a TD factor of 6.4 (i.e., a factor of 7.0×6.3) and a biaxial stretching temperature of 122° C. The stretched gel sheet was then fed into a dichloromethane tank and thoroughly immersed in the dichloromethane for extraction removal of the liquid paraffin, and then dichloromethane was dried off to obtain a porous structure. The porous structure was fed to a TD tenter and heat setting (HS) was carried out at a heat setting temperature of 133° C. and a stretch ratio of 1.9, and then relaxation was carried out to a factor of 1.75 in the TD direction to obtain a microporous membrane. The edges of the microporous membrane were cut and rolled into a mother roll having a width of 1,100 mm and a length of 5,000 m.

During the evaluation, the microporous membrane wound out from the mother roll was slit as necessary for use as the evaluation substrate (first layer). With respect to the evaluation substrate, the membrane thickness, air permeability and porosity were measured. The evaluation results are shown in Table 9-1.

<Fabrication of Second Layer>
[Method for Synthesizing Resin Binder]

The acrylic latex to be used as the resin binder is produced by the following method.

In a reactor equipped with a stirrer, a reflux condenser, a drip tank and a thermometer, 70.4 parts by weight of ion-exchanged water, and 0.5 part by weight of "AQUALON KH1025" (registered trademark, aqueous 25% solution manufactured by Dai-ichi Kogyo Seiyaku Co., Ltd.) and 0.5 part by weight of "ADEKA REASOAP SR1025" (registered trademark, aqueous 25% solution manufactured by Adeka Corporation) as emulsifiers were charged. The temperature inside the reactor was then raised to 80° C., and 7.5 parts by weight of an aqueous 2% solution of ammonium persulfate was added while keeping the temperature at 80° C., to obtain an initial mixture. Five minutes after completion of the addition of the aqueous ammonium persulfate solution, the emulsified liquid was added dropwise from the drip tank into the reactor over a period of 150 minutes.

The emulsified liquid was prepared by forming a mixture of 70 parts by weight of butyl acrylate, 29 parts by weight of methyl methacrylate, 1 part by weight of methacrylic acid, 3 parts by weight of "AQUALON KH1025" (registered trademark, aqueous 25% solution manufactured by Dai-ichi Kogyo Seiyaku Co., Ltd.) and 3 parts by weight of "ADEKA REASOAP SR1025" (registered trademark, aqueous 25% solution manufactured by Adeka Corporation) as emulsifiers, 7.5 parts by weight of an aqueous 2% solution of ammonium persulfate, and 52 parts by weight of ion-exchanged water, and mixing the mixture with a homomixer for 5 minutes.

After completion of the dropwise addition of the emulsified liquid, the temperature inside the reactor was kept at 80° C. for 90 minutes, followed by cooling to room temperature. The obtained emulsion was adjusted to a pH of 8.0 with an aqueous 25% ammonium hydroxide solution, and then a small amount of water was added to obtain an acrylic latex with a solid content of 40%. The obtained acrylic latex had a number-average particle size of 145 nm and a glass transition temperature of −30° C.

A dispersion was prepared by homogeneously dispersing 95 parts by weight of aluminum hydroxide oxide (mean particle size: 1.4 µm) as inorganic particles and 0.4 part by weight (in terms of solid content) of an aqueous ammonium polycarboxylate solution (SN dispersant 5468 manufactured by SAN NOPCO LIMITED, solid component concentration: 40%) as an ionic dispersant agent, in 100 parts by weight of water. The obtained dispersion was shredded with a bead mill (cell volume: 200 cc, zirconia bead diameter: 0.1 mm, filling volume: 80%) and the particle size distribution of the inorganic particles was adjusted to D50=1.0 µm, to prepare an inorganic particle-containing slurry. To the dispersion with adjusted particle size distribution, 2.0 parts by weight (in terms of solid content) of the acrylic latex produced above as a resin binder was added.

The microporous membrane was then continuously wound out from a mother roll of the microporous membrane and one side of the microporous membrane was coated with the inorganic particle-containing slurry using a gravure reverse coater, followed by drying with a dryer at 60° C. to remove water, followed by winding up to obtain a separator mother roll.

During the evaluation, the separator wound out from the mother roll was slit as necessary for use as the evaluation separator. Regarding inorganic particles as the second layer in Tables 9-1 to 9-3, the inorganic particles are expressed as "ceramic".

(5-1-2) Fabrication of Separators (A02) to (A15)

Targeting the physical properties shown in Tables 9-1 to 9-3, at least one of the type or viscosity-average molecular weight of the homopolymer polyethylene, melt kneading conditions, preset stretching conditions, heat fixing conditions and relaxation operation conditions was changed, and the configuration in the second layer was changed as shown in Tables 9-1 to 9-3. Except for these changes, a separator was fabricated by the same method as in (5-1-1). The details of abbreviations in items of inorganic particles in Tables 9-1 to 9-3 are as follows.

"PVDF" (PVDF-HFP/Inorganic Substance)

Alumina ($Al_2O_3$) particles and polyvinylidene fluoride-hexafluoropropylene as a fluorine-based resin were prepared and both were mixed, and the mixture was mixed with cyanoethyl polyvinyl alcohol and acetone so as to have a weight ratio of mixture/cyanoethyl polyvinyl alcohol/acetone=19.8/0.2/80, followed by uniform dispersion to prepare a coating solution, which was then coated on one side of a polyolefin microporous membrane using a gravure coater to form a second layer with the thickness shown in Tables 9-1 to 9-3.

"Para-Aramid/Inorganic Substance"

To 5,000 parts by weight of an N-methyl-2-pyrrolidone (NMP)/calcium chloride solution (calcium chloride concentration=7.1% by weight), 150 parts by weight of paraphenylenediamine were added in a N2 atmosphere, and after dissolution and stirring, 273.94 parts by weight of terephthalic acid dichloride was added, followed by stirring and further reaction for one hour to obtain a polyparaphenylene terephthalamide polymerization solution. 1,000 parts by weight of the polymerization solution, 3,000 parts by weight of NMP and 143.4 parts by weight of alumina ($Al_2O_3$) particles were stirred and mixed and then dispersed with a homogenizer to obtain a coating slurry. Using a drum-fixed bar coater, the coating slurry was coated on one side of a polyolefin microporous membrane under the conditions of a clearance of 20 μm to 30 μm and then dried at a temperature of about 70° C. to form a second layer, thus obtaining a composite separator.

"Meta-Aramid/Inorganic Substance"

Meta-aromatic polyamide and boehmite having a mean particle size of 0.6 μm were adjusted and mixed so as to have a weight ratio of 1:1, and then the obtained mixture was mixed with a mixed solvent (weight ratio=1:1) of dimethylacetamide (DMAc) and tripropylene glycol (TPG) so as to have the meta-aromatic polyamide concentration of 3% by weight to obtain a coating slurry. Using a Mayer bar coater, the coating slurry was coated on one side of a polyolefin microporous membrane under the conditions of a clearance of 20 μm to 30 μm to obtain a coated separator. The coated separator was immersed in a coagulation liquid having a weight ratio of water:DMAc:TPG=2:1:1 and a temperature of 35° C., followed by water washing and further drying to form a second layer, thus obtaining a composite separator.

(5-1-3) Evaluation of Separator (i) Method for Detecting Silane-Modified Polyolefin contained in Separator In the state where the silane-modified polyolefin contained in the separator is crosslinked, the silane-modified polyolefin is insoluble in an organic solvent or has insufficient solubility, so that it may be difficult to measure the content of the silane-modified polyolefin directly from the separator. In that case, it is possible to carry out, as a pretreatment of the sample, detection of the silane-modified polyolefin contained in the separator by decomposing a siloxane bond into methoxysilanol using methyl orthoformate, which does not cause a side reaction, followed by solution NMR measurement, and to carry out GPC measurement thereof. A pretreatment test can be carried out with reference to JP 3529854 B2 and JP 3529858 B2.

Specifically, $^1H$ or $^{13}C$ NMR identification of the silane-modified polyolefin as a starting material to be used for the production of a separator may be utilized in the method for detecting a silane-modified polyolefin contained in the separator. The following is an example of $^1H$ and $^{13}C$ NMR measurement methods.

($^1$H-NMR Measurement)

The sample is dissolved in o-dichlorobenzene-d4 at 140° C. to obtain a $^1$H-NMR spectrum at a proton resonance frequency of 600 MHz. The $^1$H NMR measuring conditions are as follows.

Apparatus: AVANCE NEO 600 manufactured by Bruker Corporation
Sample tube diameter: 5 mmφ
Solvent: o-dichlorobenzene-d4
Measuring temperature: 130° C.
Pulse angle: 30°
Pulse delay time: 1 sec
Number of scans: 1,000 times or more
Sample concentration: 1 wt/vol %

($^{13}$C NMR Measurement)

The sample is dissolved in o-dichlorobenzene-d4 at 140° C. to obtain a $^{13}$C-NMR spectrum. The $^{13}$C-NMR measuring conditions are as follows.

Apparatus: AVANCE NEO 600 manufactured by Bruker Corporation
Sample tube diameter: 5 mmφ
Solvent: o-dichlorobenzene-d4
Measuring temperature: 130° C.
Pulse angle: 30°
Pulse delay time: 5 sec
Number of scans: 10,000 times or more
Sample concentration: 10 wt/vol %

The $^1$H and/or $^{13}$C-NMR measurement(s) allow(s) the amount of silane unit modification and the amount of polyolefin alkyl group modification in the silane-modified polyolefin to be confirmed for a polyolefin starting material, and allow(s) the silane-modified polyolefin contained in the separator to be determined (—$CH_2$—Si: $^1$H, 0.69 ppm, t; $^{13}$C, 6.11 ppm, s).

(ii) Weight-Average Molecular Weight and Number-Average Molecular Weight

Standard polystyrene was measured using Model ALC/GPC 150C (trademark) by Waters Co. under the following conditions, and a calibration curve was drawn. The chromatogram for each polymer was also measured under the same conditions, and the weight-average molecular weight of each polymer was calculated by the following method, based on the calibration curve.

Column: GMH6-HT (trademark) (2)+GMH6-HTL (trademark) (2) manufactured by Tosoh Corporation
Mobile phase: o-dichlorobenzene
Detector: differential refractometer
Flow rate: 1.0 ml/min
Column temperature: 140° C.
Sample concentration: 0.1 wt %

(Weight-Average Molecular Weight and Number-Average Molecular Weight of Polyethylene and Polypropylene)

Each molecular weight component in the obtained calibration curve was multiplied by 0.43 (polyethylene Q factor/polystyrene Q factor=17.7/41.3) or 0.64 (polypropylene Q factor/polystyrene Q factor=26.4/41.3) to obtain a polyethylene-equivalent or polypropylene-equivalent molecular-weight distribution curve, and the weight-average molecular weight and the number-average molecular weight were calculated. Due to the performance of the chromatogram, it is difficult to accurately measure the molecular weight distribution in the region where the molecular weight is 1,000,000 or more.

(Weight-Average Molecular Weight of Resin Composition)

The weight-average molecular weight was calculated in the same manner as for polyethylene, except that the Q factor value for the polyolefin with the largest weight fraction was used.

(iii) Viscosity-Average Molecular Weight (Mv)

The limiting viscosity [η] at 135° C. in a decalin solvent was determined based on ASTM-D4020. Mv of a polyethylene was calculated by the following formula.

$$[\eta]=6.77\times10^{-4} \, Mv^{0.67}$$

(iv) Melt Flow Rate (MFR) (g/min)

Using a melt flow rate measuring device manufactured by Toyo Seiki Seisaku-sho, Ltd. (Melt Indexer F-F01), for polyethylene and silane-modified polyethylene, the weight of the resin extruded for 10 minutes under conditions of 190° C. and 2.16 kg pressure was determined as the MFR value. For polypropylene, MFR measurement can be carried out at 230° C.

(v) Thickness TA (μm)

The thickness of the first layer and that of the second layer were measured at room temperature of 23±2° C. and relative humidity of 60% by using a micro thickness gage KBM (trademark) manufactured by Toyo Seiki Seisaku-sho, Ltd. Specifically, the thicknesses of five points were measured at substantially equal intervals over the entire width in the TD direction to obtain their average values.

(vi) Porosity (%)

A 10 cm×10 cm square sample was cut out from a microporous membrane (substrate), and the volume (cm$^3$) and weight (g) of the sample were determined and used together with the density (g/cm$^3$) by the following formula to obtain a porosity.

The density of the mixed composition was the value determined by calculation from the densities of the starting materials used and their mixing ratio.

$$\text{Porosity}(\%)=(\text{volume}-\text{weight}/\text{density of the mixed composition})/\text{volume}\times 100$$

(vii) Air Permeability (sec/100 cm$^3$)

In accordance with JIS P-8117 (2009), the air permeability of the sample was measured by a Gurley type air permeability meter G-B2 (trademark) manufactured by Toyo Seiki Seisaku-sho, Ltd.

(5-2) TOF-SIMS Analysis and Image Processing of Separator (5-2-1) TOF-SIMS Analysis of Separator The separator for an electricity storage device was subjected to TOF-SIMS analysis. A nano-TOF manufactured by ULVAC-PHI, INCORPORATED was used as a TOF-SIMS mass spectrometer. The analysis conditions are as follows.

Figure 4:
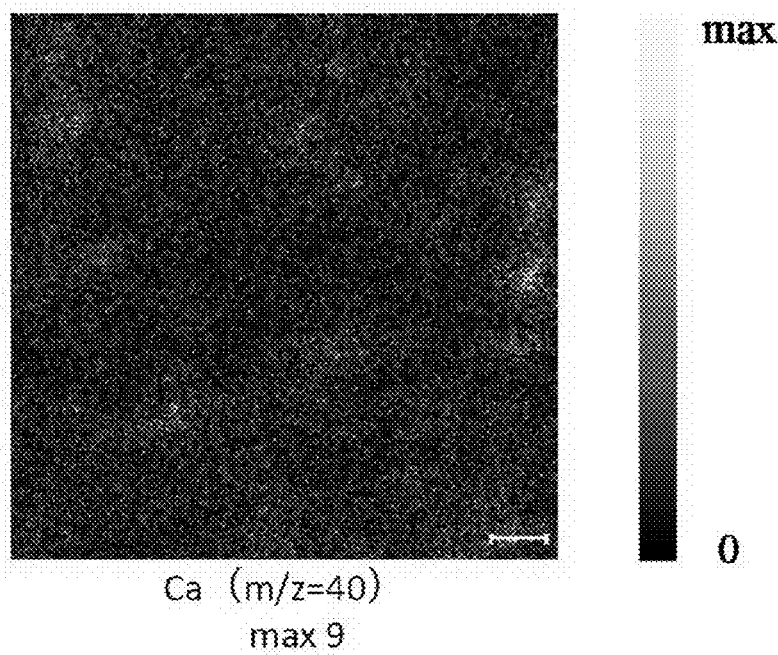
FIG. 4 is an image illustrating the results of TOF-SIMS analysis of a battery separator according to one embodiment.

<Image Measurement Conditions>
  Primary ion: bismuth (Bi)
  Acceleration voltage: 30 kV
  Ion current: about 0.5 nA (as DC)
  Analysis area: 100 μm×100 μm
  Analysis time: 90 minutes
  Detection ion: positive ion (m/z=40)
  Neutralization: electron gun+Ar monomer ion
  Vacuum degree: about $5.0\times10^{-5}$ Pa
<Measurement Conditions in Depth Direction>
<<Analysis Conditions>>
  Primary ion: bismuth (Bi)
  Acceleration voltage: 30 kV
  Ion current: about 1.2 nA (as DC)
  Analysis area: 100 μm×100 μm
  Analysis time: 5 frames/cycle
  Detection ion: Positive ion (m/z=40)
  Neutralization: electron gun+Ar monomer ion
  Vacuum degree: about $5.0\times10^{-5}$ Pa <Sputtering Conditions>
  Sputter ion: GCIB (Ar2500+)
  Acceleration voltage: 20 kV
  Ion current: about 5 nA
  Sputtering area: 400 μm×400 μm
  Sputtering time: 30 seconds/cycle
  Neutralization: electron gun+Ar monomer ion Under the above conditions, the spectrum of calcium ions (corresponding to positive ions of m/z=40) was detected. As an example, the results of TOF-SIMS analysis of the separator A01 are shown in FIG. 4.

(5-2-2) Image Processing

The image data of the TOF-SIMS spectrum obtained as mentioned above were subjected to image processing in accordance with the following procedure.

Figure 5:
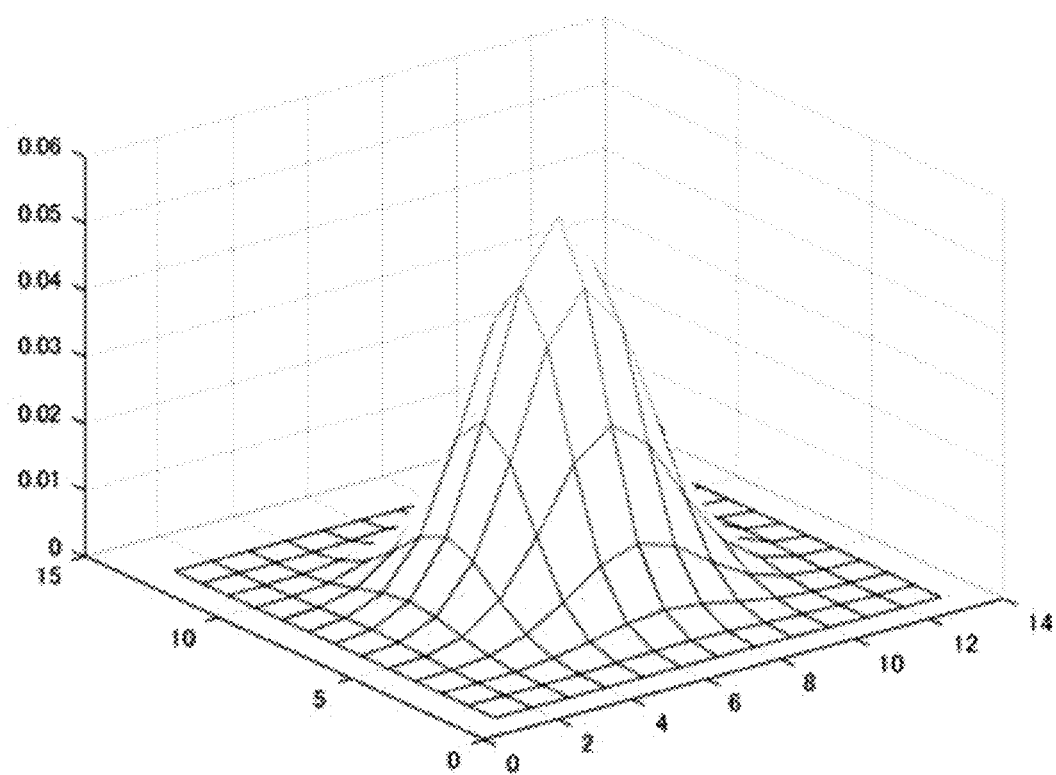
FIG. 5 is an example of a filtered three-dimensional image in image processing of TOF-SIMS spectrum.
Figure 6:
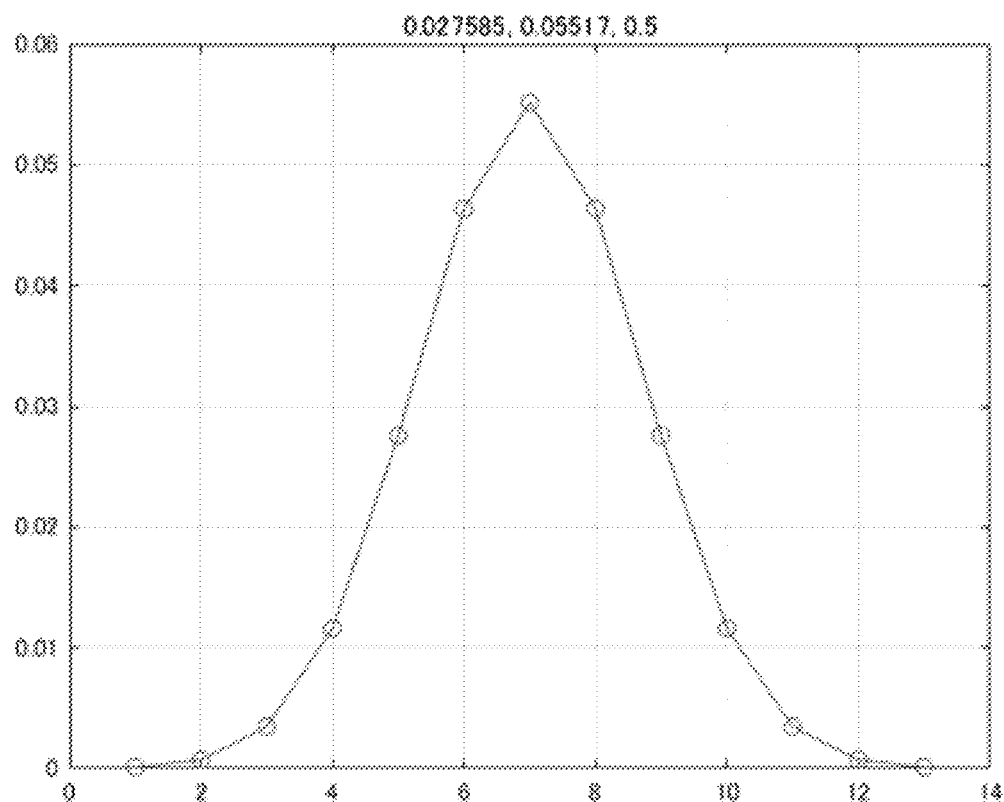
FIG. 6 is an example of a filtered two-dimensional image in image processing of TOF-SIMS spectrum.

(1) A filter having a beam shape (diameter of 2 μm and a pixel resolution of 0.39 μm) is fabricated. A three-dimensional image of the filter is shown in FIG. 5, and a two-dimensional image is shown in FIG. 6.

<Calculation Method of Filter Value>

The filter value was calculated using the function fspecial of Image Processing Toolbox of numerical calculation software MATLAB manufactured by Mathworks.

fspecial("gaussian", [13 13], 1.69865)

(2) The fabricated filter is applied to two-dimensional data.

(3) The average value and the standard deviation of the two-dimensional data after the application of the filter are calculated.

(4) Average value+standard deviation×3 is binarized as a threshold value.

(In the case of the normal distribution, since 99.74% of the value falls within a range of the average value+the standard deviation×3, it is intended to numerically extract a specific portion.)

(5) Expansion contraction for 7 pixels is carried out to connect an extraction region in the vicinity.

(6) A region having a small area (50 pixels or less) is removed.

(7) A parameter of each of the remaining regions is calculated.

extraction area (pixel), simple center of gravity position (x0, y0)
  maximum value in region, average value of region, and distance between weighted centers of gravity positions (xm, ym)

(8) Calculation of distance between weighted centers of gravity positions

Using WeightedCentroid option of the function regionprops of the Image Processing Toolbox of the numerical arithmetic software MATLAB manufactured by Mathworks, calculation was carried out.

regionprops(cc, I, 'WeightedCentroid')

Here, cc is a variable indicating the extracted region, and I is a variable storing the two-dimensional data after the application of the filter.

Figure 7:
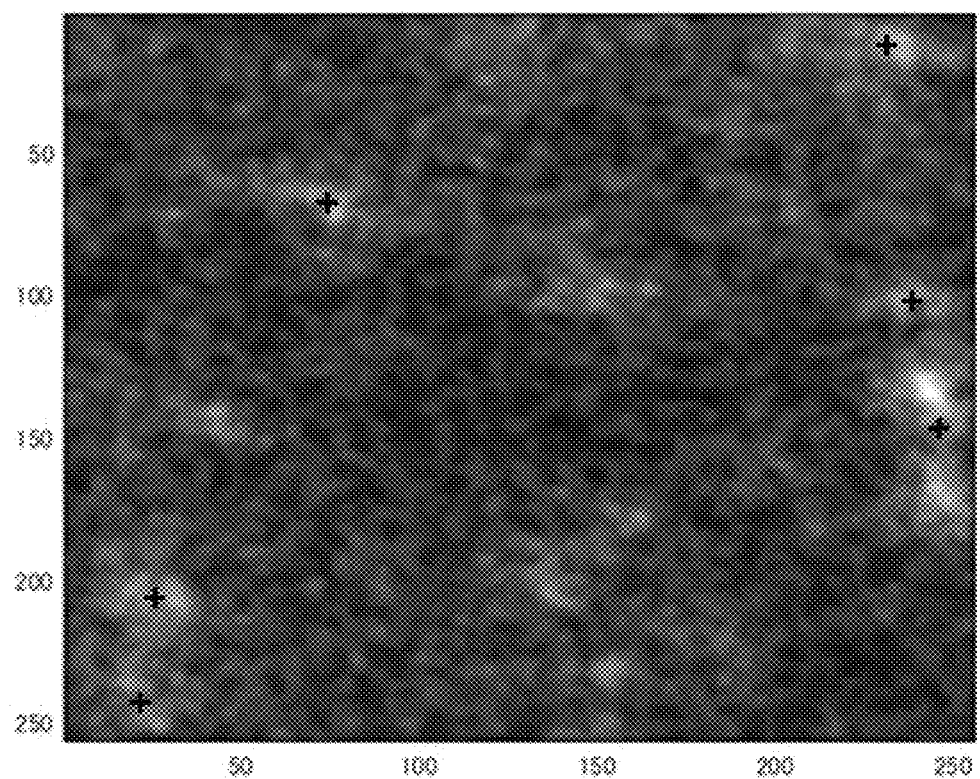
FIG. 7 is an example of a state where image processing (1) to (2) of the TOF-SIMS spectrum was carried out.
Figure 8:
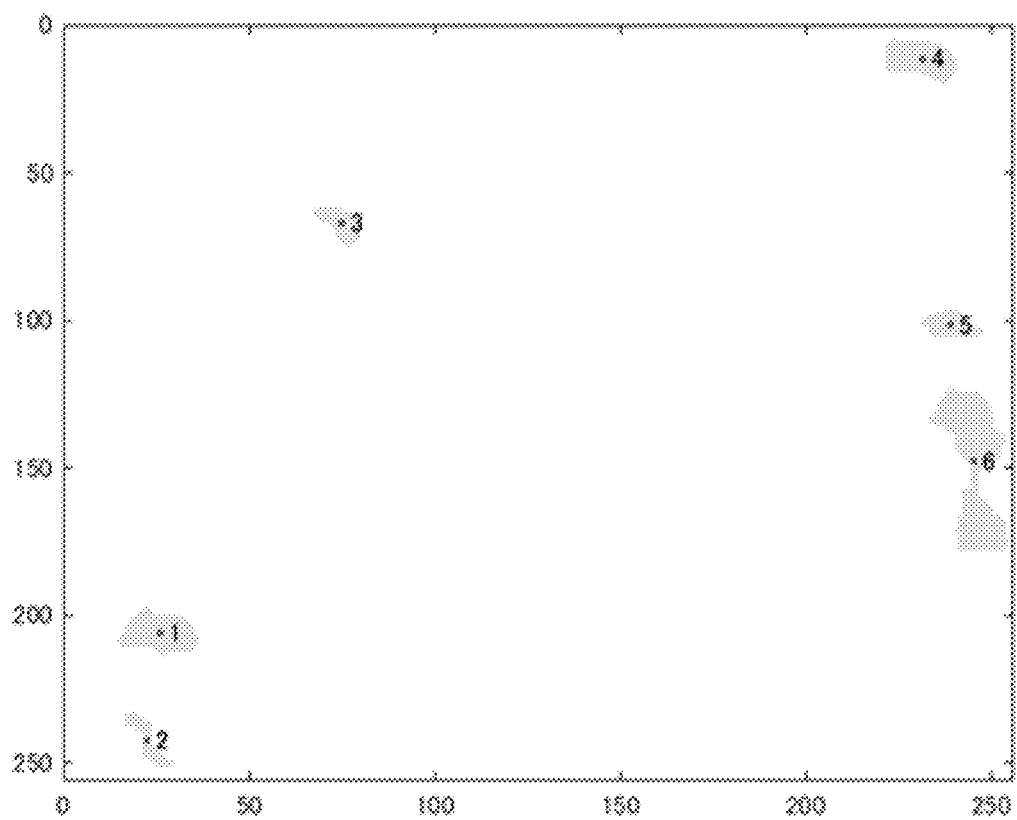
FIG. 8 is an example of a state where image processing (1) to (8) of the TOF-SIMS spectrum was carried out.

As an example, the results of TOF-SIMS analysis of the separator A01 obtained by carrying out the image processing of (1) to (2) is shown in FIG. 7, and the results of the separator A01 obtained by carrying out image processing of (1) to (8) is shown in FIG. 8.

By the above processing, the island structure of the calcium ion was specified, and the number, the size and the distance between weighted centers of gravity positions were calculated. The results are shown in Tables 9-1 to 9-3.

(5-3) Fabrication of Laminate Type Nonaqueous Secondary Battery (5-3-1) Fabrication of Positive Electrode After mixing 90.4% by weight of a nickel, manganese and cobalt composite oxide (LiNiMnCoO$_2$) (NMC) (Ni:Mn:

Co=1:1:1 (element ratio), density: 4.70 g/cm$^3$) as a positive electrode active material, 1.6% by weight of a graphite powder (KS6) (density: 2.26 g/cm$^3$ number-average particle size: 6.5 μm) and 3.8% by weight of an acetylene black powder (AB) (density: 1.95 g/cm$^3$, number-average particle size: 48 μm) as conductive aids, and 4.2% by weight of PVDF (density: 1.75 g/cm$^3$) as a resin binder, the mixture was dispersed in NMP to prepare a slurry. This slurry was coated on a 20 μm-thick aluminum foil sheet, which serves as a positive electrode collector, using a die coater, and dried at 130° C. for 3 minutes, followed by compression molding using a roll press to fabricate a positive electrode. The coating amount of the positive electrode active material per one side was 109 g/m$^2$.

(5-3-2) Fabrication of Negative Electrode 87.6% by weight of a graphite powder A (density: 2.23 g/cm$^3$, number-average particle size: 12.7 μm) and 9.7% by weight of a graphite powder B (density: 2.27 g/cm$^3$, number-average particle size: 6.5 μm) as negative electrode active materials, and 1.4% by weight (in terms of solid content) of a carboxymethyl cellulose ammonium salt (aqueous solution having 1.83% by weight solid component concentration) and 1.7% by weight (in terms of solid content) of a diene rubber-based latex (aqueous solution having 40% solid component concentration) as resin binders were dispersed in purified water to prepare a slurry. This slurry was coated on a 12 μm-thick copper foil sheet as the negative electrode collector using a die coater, and dried at 120° C. for 3 minutes, followed by compression molding using a roll press to fabricate a negative electrode. The coating amount of the negative electrode active material per one side was 52 g/m$^2$.

(5-3-3) Assembling of Laminate Type Nonaqueous Secondary Battery

As mentioned above, the positive electrode and the negative electrode were overlapped by interposing a separator (separator of Example or separator of Comparative Example) while the mixture coat surfaces of each electrode face each other to fabricate a layered electrode structure. This layered electrode structure was housed in an aluminum laminated sheet exterior of 100 mm×60 mm, and vacuum drying was carried out at 80° C. for 5 hours in order to remove moisture. Subsequently, the electrolyte solution (S110) or (S111) mentioned above was injected into an exterior and the exterior was sealed to fabricate a laminate type (pouch type) nonaqueous secondary battery. The laminate type nonaqueous secondary battery has a design capacity value of 3 mAh and a rated voltage value of 4.2 V.

(5-4) Evaluation of Long-Term Cycle Performance of Laminate Type Nonaqueous Secondary Battery For the laminate type nonaqueous secondary battery obtained as mentioned above, first, an initial charging treatment was carried out according to the following procedure (5-4-1). According to the following procedure (5-4-2), cycle characteristics of each laminate type nonaqueous secondary battery were then evaluated. The charging/discharging was carried out using a charging/discharging apparatus ACD-M01A (trade name) manufactured by Aska Electronic Co., Ltd. and a program thermostatic bath IN804 (trade name) manufactured by Yamato Scientific Co., Ltd.

Here, "1 C" means the current value at which a fully charged battery is expected to be discharged in one hour with a constant current to terminate discharging. In the following evaluations (5-4-1) to (5-4-2), specifically, "1 C" means the current value at which a fully charged battery of 4.2 V is expected to be discharged to 3.0 V in one hour with a constant current to terminate discharging.

(5-4-1) Initial Charging/Discharging Treatment of Laminate Type Nonaqueous Secondary Battery The ambient temperature of the battery was set at 25° C., and the battery was charged with a constant current of 0.075 A corresponding to 0.025 C for 2 hours to reach 3.1 V, and then charged with a constant voltage of 3.1 V for 1.5 hours. After resting for 3 hours, the battery was charged with a constant current of 0.15 A corresponding to 0.05 C to reach 4.2 V, and then charged with a constant voltage of 4.2 V for 1.5 hours. Thereafter, the battery was discharged to 3.0 V with a constant current of 0.45 A corresponding to 0.15 C.

(5-4-2) Cycle Test of Laminate Type Nonaqueous Secondary Battery

For the battery subjected to the initial charging/discharging treatment by the method mentioned in (5-4-1), a cycle test was carried out. The cycle test was started 3 hours after setting the ambient temperature of the battery at 25° C. First, the battery was charged with a constant current of 3 A corresponding to 1 C to reach 4.2 V and then charged with a constant voltage of 4.2 V for a total of 3 hours. Thereafter, the battery was discharged to 3.0 V with a constant current of 3 A. With this process of carrying out charging once and discharging once, respectively, serves as one cycle, charging/discharging was carried out for 1,000 cycles. The discharge capacity in the 1,000th cycle when the discharge capacity in the 1st cycle was 100% was determined as the capacity retention after 1,000 cycles. A battery with a high capacity retention rate was evaluated as a battery having satisfactory cycle characteristics. The evaluation results are shown in Tables 9-1 to 9-3. The capacity retention rate after 1,000 cycles is preferably 60% or more.

(5-5) Nail Penetration Test of Laminate Type Nonaqueous Secondary Battery after 1,000 Cycles The laminate type nonaqueous secondary battery subjected to the cycle characteristic test according to the procedure mentioned in (5-4-2) was left to stand on an iron plate in a temperature-controllable explosion-proof booth. An iron nail having a diameter of 3.0 mm was used to penetrate through the center of the laminate type secondary battery at a speed of 2 mm/sec while setting the temperature in the explosion-proof booth at 40° C., and the nail was maintained in the penetrating state. The temperature of a thermocouple, disposed inside the nail so that the temperature inside the laminate type battery could be measured after nail penetration, was measured, and the presence or absence of ignition was evaluated.

The evaluation was repeated using 100 samples of newly fabricated laminate type secondary batteries by the same method, and the number of samples that did not ignite (no ignition) was calculated as a percentage value by the following equation. The evaluation results are show in Tables 9-1 to 9-3.

Evaluation results(%)=(100×number of samples that did not ignite/total number of samples)

The passing rate of the nail penetration evaluation is preferably 50% or more.

TABLE 9-1

|  |  |  |  |  | | Example 114 | Example 115 | Example 116 | Example 117 | Example 118 |
|---|---|---|---|---|---|---|---|---|---|---|
|  |  |  | Separator No. |  |  | A01 | A02 | A03 | A04 | A05 |
| Separator | First layer | Resin composition | Electrolyte solution No. |  |  | | | S110 | | |
|  |  |  | Ultra-high molecular weight PE (A) | Mv |  | | | 3,000,000 | | |
|  |  |  |  | Ratio |  | | | 0.3 | | |
|  |  |  | High molecular weight PE (B) | Mv |  | | | 700,000 | | |
|  |  |  |  | Ratio |  | | | 0.5 | | |
|  |  |  | Silane-modified PE (C) | Mv |  | | | 125,000 | | |
|  |  |  |  | Ratio |  | | | 0.2 | | |
|  |  |  | PE (C) | Mv |  | | | — | | |
|  |  |  |  | Ratio |  | | | | | |
|  |  | Melt kneading conditions | Preset temperature |  | °C. | | | 230 | | |
|  |  |  | Screw rotational speed |  | rpm | | | 240 | | |
|  |  | Thickness (TA) |  |  | μm | 16.5 | 15.2 | 12 | 14 | 11 |
|  |  | Porosity |  |  | % | 50 | 45 | 64 | 43 | 55 |
|  |  | Air permeability |  |  | sec/cm³ | 180 | 210 | 169 | 231 | 195 |
|  |  | Calcium island structure | Number |  | Number | 6 | 8 | 7 | 10 | 5 |
|  |  |  | Size | Minimum value | μm² | 11 | 15 | 12 | 20 | 10 |
|  |  |  |  | Maximum value | μm² | 79 | 90 | 70 | 103 | 214 |
|  |  |  | Distance between weighted centers of gravity positions | Minimum value | μm | 14 | 8 | 15 | 20 | 10 |
|  |  |  |  | Maximum value | μm | 122 | 110 | 70 | 105 | 65 |
|  | Second layer | Inorganic particles | Type |  | — | Ceramic | Ceramic | PVDF | PVDF | Para-aramid/ inorganic substance |
|  |  | Thickness (TB) |  |  | μm | 5 | 3.5 | 2 | 5.1 | 6.2 |
|  |  | Ratio (TA/TB) |  |  | — | 3.3 | 4.3 | 6.0 | 2.7 | 1.8 |
| Battery |  | Capacity retention rate after 1,000 cycles |  |  | % | 95 | 93 | 85 | 82 | 86 |
|  |  | Passing rate of nail penetration safety test |  |  | % | 100 | 100 | 92 | 95 | 93 |

|  |  |  |  |  | | Example 119 | Example 120 | Example 121 | Example 122 | Example 123 |
|---|---|---|---|---|---|---|---|---|---|---|
|  |  |  | Separator No. |  |  | A06 | A07 | A08 | A09 | A10 |
| Separator | First layer | Resin composition | Electrolyte solution No. |  |  | | | S110 | | |
|  |  |  | Ultra-high molecular weight PE (A) | Mv |  | | | 3,000,000 | | |
|  |  |  |  | Ratio |  | | | 0.3 | | |
|  |  |  | High molecular weight PE (B) | Mv |  | | | 700,000 | | |
|  |  |  |  | Ratio |  | | | 0.5 | | |
|  |  |  | Silane-modified PE (C) | Mv |  | | | 125,000 | | |
|  |  |  |  | Ratio |  | | | 0.2 | | |
|  |  |  | PE (C) | Mv |  | | | — | | |
|  |  |  |  | Ratio |  | | | | | |
|  |  | Melt kneading conditions | Preset temperature |  | °C. | | | 230 | | |
|  |  |  | Screw rotational speed |  | rpm | | | 240 | | |
|  |  | Thickness (TA) |  |  | μm | 9.5 | 21.1 | 5 | 3.1 | 11.5 |
|  |  | Porosity |  |  | % | 65 | 55 | 45 | 50 | 49 |
|  |  | Air permeability |  |  | sec/cm³ | 200 | 170 | 162 | 110 | 105 |
|  |  | Calcium island structure | Number |  | Number | 6 | 5 | 7 | 5 | 4 |
|  |  |  | Size | Minimum value | μm² | 16 | 20 | 14 | 18 | 21 |
|  |  |  |  | Maximum value | μm² | 64 | 113 | 80 | 64 | 114 |
|  |  |  | Distance between weighted centers of gravity positions | Minimum value | μm | 12 | 35 | 17 | 15 | 31 |
|  |  |  |  | Maximum value | μm | 125 | 80 | 65 | 44 | 77 |
|  | Second layer | Inorganic particles | Type |  | — | Meta-aramid/ inorganic substance | Ceramic | Ceramic | Ceramic | Ceramic |
|  |  | Thickness (TB) |  |  | μm | 4 | 2.2 | 6.5 | 7 | 1 |
|  |  | Ratio (TA/TB) |  |  | — | 2.4 | 9.6 | 0.8 | 0.4 | 11.5 |
| Battery |  | Capacity retention rate after 1,000 cycles |  |  | % | 87 | 84 | 82 | 75 | 69 |
|  |  | Passing rate of nail penetration safety test |  |  | % | 92 | 85 | 80 | 64 | 62 |

TABLE 9-2

| | | | | | Example 124<br>A11 | Example 125<br>A12 | Example 126<br>A13 | Example 127<br>A14 | Example 128<br>A15 |
|---|---|---|---|---|---|---|---|---|---|
| | | Separator No. | | | | | | | |
| | | Electrolyte solution No. | | | | | S110 | | |
| Separator | First layer | Resin composition | Ultra-high molecular weight PE (A) | Mv | — | 3,000,000 | 2,000,000 | 2,000,000 | 2,000,000 | 2,000,000 |
| | | | | Ratio | — | 0.3 | 0.8 | 0.8 | 0.8 | 0.8 |
| | | | High molecular weight PE (B) | Mv | — | 700,000 | — | — | — | — |
| | | | | Ratio | — | 0.5 | — | — | — | — |
| | | | Silane-modified PE (C) | Mv | — | — | 20,000 | 20,000 | — | — |
| | | | | Ratio | — | — | 0.2 | 0.2 | — | — |
| | | | PE (C) | Mv | — | 20,000 | — | — | 20,000 | 20,000 |
| | | | | Ratio | — | 0.2 | — | — | 0.2 | 0.2 |
| | | Melt kneading conditions | Preset temperature | °C. | | 230 | 230 | 240 | 230 | 240 |
| | | | Screw rotational speed | rpm | | 240 | 240 | 500 | 240 | 500 |
| | | Thickness (TA) | | μm | | 16 | 16.1 | 15 | 19 | 15 |
| | | Porosity | | % | | 53 | 48 | 46 | 52 | 45 |
| | | Air permeability | | sec/cm³ | | 195 | 210 | 200 | 190 | 184 |
| | | Calcium island structure | Number | Number | | 6 | 1 | 40 | 1 | 23 |
| | | | Size Minimum value | μm² | | 15 | 324 | 2 | 250 | 2 |
| | | | Size Maximum value | μm² | | 80 | 324 | 8 | 250 | 5 |
| | | | Distance between weighted centers of gravity positions Minimum value | μm | | 10 | — | 2 | — | 1 |
| | | | Distance between weighted centers of gravity positions Maximum value | μm | | 75 | — | 5 | — | 4 |
| | Second layer | Inorganic particles | Type | — | | Ceramic | Ceramic | Ceramic | Ceramic | Ceramic |
| | | Thickness (TB) | | μm | | 5 | 1.8 | 3 | 4 | 2.5 |
| | | Ratio (TA/TB) | | — | | 3.2 | 8.9 | 5.0 | 4.8 | 6.0 |
| Battery | | Capacity retention rate after 1,000 cycles | | % | | 90 | 58 | 54 | 51 | 48 |
| | | Passing rate of nail penetration safety test | | % | | 12 | 55 | 51 | 5 | 2 |

TABLE 9-3

| | | | | Example 129 A01 | Example 130 A03 | Example 131 A05 | Example 132 A06 | Example 133 A07 | Example 134 A08 | Example 135 A11 | Example 136 A12 | Example 137 A13 | Example 138 A14 | Example 139 A15 |
|---|---|---|---|---|---|---|---|---|---|---|---|---|---|---|
| Separator | | Electrolyte solution No. | | | | | | | | S111 | | | | |
| | First layer | Resin composition | Ultra-high molecular weight PE (A) Mv | 3,000,000 | | 3,000,000 | 3,000,000 | | | 3,000,000 | 2,000,000 | 2,000,000 | 2,000,000 | 2,000,000 |
| | | | Ratio | 0.3 | | | 0.3 | | | 0.3 | 0.8 | 0.8 | 0.8 | 0.8 |
| | | | High molecular weight PE (B) Mv | 700,000 | | | 700,000 | | | 700,000 | | | | |
| | | | Ratio | 0.5 | | | 0.5 | | | 0.5 | | | | |
| | | | Silane-modified PE (C) Mv | 125,000 | | | 125,000 | | | | | 20,000 | | |
| | | | Ratio | 0.2 | | | 0.2 | | | | | | | |
| | | | PE (C) Mv | | | | | | | 20,000 | 20,000 | | 20,000 | 20,000 |
| | | | Ratio | | | | | | | 0.2 | 0.2 | 0.2 | 0.2 | 0.2 |
| | | Melt kneading conditions | Preset temperature °C. | 230 | | | 230 | | | 230 | 230 | 240 | 230 | 240 |
| | | | Screw rotational speed rpm | 240 | | | 240 | | | 240 | 240 | 500 | 240 | 500 |
| | | | Thickness (TA) μm | 16.5 | 12 | 11 | 9.5 | 21.1 | 5 | 16 | 16.1 | 15 | 19 | 15 |
| | | | Porosity % | 50 | 64 | 55 | 65 | 55 | 45 | 53 | 48 | 46 | 52 | 45 |
| | | | Air permeability sec/cm³ | 180 | 169 | 195 | 200 | 170 | 162 | 195 | 210 | 200 | 190 | 184 |
| | | Calcium island structure | Number | 6 | 7 | 5 | 6 | 5 | 7 | 6 | 1 | 40 | 1 | 23 |
| | | | Size μm² | 11 | 12 | 10 | 16 | 20 | 14 | 15 | 324 | 2 | 250 | 2 |
| | | | Minimum value μm² | 79 | 70 | 214 | 64 | 113 | 80 | 80 | 324 | 8 | 250 | 5 |
| | | | Maximum value μm | 14 | 15 | 10 | 12 | 35 | 17 | 10 | — | 2 | — | 1 |
| | | | Distance between weighted centers of gravity positions | | | | | | | | | | | |
| | | | Minimum value μm | | | | | | | | | | | |
| | | | Maximum value μm | 122 | 70 | 65 | 125 | 80 | 65 | 75 | — | 5 | — | 4 |
| | Second layer | Inorganic particles | Type | Ceramic | PVDF | Para-aramid/inorganic substance | Meta-aramid/inorganic substance | Ceramic | Ceramic | Ceramic | Ceramic | Ceramic | Ceramic | Ceramic |
| | | | Thickness (TB) μm | 5 | 2 | 6.2 | 4 | 2.2 | 6.5 | 5 | 1.8 | 3 | 4 | 2.5 |
| | | | Ratio (TA/TB) — | 3.3 | 6.0 | 1.8 | 2.4 | 9.6 | 0.8 | 3.2 | 8.9 | 5.0 | 4.8 | 6.0 |
| Battery | | Capacity retention rate after 1,000 cycles % | | 94 | 83 | 85 | 85 | 83 | 81 | 91 | 59 | 53 | 52 | 46 |
| | | Passing rate of nail penetration safety test % | | 97 | 91 | 94 | 91 | 88 | 81 | 14 | 55 | 51 | 7 | 3 |

In Examples 125 to 128 and 136 to 139 in which a calcium island structure having a size of 9 μm² or more and 245 μm² or less is not included in the separator, the value of the capacity retention rate after 1,000 cycles was less than 60%, whereas, in Examples 114 to 123 and 129 to 134, the value of the capacity retention rate after 1,000 cycles was 60% or more. From this, it was found that the long-term cycle characteristics are improved by including a calcium island structure having a specific size in the separator. It is presumed that this is because calcium traps HF generated in the battery for a long period of time, so that the decomposition of the solvent by HF can be inhibited. In addition, when HF in the nonaqueous electrolyte solution decreases, the equilibrium reaction of $LiFSO_3$ changes, and thus LiF, which is one of the factors for increasing the internal resistance, shifts in the direction of decreasing. As a result, it is considered that the calcium island structure contributed to an improvement in cycle performance.

The separator mentioned in Example 125 or 136 is a separator fabricated by the production method mentioned in PTL 8 and does not include a calcium island structure having a size of 9 μm² or more and 245 μm² or less. The separator mentioned in the Examples including the calcium island structure having a specific size exhibits higher values for long-term cycle characteristics of 1,000 cycles and subsequent nail penetration safety as compared with Example 125 or 136, which suggested that the calcium island structure having a specific size is important for improving the long-term cycle characteristics of the battery.

Further, from a comparison between Examples 125 to 126 and 136 to 137 and Examples 114 to 115 and 129, the passing rate of the nail penetration safety test significantly increased by including the calcium island structure having a size of 9 μm² or more and 245 μm² or less in the separator. It is presumed that this is because calcium traps HF generated in the battery for a long period of time, so that the cleavage reaction of the siloxane bond in the separator was inhibited and the crosslinked structure could be maintained for a long period of time.

From a comparison between Examples 122 to 123 and Examples 114 to 121, it is suggested that the thickness ratio of the separator substrate (first layer) to the second layer is preferably 0.5 or more and 10 or less.

(6) Crosslinking Test of Silane-Modified Separator by Immersion in Nonaqueous Electrolyte Solution
(6-1) Electrolyte Immersion Test of Silane-Modified Separator (A01)

A sample strip sampled at 100 mm in the TD and 100 mm in the MD from the silane-modified separator (A01) before the formation of a crosslinked structure, and this was used as a sample strip. In an inert atmosphere, the sample strip was left to stand in a stainless steel vat for 6 hours in a state of being immersed in 100 mL of various nonaqueous electrolyte solutions shown in Table 10. The sample piece was taken out from the vat, washed in turn with ethanol and acetone, and then vacuum dried for one hour.

(6-2) Measurement of Heat Shrinkage Factor at 150° C.

A sample strip sampled at 100 mm in the TD and 100 mm in the MD from the silane-modified separator (A01) before the formation of a crosslinked structure was used as a sample before crosslinking, and then left to stand for one hour in an oven at 150° C. During this time, the sample strip was sandwiched between two sheets so that the warm air did not directly contact with the sample strip. After removing the sample strip from the oven and cooling it, the area of the sample strip was measured, and the heat shrinkage factor (T1) at 150° C. was calculated by the following equation.

Heat shrinkage factor at 150° C.(%)=(10,000(mm²)−area of sample strip after heating (mm²))×100/10,000

Further, a sample strip subjected to the nonaqueous electrolyte immersion test by the method mentioned in (6-1) was used as a sample after crosslinking, and a heat shrinkage factor (T2) at 150° C. after the formation of the crosslinked structure was calculated by carrying out the same operation as above. Then, the ratio (T2/T1) was obtained by dividing the heat shrinkage factor (T2) by the heat shrinkage factor (T1). The obtained results were evaluated according to the following criteria.

Evaluation Criteria:
Good (with crosslinking): The value T2/T1 is 0.15 time or less.
Poor (without crosslinking): The value T2/T1 is more than 0.15 time.

Due to the formation of the crosslinked structure, the heat shrinkage factor tends to decrease as compared with that before the formation of the crosslinked structure. When the value T2/T1 is 0.15 time or less, it can be determined that the crosslinked structure is formed, and when the value T2/T1 is more than 0.15 times, it can be determined that the crosslinked structure is not formed. The obtained evaluation results are shown in Table 10.

TABLE 10

|  | Electrolyte solution No. | Presence or absence of crosslinking |
| --- | --- | --- |
| Example 140 | S101 | Good |
| Example 141 | S102 | Good |
| Example 142 | S112 | Good |
| Comparative Example 105 | S106 | Poor |

In Comparative Example 105 in which $LiFSO_3$ is not contained, a crosslinked structure was not formed on the separator, whereas, in Examples 140 to 142 in which $LiFSO_3$ is contained in the amount within a predetermined range, a crosslinked structure was formed on the separator. From the above, it was found that the crosslinked structure of the silane-modified polyolefin can be formed by adjusting the $LiFSO_3$ content in the nonaqueous electrolyte solution within an appropriate range.

(7) Evaluation of Output and Safety Performance
(7-1) Fabrication of Small Nonaqueous Secondary Battery
(7-1-1) Fabrication of Positive Electrode A composite oxide of lithium, nickel, manganese and cobalt ($LiNi_{0.5}Mn_{0.3}Co_{0.2}O_2$) as a positive electrode active material, an acetylene black powder as a conductive aid, and polyvinylidene fluoride (PVDF) as a binder were mixed at a weight ratio of 93.9:3.3:2.8 to obtain a positive electrode mixture.

N-methyl-2-pyrrolidone as the solvent was added to the obtained positive electrode mixture so as to have a solid content of 68% by weight, followed by further mixing to prepare a positive electrode mixture-containing slurry. While adjusting the basis weight of the positive electrode mixture-containing slurry, the positive electrode mixture-containing slurry was coated on one side of an aluminum foil having a thickness of 15 μm and a width of 280 mm, which serves as a positive electrode current collector, using a 3-roll transfer coater so as to have a coating pattern having a coating width of 240 to 250 mm, a coating length of 125 mm and a non-coating length of 20 mm, and then the solvent was dried and removed in a hot air drying furnace. Both sides of the electrode roll thus obtained were subjected to trimming cut, followed by drying under reduced pressure at 130° C. for 8 hours. Then, the electrode roll was rolled by a roll press so that the density of the positive electrode active material layer became 2.7 g/cm$^3$ to obtain a positive electrode composed of the positive electrode active material layer and the positive electrode current collector. The basis weight excluding the positive electrode current collector was 9.3 mg/cm$^2$.

(7-1-2) Fabrication of Negative Electrode

A graphite powder as the negative electrode active material and a carboxymethyl cellulose (density of 1.60 g/cm$^3$) solution (solid component concentration of 1.83% by weight) and a diene-based rubber (glass transition temperature: −5° C., number-average particle size during drying: 120 nm, density of 1.00 g/cm$^3$, dispersion medium: water, solid component concentration of 40% by weight) as the binders were mixed at a solid component weight ratio of 97.4:1.1:1.5 to obtain a negative electrode mixture.

Water as the solvent was added to the negative electrode mixture thus obtained so as to have a solid content of 45% by weight, followed by further mixing to prepare a negative electrode mixture-containing slurry. While adjusting the basis weight of the negative electrode mixture-containing slurry, the negative electrode mixture-containing slurry was coated on one side of a copper foil having a thickness of 8 μm and a width of 280 mm, which serves as a negative electrode current collector, using a 3-roll transfer coater so as to have a coating pattern having a coating width of 240 to 250 mm, a coating length of 125 mm and a non-coating length of 20 mm, and then the solvent was dried and removed in a hot air drying furnace. Both sides of the electrode roll thus obtained were subjected to trimming cut and dried under reduced pressure at 80° C. for 12 hours. Then, the electrode roll was rolled by a roll press so that the density of the negative electrode active material layer became 1.4 g/cm$^3$ to obtain a negative electrode composed of the negative electrode active material layer and the negative electrode current collector. The basis weight excluding the negative electrode current collector was 5.9 mg/cm$^2$.

(7-1-3) Assembling Small Nonaqueous Secondary Battery

The positive electrode obtained as mentioned above punched in a disk shape having a diameter of 15.958 mm, and the negative electrode obtained as mentioned above punched in a disk shape having a diameter of 16.156 mm were overlapped on both sides of separators to obtain a layered product. The layered product was inserted into a SUS disk-shaped battery casing. Then, 0.2 mL a nonaqueous electrolyte solution was injected into the battery casing to immerse the layered product in the nonaqueous electrolyte solution, followed by sealing the battery casing. After maintaining at a temperature of 25° C. for 12 hours to fully adapt the electrolyte solution to the layered product, a small nonaqueous secondary battery was obtained.

(7-2) Evaluation of Output Performance of Small Nonaqueous Secondary Battery

For the small nonaqueous secondary battery obtained as mentioned above, first, the initial charging treatment and the initial charging/discharge capacity measurement were carried out according to the following procedure (7-2-1). Then, each small nonaqueous secondary battery was evaluated according to the procedure (7-2-2). The charging/discharging was carried out using a charging/discharging apparatus ACD-M01A (trade name) manufactured by Aska Electronic Co., Ltd., and a program thermostatic bath IN804 (trade name) manufactured by Yamato Scientific Co., Ltd.

Here, "1 C" refers to the current value at which a fully charged battery is expected to be discharged in one hour with a constant current to terminate discharging.

(7-2-1) Initial Charging/Discharging Treatment of Small Nonaqueous Secondary Battery The ambient temperature of the portable nonaqueous secondary battery was set at 25° C., and the battery was charged with a constant current of 0.075 mA corresponding to 0.025 C to reach 3.1 V, and then charged with a constant voltage of 3.1 V for 1.5 hours. After resting for 3 hours, the battery was charged with a constant current of 0.15 mA corresponding to 0.05 C to reach 4.2 V, and then charged with a constant voltage of 4.2 V for 1.5 hours. Thereafter, the battery was discharged to 3.0 V with a constant current of 0.45 mA corresponding to 0.15 C.

(7-2-2) Output Test

For the small nonaqueous secondary battery subjected to the initial charging/discharging treatment by the method mentioned in (7-2-1), the ambient temperature was set at 25° C., and the battery was charged with a constant current of 0.3 mA corresponding to 0.1 C to reach 4.2 V, and then charged with a constant voltage of 4.2 V until the current attenuated to 0.005 mA. Thereafter, the battery was discharged to 3.0 V with a current value of 0.9 mA corresponding to 0.3 C.

Next, the battery was charged to 4.2 V with a constant current of 3 mA corresponding to 1 C to reach 4.2 V, and then charged with a constant voltage of 4.2 V until the current attenuated to 0.005 mA. Thereafter, the battery was discharged to 3.0 V with a current value of 3 mA corresponding to 1 C.

Next, the battery was charged to 4.2 V with a constant current of 3 mA corresponding to 1 C to reach 4.2 V, and then charged with a constant voltage of 4.2 V until the current attenuated to 0.005 mA. Thereafter, the battery was discharged to 3.0 V with a current value of 6 mA corresponding to 2 C.

Next, the battery was charged to 4.2 V with a constant current of 3 mA corresponding to 1 C to reach 4.2 V, and then charged with a constant voltage of 4.2 V until the current attenuated to 0.005 mA. Thereafter, the battery was discharged to 3.0 V with a current value of 9 mA corresponding to 3 C.

Next, the battery was charged to 4.2 V with a constant current of 3 mA corresponding to 1 C, and then charged with a constant voltage of 4.2 V until the current attenuated to 0.005 mA. Thereafter, the battery was discharged to 3.0 V with a current value of 15 mA corresponding to 5 C. The κ C discharge capacity in the 1st cycle when the discharge capacity in the 1st cycle at the time of the initial charging/discharging treatment was defined as 100% was calculated as the 5 C capacity retention rate.

Next, the battery was charged to 4.2 V with a constant current of 3 mA corresponding to 1 C to reach 4.2 V, and then charged with a constant voltage of 4.2 V until the current attenuated to 0.005 mA. Thereafter, the battery was discharged to 3.0 V with a current value of 30 mA corresponding to 10 C. The 10 C discharge capacity in the 1st cycle when the discharge capacity in the 1st cycle at the time of the initial charging/discharging treatment was defined as 100% was calculated as the 10 C capacity retention rate.

The 10 C capacity retention rate is an index of output performance at normal temperature, and is preferably 55% or more, and more preferably 65% or more. The obtained results are shown in Table 11.

Next, the battery was charged to 4.2 V with a constant current of 3 mA corresponding to 1 C to reach 4.2 V, and then charged with a constant voltage of 4.2 V until the current attenuated to 0.005 mA. Thereafter, the battery was discharged to 3.0 V with a current value of 60 mA corresponding to 20 C. The 20 C discharge capacity when the discharge capacity in the 1st cycle at the time of the initial charging/discharging treatment was defined as 100% was calculated as the 20 C capacity retention rate. The 20 C capacity retention rate is an index of output performance at normal temperature, and is preferably 10% or more, and more preferably 30% or more.

The obtained evaluation results are shown in Table 11.

(7-3) Fabrication of Laminate Type Nonaqueous Secondary Battery (7-3-1) Fabrication of Positive Electrode A positive electrode was fabricated by the method mentioned in (5-3-1).

(7-3-2) Fabrication of Negative Electrode

A negative electrode was fabricated by the method mentioned in (5-3-2).

(7-3-3) Assembling of Laminate Type Nonaqueous Secondary Battery

A laminate type nonaqueous secondary battery was assembled by the method mentioned in (5-3-3), and separators (B1) to (B3) were used as the separators, and (S38) to (S42) and (S103) were used as the nonaqueous electrolyte solutions.

(7-4) Nail Penetration Evaluation of Laminate Type Nonaqueous Secondary Battery

For the laminate type nonaqueous secondary battery obtained as mentioned above, an initial charging treatment was carried out according to the following procedure (7-4-1). The charging/discharging was carried out using a charging/discharging apparatus ACD-M01A (trade name) manufactured by Aska Electronic Co., Ltd. and a program thermostatic bath IN804 (trade name) manufactured by Yamato Scientific Co., Ltd.

Here, "1 C" refers to the current value at which a fully charged battery is expected to be discharged in one hour with a constant current to terminate discharging. In the following evaluation (7-4-1), specifically, "1 C" means the current value at which a fully charged battery of 4.2 V is expected to be discharged to 3.0 V in one hour with a constant current to terminate discharging.

(7-4-1) Initial Charging/Discharging Treatment of Laminate Type Nonaqueous Secondary Battery The ambient temperature of the battery was set at 25° C., and the battery was charged with a constant current of 0.075 A corresponding to 0.025 C to reach 3.1 V, and then charged with a constant voltage of 3.1 V for 1.5 hours. After resting for 3 hours, the battery was charged with a constant current of 0.15 A corresponding to 0.05 C to reach 4.2 V, and then charged with a constant voltage of 4.2 V for 1.5 hours. Thereafter, the battery was discharged to 3.0 V with a constant current of 0.45 A corresponding to 0.15 C.

(7-4-2) Nail Penetration Test of Laminate Type Nonaqueous Secondary Battery

The laminate type nonaqueous secondary battery subjected to the initial charging/discharging treatment according to the procedure mentioned in (7-4-1) was left to stand on an iron plate in a temperature-controllable explosion-proof booth. An iron nail having a diameter of 3.0 mm was used to penetrate through the center of the laminate type secondary battery at a speed of 2 mm/sec while setting the temperature in the explosion-proof booth at 40° C., and the nail was maintained in the penetrating state. The temperature of a thermocouple, disposed inside the nail so that the temperature inside the laminate type battery could be measured after nail penetration, was measured, and the presence or absence of ignition was evaluated. The evaluation was repeated using 10 samples of newly fabricated laminate type secondary batteries by the same method, and the number of samples that did not ignite (no ignition) was calculated as a percentage value by the following equation. The evaluation results are shown in Table 11.

Evaluation results(%)=(100×number of samples that did not ignite/total number of samples)

The passing rate of the nail penetration evaluation is preferably 50% or more.

TABLE 11

| | Electrolyte solution No. | Separator No. | Output test | | | Nail penetration test |
| --- | --- | --- | --- | --- | --- | --- |
| | | | 5 C capacity retention rate [%] | 10 C capacity retention rate [%] | 20 C capacity retention rate [%] | Passing rate of nail penetration safety test [%] |
| Example 143 | S103 | B1 | 84.5 | 75.9 | 53.6 | — |
| Example 144 | | B2 | 85.2 | 76.6 | 56.4 | 90 |
| Example 145 | | B3 | 84.9 | 76 | 53.5 | 10 |
| Comparative Example 106 | S42 | B1 | 80.5 | 52.4 | 9 | 80 |
| Comparative Example 107 | | B2 | 79.5 | 47.8 | 7.1 | 90 |
| Comparative Example 108 | S41 | B3 | 79.9 | 60.4 | 13.7 | 30 |
| Example 146 | S38 | B1 | 81.6 | 69.9 | 34.5 | — |
| Example 147 | | B3 | 82.8 | 71.6 | 44.9 | — |
| Example 148 | S39 | B1 | 80.5 | 69.2 | 34.4 | 80 |
| Example 149 | | B3 | 85.2 | 76.9 | 55.9 | 40 |
| Example 150 | S40 | B1 | 81.7 | 73.6 | 58.9 | — |
| Example 151 | | B3 | 82.1 | 75 | 62.1 | — |

Regarding the 10 C capacity retention rate, from Comparative Examples 106 to 107, when the nonaqueous electrolyte solution containing neither acetonitrile nor $LiFSO_3$ is combined with the silane crosslinked separators (B1) to (B2), the 10 C capacity retention rate exhibited the value of less than 55%. Meanwhile, from Examples 143 to 151, when acetonitrile and $LiFSO_3$ were contained in the nonaqueous electrolyte solution, the 10 C capacity retention rate exhibited the value of 65% or more regardless of the type of the separator. It is considered that the buffer effect of $LiFSO_3$ shifts toward a decrease in LiF, which is one of the factors for increasing the internal resistance, thus contributing to further improvement in output performance.

Regarding the 20 C capacity retention rate, from Comparative Examples 106 to 107, when the nonaqueous electrolyte solution containing neither acetonitrile nor LiFSO$_3$, and the silane crosslinked separators (B1) to (B2) are combined, the 20 C capacity retention rate exhibited the value of less than 10%. Meanwhile, from Examples 143 to 151, when acetonitrile and LiFSO$_3$ were contained in the nonaqueous electrolyte solution, the 20 C capacity retention rate exhibited the value of 30% or more regardless of the type of separator.

Regarding the passing rate of the nail penetration safety test, when using the separator (B3) which is a low resistance separator, the passing rate of the nail penetration safety test showed the value of less than 50% regardless of the type of the nonaqueous electrolyte solution. Meanwhile, when using the silane crosslinked separators (B1) to (B2), the passing rate of the nail penetration safety test exhibited the value of 50% or more regardless of the type of the nonaqueous electrolyte solution.

From the above results, it was found that the output performance is improved when acetonitrile and LiFSO$_3$ are contained in the nonaqueous electrolyte solution, and both output performance and safety performance can be achieved by using the nonaqueous electrolyte solution containing acetonitrile and LiFSO$_3$ and the silane crosslinked separator in combination.

(8) Fabrication of Aramid Separator and Evaluation of Safety
(8-1) Fabrication of Separator
(8-1-1) Fabrication of Separator (A16)
<Fabrication of Substrate as First Layer>

To 100% by weight of a polyethylene homopolymer with a viscosity-average molecular weight of 700,000, 1,000 ppm by weight of pentaerythrityl-tetrakis-[3-(3,5-di-t-butyl-4-hydroxyphenyl)propionate] was added as an antioxidant, followed by dry mixing using a tumbler blender to obtain a mixture, which was supplied to a twin-screw extruder through a feeder in a nitrogen atmosphere. Also, liquid paraffin (kinematic viscosity at 37.78° C.: 7.59×10$^{-5}$ m$^2$/s) was injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70% by weight (i.e., polymer concentration of 30% by weight). The melt kneading conditions were as follows: a preset temperature of 230° C., a screw rotational speed of 240 rpm and a discharge throughput of 18 kg/h.

The melt kneaded mixture was then extrusion cast through a T-die on a cooling roll controlled to a surface temperature of 25° C. to obtain a gel sheet (sheet-shaped molded product) having a raw membrane thickness of 1,370 μm.

The sheet-shaped molded product was then simultaneously fed into a biaxial tenter stretching machine for biaxial stretching to obtain a stretched sheet. The stretching conditions were as follows: an MD factor of 7.0, a TD factor of 6.4 (i.e., a factor of 7.0×6.3) and a biaxial stretching temperature of 128° C. The stretched gel sheet was then fed into a dichloromethane tank and thoroughly immersed in the dichloromethane for extraction removal of the liquid paraffin, and then dichloromethane was dried off to obtain a porous structure. The porous structure was fed to a TD tenter and heat setting (HS) was carried out at a heat setting temperature of 133° C. and a stretch ratio of 1.95, and then relaxation was carried out to a factor of 1.75 in the TD direction to obtain a microporous membrane. The edges of the microporous membrane were cut and rolled into a mother roll having a width of 1,100 mm and a length of 5,000 m.

During the evaluation, the microporous membrane wound out from the mother roll was slit as necessary for use as the evaluation substrate (first layer). With respect to the evaluation substrate, the membrane thickness, air permeability and porosity were measured. The evaluation results are shown in Table 12.
<Fabrication of Second Layer>

A second layer was fabricated by the same method as in (5-1-1).

(8-1-2) Fabrication of Separators (A17) to (A18)

Targeting the physical properties shown in Table 12, separators (A17) to (A18) were fabricated by the same method as in (8-1-1). A second layer was not included in separator (A18), and only the substrate (first layer) was used as the separator (A18).

(8-2) Fabrication of Laminate Nonaqueous Secondary Battery
(8-2-1) Fabrication of Positive Electrode A positive electrode was fabricated by the same mentioned in (5-3-1).

(8-2-2) Fabrication of Negative Electrode

A negative electrode was fabricated by the same mentioned in (5-3-2).

(8-2-3) Assembling of Laminate Type Nonaqueous Secondary Battery

A laminate type nonaqueous secondary battery was assembled by the method mentioned in (5-3-3), and separators (A16) to (A18) were used as the separators, and (S110) was used as the nonaqueous electrolyte solution.

(8-3) Nail Penetration Evaluation of Laminate Type Nonaqueous Secondary Battery

For the laminate type nonaqueous secondary battery obtained as mentioned above, an initial charging treatment was carried out according to the following procedure (8-3-1). The charging/discharging was carried out using a charging/discharging apparatus ACD-M01A (trade name) manufactured by Aska Electronic Co., Ltd. and a program thermostatic bath IN804 (trade name) manufactured by Yamato Scientific Co., Ltd.

Here, "1 C" refers to the current value at which a fully charged battery is expected to be discharged in one hour with a constant current to terminate discharging. In the following evaluation (8-3-1), specifically, "1 C" means the current value at which a fully charged battery of 4.2 V is expected to be discharged to 3.0 V in one hour with a constant current to terminate discharging.

(8-3-1) Initial Charging/Discharging Treatment of Laminate Type Nonaqueous Secondary Battery The ambient temperature of the battery was set at 25° C., and the battery was charged with a constant current of 0.075 A corresponding to 0.025 C to reach 3.1 V, and then charged with a constant voltage of 3.1 V for 1.5 hours. After resting for 3 hours, the battery was charged with a constant current of 0.15 A corresponding to 0.05 C to reach 4.2 V, and then charged with a constant voltage of 4.2 V for 1.5 hours. Thereafter, the battery was discharged to 3.0 V with a constant current of 0.45 A corresponding to 0.15 C.

(8-3-2) Nail Penetration Test of Laminate Type Nonaqueous Secondary Battery

The laminate type nonaqueous secondary battery subjected to the initial charging/discharging treatment according to the procedure mentioned in (8-3-1) was left to stand on an iron plate in a temperature-controllable explosion-proof booth. An iron nail having a diameter of 3.0 mm was used to penetrate through the center of the laminate type secondary battery at a speed of 2 mm/sec while setting the temperature in the explosion-proof booth at 40° C., and the nail was maintained in the penetrating state. The temperature of a thermocouple, disposed inside the nail so that the temperature inside the laminate type battery could be measured after nail penetration, was measured, and the presence or absence of ignition was evaluated. The evaluation was repeated using 100 samples of newly fabricated laminate type secondary batteries by the same method, and the number of samples that did not ignite (no ignition) was calculated as a percentage value by the following equation. The evaluation results are shown in Table 12.

Evaluation results(%)=(100×number of samples that did not ignite/total number of samples)

The passing rate of the nail penetration evaluation is preferably 50% or more. The evaluation results are shown in Table 12.

TABLE 12

|  |  |  |  | Example 152 A16 | Example 153 A17 | Example 154 A18 |
|---|---|---|---|---|---|---|
| Separator | First layer | Thickness (TA) | μm | 21 | 22 | 21 |
|  |  | Porosity | % | 40 | 38 | 36 |
|  |  | Air permeability | sec/cm³ | 158 | 158 | 162 |
|  | Second layer | Inorganic particles Type | — | Para-aramid/inorganic substance | Meta-aramid/inorganic substance | — |
|  |  | Thickness (TB) | μm | 5.2 | 5.5 | — |
|  |  | Ratio (TA/TB) | — | 4.0 | 4.0 | — |
| Battery | Passing rate of nail penetration safety test |  | % | 79 | 75 | 8 |

From a comparison between Examples 152 to 153 and Example 154, it was found that the passing rate of the nail penetration safety test significantly increases by containing aramid in the second layer, leading to an improvement in safety. It is presumed that this is because the second layer contains aramid resin having excellent heat resistance, thus enabling the inhibition of deformation of the separator due to temperature rise associated with internal short circuit during nail penetration.

(9) Fabrication and Evaluation of Non-Woven Fabric Separator
(9-1) Fabrication of Non-Woven Fabric Separator
(9-1-1) Fabrication of Non-Woven Fabric Separator (A19)
<Fabrication of Non-Woven Fabric Substrate 1>

40 parts by weight of oriented crystallized polyethylene terephthalate (PET)-based short fibers having a fineness of 0.06 dtex (mean fiber diameter of 2.3 μm) and a fiber length of 3 mm, 20 parts by weight of oriented crystallized PET-based short fibers having a fineness of 0.1 dtex (mean fiber diameter of 3.1 μm) and a fiber length of 3 mm, and 40 parts by weight of PET-based short fibers for a single component type binder, having a fineness of 0.2 dtex (mean fiber diameter of 4.1 μm) and a fiber length of 3 mm (softening point of 120° C., melting point of 230° C.) were dispersed in water by a pulper to obtain a uniform papermaking slurry having the concentration of 1% by weight. This papermaking slurry was subjected to papermaking by a wet method using an inclined papermaking machine equipped with a papermaking wire having a ventilation rate of 270 cm³/cm²/sec and the structure (upper net: plain weave, lower net: ridge), and then PET-based short fibers for binder were adhered by a dryer cylinder at 135° C. to develop the non-woven fabric strength, thus obtaining a non-woven fabric having a basis weight of 12 g/m². Further, this non-woven fabric was subjected to hot calendering treatment under the conditions of a hot roll temperature of 200° C., a linear pressure of 100 kN/m and a treatment speed of 30 m/min using a 1-nip heat calender composed of an induction heated jacket roll (metal heat roll) and an elastic roll to fabricate a non-woven fabric substrate 1 having a thickness of 18 m.

<Preparation of Coating Solution 1>

100 parts of boehmite having a volume-average particle size of 2.2 μm and a specific surface area of 3 m²/g was mixed with 120 parts of an aqueous 0.3% by weight solution of a carboxymethyl cellulose sodium salt in which a viscosity at 25° C. of its aqueous 1% by weight solution is 200 mPa·s, and after sufficient stirring, 300 parts of an aqueous 0.5% solution of a carboxymethyl cellulose sodium salt in which a viscosity at 25° C. of its aqueous 1% by weight solution is 7,000 mPa·s and 10 parts of a carboxy-modified styrene-butadiene resin (SBR) emulsion (solid component concentration of 50% by weight) having a glass transition point of 5° C. and a volume-average particle size of 0.2 μm were mixed, followed by stirring to fabricate a coating solution 1. The B-type viscosity of this coating solution 1 was 1,020 mPa·s.

<Fabrication of Non-Woven Fabric Separator (A19)>

The coating solution 1 was coated on the non-woven fabric substrate 1 with a kiss reverse type gravure coater so as to have an absolute dry coating amount of 16 g/m², followed by drying to fabricate a separator (A19) having a thickness of 34 μm.

(9-1-2) Fabrication of Non-Woven Fabric Separators (A20) to (A21)

The coating solution 1 was coated on the stripped surface of a process paper with a kiss reverse type gravure coater so as to have an absolute dry coating amount of 16 g/m². Then, the non-woven fabric substrate 1 was lightly stacked on the coated surface before drying, followed by drying and further removal of the process paper to fabricate a separator (A20) having a thickness of 34 μm.

The non-woven fabric substrate 1 fabricated in (7-1-1) was defined as a separator (A21).

(9-1-3) Evaluation of Separator
(i) Thickness

The cross-section of each separator was observed using an SEM device equipped with an EDS (field emission scanning electron microscope (JSM-06700F, manufactured by JEOL, Ltd.)). Then, "the region where aluminum (Al) was detected" was defined as "boehmite, which is an inorganic pigment". The "region where Al is not detected and the substance exists" was defined as "polyethylene terephthalate fiber which is a substrate fiber". The "depth at which the presence ratio of the inorganic pigment is 4/1" was defined as "boundary line between the layer containing the inorganic pigment as the main component and the layer in which the non-woven fabric and the inorganic pigment are mixed". The "depth at which the presence ratio of the inorganic pigment is ¼" was defined as "boundary line between the layer in which the non-woven fabric and the inorganic pigment are mixed and the layer containing the substrate fiber as the main component".

From these "boundary lines", each thickness of "layer containing the inorganic pigment as the main component", "layer in which the non-woven fabric and the inorganic pigment are mixed", and "layer containing the substrate fiber as the main component" was obtained (each being thickness I, II, III). When "mixed layer reaches the opposite surface of the pigment-based layer", the thickness III of "substrate fiber-based layer" was regarded as "0 (zero)". The obtained evaluation results are shown in Table 13.

(9-2) Fabrication of Laminate Nonaqueous Secondary Battery (9-2-1) and Fabrication of Positive Electrode A positive electrode was fabricated by the method mentioned in (5-3-1).

(9-2-2) Fabrication of Negative Electrode

A negative electrode was fabricated by the method mentioned in (5-3-2).

(9-2-3) Fabrication of Laminate Type Nonaqueous Secondary Battery

A laminate type nonaqueous secondary battery was assembled by the method mentioned in (5-3-3), and separators (A19) to (A21) were used as the separators, and (S110) was used as the nonaqueous electrolyte solution.

(9-3) Nail Penetration Evaluation of Laminate Type Nonaqueous Secondary Battery

For the laminate type nonaqueous secondary battery obtained as mentioned above, an initial charging treatment was carried out according to the following procedure (9-3-1). The charging/discharging was carried out using a charging/discharging apparatus ACD-M01A (trade name) manufactured by Aska Electronic Co., Ltd. and a program thermostatic bath IN804 (trade name) manufactured by Yamato Scientific Co., Ltd.

Here, "1 C" refers to the current value at which a fully charged battery is expected to be discharged in one hour with a constant current to terminate discharging. In the following evaluation (9-3-1), specifically, "1 C" means the current value at which a fully charged battery of 4.2 V is expected to be discharged to 3.0 V in one hour with a constant current to terminate discharging.

(9-3-1) Initial Charging/Discharging Treatment of Laminate Type Nonaqueous Secondary Battery The ambient temperature of the battery was set at 25° C., and the battery was charged with a constant current of 0.075 A corresponding to 0.025 C to reach 3.1 V, and then charged with a constant voltage of 3.1 V for 1.5 hours. After resting for 3 hours, the battery was charged with a constant current of 0.15 A corresponding to 0.05 C to reach 4.2 V, and then charged with a constant voltage of 4.2 V for 1.5 hours. Thereafter, the battery was discharged to 3.0 V with a constant current of 0.45 A corresponding to 0.15 C.

(9-3-2) Nail Penetration Test of Laminate Type Nonaqueous Secondary Battery

The laminate type nonaqueous secondary battery subjected to the initial charging/discharging treatment according to the procedure mentioned in (9-3-1) was left to stand on an iron plate in a temperature-controllable explosion-proof booth. An iron nail having a diameter of 3.0 mm was used to penetrate through the center of the laminate type secondary battery at a speed of 2 mm/sec while setting the temperature in the explosion-proof booth at 40° C., and the nail was maintained in the penetrating state. The temperature of a thermocouple, disposed inside the nail so that the temperature inside the laminate type battery could be measured after nail penetration, was measured, and the presence or absence of ignition was evaluated. The evaluation was repeated using 100 samples of newly fabricated laminate type secondary batteries by the same method, and the number of samples that did not ignite (no ignition) was calculated as a percentage value by the following equation. The evaluation results are shown in Table 13.

Evaluation results(%)=(100×number of samples that did not ignite/total number of samples)

The passing rate of the nail penetration evaluation is preferably 50% or more. The evaluation results are shown in Table 13.

TABLE 13

|  | Separator | Thickness [μm] | | | Passing rate of nail penetration safety test [%] |
| --- | --- | --- | --- | --- | --- |
|  |  | Pigment-based layer | Mixed layer | Fiber-based layer |  |
| Example 155 | A19 | 16 | 13 | 5 | 81 |
| Example 156 | A20 | 21 | 0 | 13 | 65 |
| Example 157 | A21 | 0 | 0 | 18 | 2 |

In Example 157 in which only the fiber-based layer is included in the separator, the passing rate of the nail penetration safety test was less than 50%, whereas, in Examples 155 to 156 in which both the fiber-based layer and the pigment-based layer are included, the passing rate of the nail penetration safety test was 50% or more. Further, from a comparison between Example 155 and Example 156, it was found that the safety is improved by the presence of the mixed layer. Due to the buffer effect of LiFSO$_3$ contained in the nonaqueous electrolyte solution, LiF, which is one of the factors for increasing the internal resistance, tends to shift toward a decrease, and as a result, the local exothermic reaction is inhibited.

REFERENCE SIGNS LIST

100: Nonaqueous secondary battery
110: Battery exterior
120: Space of battery exterior 110
130: Positive electrode lead
140: Negative electrode lead
150: Positive electrode
160: Negative electrode
170: Separator

The invention claimed is:

1. A nonaqueous electrolyte solution comprising:
   a nonaqueous solvent containing acetonitrile and vinylene carbonate, and a compound represented by the following general formula (1):

$$R_1\text{-}A\text{-}R_2 \quad (1)$$

wherein A represents a divalent group having a structure represented by any one of the following formulas (1-2) to (1-5):

[Chemical Formula 1]

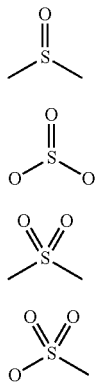

and $R_1$ and $R_2$ each independently represent an alkyl group having 1 to 4 carbon atoms optionally substituted with an aryl group or a halogen atom; or a vinylidene group optionally substituted with a halogen atom; or an aryl group optionally substituted with an alkyl group or a halogen atom; or $R_1$ and $R_2$ are bonded to each other together with A to form a cyclic structure optionally having an unsaturated bond, and lithium bis(fluorosulfonyl)imide as an inorganic lithium salt, wherein the content of the acetonitrile is 5% by volume or more and 97% by volume or less based on the total amount of the nonaqueous solvent, wherein the total content of the vinylene carbonate and the compound represented by the general formula (1) is 0.1% by volume or more and less than 10% by volume based on the total amount of the nonaqueous solvent, wherein the content of the vinylene carbonate is less than the content of the compound represented by the general formula (1), wherein the nonaqueous electrolyte solution excludes an organic lithium salt, wherein the inorganic lithium salt contains $LiPF_6$, wherein the lithium bis(fluorosulfonyl)imide and $LiPF_6$ satisfy at a molar concentration:

$LiPF_6$<lithium bis(fluorosulfonyl)imide, and wherein a content of the lithium bis(fluorosulfonyl)imide is 0.5 to 3.0 mol per 1 L of the nonaqueous solvent.

2. The nonaqueous electrolyte solution according to claim 1, wherein the content of the vinylene carbonate is 0.1 to 3.5% by volume based on the total amount of the nonaqueous solvent, and a volume ratio of the compound represented by the general formula (1) to the vinylene carbonate satisfies: 1.5×vinylene carbonate content the content of the compound represented by general formula (1)≤2.4×vinylene carbonate content.

3. The nonaqueous electrolyte solution according to claim 1, wherein the compound represented by the general formula (1) contains ethylene sulfite.

4. The nonaqueous electrolyte solution according to claim 1, further comprising a lithium salt containing $LiFSO_3$ in an amount of 200 ppm by weight or less based on the total amount of the nonaqueous electrolyte solution.

5. The nonaqueous electrolyte solution according to claim 1, wherein the content of the inorganic lithium salt is 0.1 to 40 parts by weight based on 100 parts by weight of the nonaqueous electrolyte solution.

6. The nonaqueous electrolyte solution according to claim 1, wherein the nonaqueous solvent further contains a compound represented by the following general formula (3):

[Chemical Formula 2]

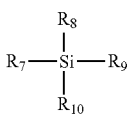

wherein $R_7$ to $R_{10}$ each independently represent an alkyl group having 1 to 4 carbon atoms, an alkoxy group having 1 to 4 carbon atoms, or a phenyl group, and are optionally substituted or may include an unsaturated bond in the carbon bond.

7. The nonaqueous electrolyte solution according to claim 1, wherein a recovery charging capacity retention rate is 90% or more in a nonaqueous secondary battery including the nonaqueous electrolyte solution.

8. A nonaqueous secondary battery comprising the nonaqueous electrolyte solution according to claim 1.

9. The nonaqueous secondary battery according to claim 8, wherein a recovery charging capacity retention rate is 90% or more.

10. The nonaqueous secondary battery according to claim 8, further comprising a separator, wherein one or more island structures containing calcium are detected when TOF-SIMS measurement is carried out over an area of 100 μm square of the separator, and the size of the island structure has a region of 9 μm² or more and 245 μm² or less.

11. The nonaqueous secondary battery according to claim 10, wherein when two or more island structures containing calcium are present in the separator, both a minimum value and a maximum value of a distance between weighted centers of gravity positions of the respective island structures are 6 μm or more and 135 μm or less.

12. The nonaqueous secondary battery according to claim 11, wherein the separator includes a substrate as a first layer, and a second layer stacked on at least one side of the substrate, wherein a thickness ratio of the substrate to the second layer is 0.5 or more and 10 or less, and the second layer contains at least one selected from the group consisting of ceramic, aramid resin and polyvinylidene fluoride (PVDF).

13. The nonaqueous secondary battery according to claim 11, wherein the separator contains a silane-modified polyolefin.

14. The nonaqueous secondary battery according to claim 13, wherein a silane crosslinking reaction of the silane-modified polyolefin is initiated when the separator contacts with the electrolyte solution.

15. The nonaqueous secondary battery according to claim 8, further comprising a separator, wherein the separator imparts an inorganic pigment to a substrate containing a non-woven fabric.

16. The nonaqueous secondary battery according to claim 8, further comprising a separator, wherein the separator imparts an inorganic pigment to a substrate containing a non-woven fabric, and has a layer structure formed by overlapping a layer mainly composed of the inorganic pigment, a layer composed of a mixture of the inorganic pigment and a substrate fiber, and a layer composed mainly of the substrate fiber, in this order.

17. The nonaqueous secondary battery according to claim 8, wherein the nonaqueous electrolyte solution further comprises ethylene carbonate, and
- a compound having an olivine-type structure represented by formula $Li_wFePO_4$, wherein w is 0.05 to 1.1, is contained as a positive electrode active material of a positive electrode included in the nonaqueous secondary battery.

* * * * *